(12) United States Patent
Aguilar et al.

(10) Patent No.: US 12,150,186 B1
(45) Date of Patent: Nov. 19, 2024

(54) CONNECTION THROTTLING IN A LOW POWER PHYSICAL ASSET TRACKING SYSTEM

(71) Applicant: Samsara Inc., San Francisco, CA (US)

(72) Inventors: Ernie Aguilar, Austin, TX (US); Christopher Frost, San Francisco, CA (US); Pierre Gavaret, Novato, CA (US); Matthew Basham, Oakland, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/749,408

(22) Filed: Jun. 20, 2024

Related U.S. Application Data

(60) Provisional application No. 63/631,353, filed on Apr. 8, 2024.

(51) Int. Cl.
*H04W 76/10* (2018.01)
*H04L 67/00* (2022.01)
*H04W 64/00* (2009.01)

(52) U.S. Cl.
CPC ............ *H04W 76/10* (2018.02); *H04L 67/34* (2013.01); *H04W 64/00* (2013.01)

(58) Field of Classification Search
CPC .............. H04L 63/083; H04L 63/0846; H04L 63/0861; H04L 9/0894; H04L 9/3213; H04L 9/3234; H04L 67/34
USPC ..... 455/41.2, 457, 515, 3.01, 450, 418, 560, 455/403, 3.02
See application file for complete search history.

(56) References Cited

U.S. PATENT DOCUMENTS 4,671,111 A 6/1987 Lemelson
5,825,283 A 10/1998 Camhi
(Continued)

FOREIGN PATENT DOCUMENTS

CN 111047179 A 4/2020
DE 10 2004 015 221 A1 10/2005
(Continued)

OTHER PUBLICATIONS

US 11,450,210 B2, 09/2022, Tsai et al. (withdrawn)
(Continued)

*Primary Examiner* — Joseph Arevalo
(74) *Attorney, Agent, or Firm* — Knobbe, Martens, Olson & Bear, LLP

(57) ABSTRACT

Systems and methods are described for connection throttling between peripherals and centrals. Connections may enable bi-directional communication between a peripheral and a central to allow for updates to or configuration of the peripheral. The peripheral can send broadcasts to centrals. The broadcasts may contain metadata indicating a time period since the peripheral last connected to a central, a maximum connection distance, and a transmit power or signal strength indicator. The central may use the transmit power or signal strength indicator to determine a distance from the central to the peripheral and may determine whether the distance is within the maximum connection distance. The central may determine to connect to the peripheral based on time and distance thresholds being satisfied. Upon establishing of a successful connection, the central can update or configure the peripheral.

20 Claims, 30 Drawing Sheets

(56) References Cited

U.S. PATENT DOCUMENTS

| | | | |
|---|---|---|---|
| 5,910,987 A * | 6/1999 | Ginter | H04L 63/083 |
| | | | 705/52 |
| 5,917,433 A | 6/1999 | Keillor et al. | |
| 6,064,299 A | 5/2000 | Lesesky et al. | |
| 6,098,048 A | 8/2000 | Dashefsky et al. | |
| 6,157,864 A | 12/2000 | Schwenke et al. | |
| 6,253,129 B1 | 6/2001 | Jenkins et al. | |
| 6,317,668 B1 | 11/2001 | Thibault et al. | |
| 6,411,203 B1 | 6/2002 | Lesesky et al. | |
| 6,421,590 B2 | 7/2002 | Thibault | |
| 6,452,487 B1 | 9/2002 | Krupinski | |
| 6,505,106 B1 | 1/2003 | Lawrence et al. | |
| 6,651,063 B1 | 11/2003 | Vorobiev | |
| 6,714,894 B1 | 3/2004 | Tobey et al. | |
| 6,718,239 B2 | 4/2004 | Rayner | |
| 6,741,165 B1 | 5/2004 | Langfahl et al. | |
| 6,801,920 B1 | 10/2004 | Wischinski | |
| 7,117,075 B1 | 10/2006 | Larschan et al. | |
| 7,139,780 B2 | 11/2006 | Lee et al. | |
| 7,209,959 B1 | 4/2007 | Campbell et al. | |
| 7,233,684 B2 | 6/2007 | Fedorovskaya et al. | |
| 7,386,376 B2 | 6/2008 | Basir et al. | |
| 7,389,178 B2 | 6/2008 | Raz et al. | |
| 7,398,298 B2 | 7/2008 | Koch | |
| 7,492,938 B2 | 2/2009 | Brinson, Jr. et al. | |
| 7,526,103 B2 | 4/2009 | Schofield et al. | |
| 7,555,378 B2 | 6/2009 | Larschan et al. | |
| 7,596,417 B2 | 9/2009 | Fister et al. | |
| 7,606,779 B2 | 10/2009 | Brinson, Jr. et al. | |
| 7,715,961 B1 | 5/2010 | Kargupta | |
| 7,769,499 B2 | 8/2010 | McQuade et al. | |
| 7,844,088 B2 | 11/2010 | Brinson, Jr. et al. | |
| 7,859,392 B2 | 12/2010 | McClellan et al. | |
| 7,877,198 B2 | 1/2011 | Tenzer et al. | |
| 7,881,838 B2 | 2/2011 | Larschan et al. | |
| 7,957,936 B2 | 6/2011 | Eryurek et al. | |
| 8,019,581 B2 | 9/2011 | Sheha et al. | |
| 8,024,311 B2 | 9/2011 | Wood et al. | |
| 8,032,277 B2 | 10/2011 | Larschan et al. | |
| 8,140,358 B1 | 3/2012 | Ling et al. | |
| 8,156,108 B2 | 4/2012 | Middleton et al. | |
| 8,156,499 B2 | 4/2012 | Foulger et al. | |
| 8,169,343 B2 | 5/2012 | Sheha et al. | |
| 8,175,992 B2 | 5/2012 | Bass, II et al. | |
| 8,230,272 B2 | 7/2012 | Middleton et al. | |
| 8,260,489 B2 | 9/2012 | Nielsen et al. | |
| 8,417,402 B2 | 4/2013 | Basir | |
| 8,442,508 B2 | 5/2013 | Harter et al. | |
| 8,457,395 B2 | 6/2013 | Boncyk et al. | |
| 8,509,412 B2 | 8/2013 | Sheha et al. | |
| 8,543,625 B2 | 9/2013 | Middleton et al. | |
| 8,560,164 B2 | 10/2013 | Nielsen et al. | |
| 8,615,555 B2 | 12/2013 | Koch | |
| 8,625,885 B2 | 1/2014 | Brinson, Jr. et al. | |
| 8,626,568 B2 | 1/2014 | Warkentin et al. | |
| 8,633,672 B2 | 1/2014 | Jung et al. | |
| 8,669,857 B2 | 3/2014 | Sun et al. | |
| 8,682,572 B2 | 3/2014 | Raz et al. | |
| 8,706,409 B2 | 4/2014 | Mason et al. | |
| 8,831,825 B2 | 9/2014 | Shah et al. | |
| 8,836,784 B2 | 9/2014 | Erhardt et al. | |
| 8,918,229 B2 | 12/2014 | Hunt et al. | |
| 8,953,228 B1 | 2/2015 | Mehers | |
| 8,989,914 B1 | 3/2015 | Nemat-Nasser et al. | |
| 8,989,959 B2 | 3/2015 | Plante et al. | |
| 8,996,240 B2 | 3/2015 | Plante | |
| 9,024,744 B2 | 5/2015 | Klose et al. | |
| 9,053,590 B1 | 6/2015 | Kator et al. | |
| 9,137,498 B1 | 9/2015 | L'Heureux et al. | |
| 9,147,335 B2 | 9/2015 | Raghunathan et al. | |
| 9,152,609 B2 | 10/2015 | Schwartz et al. | |
| 9,165,196 B2 | 10/2015 | Kesavan et al. | |
| 9,170,913 B2 | 10/2015 | Hunt et al. | |
| 9,189,895 B2 | 11/2015 | Phelan et al. | |
| 9,230,250 B1 | 1/2016 | Parker et al. | |
| 9,230,437 B2 | 1/2016 | Brinton et al. | |
| 9,280,435 B2 | 3/2016 | Hunt et al. | |
| 9,311,271 B2 | 4/2016 | Wright | |
| 9,344,683 B1 | 5/2016 | Nemat-Nasser et al. | |
| 9,349,228 B2 | 5/2016 | Ochsendorf et al. | |
| 9,384,111 B2 | 7/2016 | Hunt et al. | |
| 9,389,147 B1 | 7/2016 | Lambert et al. | |
| 9,402,060 B2 | 7/2016 | Plante | |
| 9,412,282 B2 | 8/2016 | Hunt et al. | |
| 9,439,280 B2 | 9/2016 | Chang et al. | |
| 9,445,270 B1 | 9/2016 | Bicket et al. | |
| 9,477,639 B2 | 10/2016 | Fischer et al. | |
| 9,477,989 B2 | 10/2016 | Grimm et al. | |
| 9,527,515 B2 | 12/2016 | Hunt et al. | |
| 9,594,725 B1 | 3/2017 | Cook et al. | |
| 9,672,667 B2 | 6/2017 | Mason et al. | |
| 9,688,282 B2 | 6/2017 | Cook et al. | |
| 9,728,015 B2 | 8/2017 | Kwak | |
| 9,761,063 B2 | 9/2017 | Lambert et al. | |
| 9,761,067 B2 | 9/2017 | Plante et al. | |
| 9,811,536 B2 | 11/2017 | Morris et al. | |
| 9,818,088 B2 | 11/2017 | Penilla et al. | |
| 9,846,979 B1 | 12/2017 | Sainaney et al. | |
| 9,849,834 B2 | 12/2017 | Reed et al. | |
| 9,852,625 B2 | 12/2017 | Victor et al. | |
| 9,892,376 B2 | 2/2018 | Pfeiffer et al. | |
| 9,922,567 B2 | 3/2018 | Molin et al. | |
| 9,934,628 B2 | 4/2018 | Kreiner et al. | |
| 9,996,980 B1 | 6/2018 | Gonzalez et al. | |
| 10,015,452 B1 | 7/2018 | Schofield et al. | |
| 10,033,706 B2 | 7/2018 | Bicket et al. | |
| 10,040,459 B1 | 8/2018 | Kukreja | |
| 10,065,652 B2 | 9/2018 | Shenoy et al. | |
| 10,068,392 B2 | 9/2018 | Cook et al. | |
| 10,075,669 B2 | 9/2018 | Vanman et al. | |
| 10,083,547 B1 | 9/2018 | Tomatsu | |
| 10,085,149 B2 | 9/2018 | Bicket et al. | |
| 10,094,308 B2 | 10/2018 | Kolhouse et al. | |
| 10,102,495 B1 | 10/2018 | Zhang et al. | |
| 10,127,810 B2 | 11/2018 | Durie, Jr. et al. | |
| 10,157,321 B2 | 12/2018 | Becker et al. | |
| 10,163,107 B1 * | 12/2018 | White | G06Q 20/341 |
| 10,173,486 B1 | 1/2019 | Lee et al. | |
| 10,173,544 B2 | 1/2019 | Hendrix et al. | |
| 10,196,071 B1 | 2/2019 | Rowson et al. | |
| 10,206,107 B2 | 2/2019 | Bicket et al. | |
| 10,223,935 B2 | 3/2019 | Sweany et al. | |
| 10,275,959 B2 | 4/2019 | Ricci | |
| 10,286,875 B2 | 5/2019 | Penilla et al. | |
| 10,290,036 B1 | 5/2019 | Gella et al. | |
| 10,311,749 B1 | 6/2019 | Kypri et al. | |
| 10,336,190 B2 | 7/2019 | Yokochi et al. | |
| 10,388,075 B2 | 8/2019 | Schmirler et al. | |
| 10,389,739 B2 | 8/2019 | Solotorevsky | |
| 10,390,227 B2 | 8/2019 | Bicket et al. | |
| 10,444,949 B2 | 10/2019 | Scott et al. | |
| 10,445,559 B2 | 10/2019 | Joseph et al. | |
| 10,459,444 B1 | 10/2019 | Kentley-Klay | |
| 10,460,183 B2 | 10/2019 | Welland et al. | |
| 10,460,600 B2 | 10/2019 | Julian et al. | |
| 10,471,955 B2 | 11/2019 | Kouri et al. | |
| 10,486,709 B1 | 11/2019 | Mezaael | |
| 10,489,222 B2 | 11/2019 | Sathyanarayana et al. | |
| 10,523,904 B2 | 12/2019 | Mahmoud et al. | |
| 10,573,183 B1 | 2/2020 | Li et al. | |
| 10,579,123 B2 | 3/2020 | Tuan et al. | |
| 10,609,114 B1 | 3/2020 | Bicket et al. | |
| 10,621,873 B1 | 4/2020 | Spiel et al. | |
| 10,623,899 B2 | 4/2020 | Watkins et al. | |
| 10,632,941 B2 | 4/2020 | Chauncey et al. | |
| 10,652,335 B2 | 5/2020 | Botticelli | |
| 10,715,976 B2 | 7/2020 | Hoffner et al. | |
| 10,749,700 B2 * | 8/2020 | Raleigh | H04M 15/66 |
| 10,762,363 B2 | 9/2020 | Watanabe | |
| 10,782,691 B2 | 9/2020 | Suresh et al. | |
| 10,788,990 B2 | 9/2020 | Kim et al. | |
| 10,789,840 B2 | 9/2020 | Boykin et al. | |
| 10,803,496 B1 | 10/2020 | Hopkins | |
| 10,818,109 B2 | 10/2020 | Palmer et al. | |

(56) References Cited

U.S. PATENT DOCUMENTS

| | | |
|---|---|---|
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,636 B1 * | 9/2021 | Jorasch ............... H04W 12/33 |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B2 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | McClellan et al. |
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |

(56) References Cited

U.S. PATENT DOCUMENTS

| | | |
|---|---|---|
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2016/0046298 A1 | 2/2016 | DeRuyck et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0077246 A1* | 3/2020 | Mars ............... G06Q 40/02 |
| 2020/0139847 A1 | 5/2020 | Baumer et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0342230 A1 | 10/2020 | Tsai et al. |
| 2020/0342506 A1 | 10/2020 | Levy et al. |
| 2020/0366468 A1* | 11/2020 | Khandani ............ H04L 9/3226 |
| 2020/0371773 A1 | 11/2020 | Kato et al. |
| 2020/0380806 A1 | 12/2020 | Tabata |
| 2020/0389415 A1 | 12/2020 | Zhao et al. |
| 2021/0097315 A1 | 4/2021 | Carruthers et al. |
| 2021/0397908 A1 | 12/2021 | ElHattab et al. |
| 2022/0095698 A1* | 3/2022 | Talbot ............... G06F 21/602 |
| 2022/0165073 A1 | 5/2022 | Shikii et al. |
| 2022/0289203 A1 | 9/2022 | Makilya et al. |
| 2022/0374737 A1 | 11/2022 | Dhara et al. |
| 2022/0377517 A1* | 11/2022 | Altshul ............... H04W 76/40 |
| 2023/0077207 A1 | 3/2023 | Hassan et al. |
| 2023/0153735 A1 | 5/2023 | Dhara et al. |
| 2023/0169420 A1 | 6/2023 | Dhara et al. |
| 2023/0219592 A1 | 7/2023 | Calmer et al. |
| 2023/0281553 A1 | 9/2023 | Singh et al. |
| 2023/0291243 A1* | 9/2023 | Audet ............... H02J 50/40 |
| 2023/0298410 A1 | 9/2023 | Calmer et al. |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |
| 2024/0146629 A1 | 5/2024 | Lloyd |

FOREIGN PATENT DOCUMENTS

| | | |
|---|---|---|
| EP | 1615178 A2 | 1/2006 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

Driver I, The Power of Vision, Netradyne, [publication date unknown], in 2 pages.

"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.

"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.

"EcoDrive", Wikipedia, 2022, in 1 page. URL: https://en.wikipedia.org/wiki/EcoDrive.

"Fiat 500—2015 Owner's Manual", FCA US LLC, 2016, 5th ed., in 440 pages.

"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.

"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.

(56) References Cited

OTHER PUBLICATIONS

"Fiat launches fleet-specific eco:Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMlrYTmCMU.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
AutoMotoTV, "Fiat ecoDrive System" [video], YouTube, Oct. 6, 2008, screenshot in 1 page URL: https://www.youtube.com/watch?v=AUSb2dBBI8E.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf (uploaded in 2 parts).
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.
Dunn, B., "What is the Lytx DriveCam?", Autobytel, Jul. 12, 2014, in 1 page. URL: https://www.autobytel.com/what-is-lytx-drivecam.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
FiatFranco, ""Ciao!"—Fiat ecoDrive" [video], YouTube, Sep. 10, 2007, screenshot in 1 page URL: https://www.youtube.com/watch?v=SluE9Zco55c.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.
Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Ginevra2008, "Fiat EcoDrive" [video], YouTube, Mar. 7, 2008, screenshot in 1 page. URL: https://www.youtube.com/watch?v=D95p9Bljr90.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Horsey, J., "Vezo 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lytx, "TeenSafe Driver Program", American Family Insurance®, 2014, in 10 pages. URL: https://online-sd02.drivecam.com/Downloads/TSD_WebsiteGuide.pdf.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab90w_CY.
Netradyne Inc., "Netradyne Introduces New DriverStar Feature to Recognize and Reward Safe Driving", PR Newswire, Netradyne,

(56) References Cited

OTHER PUBLICATIONS

Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver•i™ Catches No Stop ad Stop Sign | Fleet Management Technology" [video], YouTube, Oct. 3, 2017, screenshot in 1 page. URL: https://www.youtube.com/watch?v=I8sX3X02aJo.
Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages.
Netradyne, Driver Card 2, 2018, in 2 pages.
Ohidan, A., "Fiat And AKQA Launch Eco:Drive™", Science 2.0, Oct. 7, 2008, in 4 pages. URL: https://www.science20.com/newswire/fiat_and_akqa_launch_eco_drive_tm.
Puckett, T. et al. "Safety Track 4B—Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=1eclwRCb5ZA.
Soumik Ukil, "LightMetrics ADAS demo" [video], YouTube, Jul. 20, 2017, screenshot in 1 page. URL: https://www.youtube.com/watch?app=desktop&v=9LGz1oo7dTw.
Straight, B. "Over 20 years later, Lytx continues to evolve alongside the industry it serves", FreightWaves, Apr. 16, 2019, in 4 pages. URL: https://www.freightwaves.com/news/technololgy/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 Biggest Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozS0E.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
"Cargo Monitor", Samsara Inc., accessed Feb. 21, 2024 [publication date unknown], in 2 pages. URL: https://www.samsara.com/products/models/cargo-monitor.
"Connect your operations on the Samsara Platform.", Samsara Inc., [publication date unknown]. URL: https://www.samsara.com/products/platform/?gad_source=1&gclid=EAlalQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.
"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Guide: Drive risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.
"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.
"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Map and Tile Coordinates", Google for Developers, last updated Oct. 23, 2023 [retrieved on Oct. 24, 2023], in 5 pages. URL: https://developers.google.com/maps/documentation/javascript/coordinates.

(56) References Cited

OTHER PUBLICATIONS

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"The Home of Actionable Transportation Insights—Meet Altitude", Geotab ITS, accessed on Apr. 1, 2024 [publication date unknown], in 5 pages. URL: https://its.geotab.com/altitude/.

"Transform your business with the Connected Operations™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

(56) References Cited

OTHER PUBLICATIONS

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.
Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.
Gilman, E. et al., "Personalised assistance for fuel-efficient driving", Transportation Research Part C, Mar. 2015, pp. 681-705.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Groover, M. P., "Chapter 22 Inspection Technologies", in Automation, Production Systems, and Computer-Integrated Manufacturing, 2015, 4th Edition, Pearson, pp. 647-684.
Groover, M. P., *Automation, Production Systems, and Computer-Integrated Manufacturing*, 2016, 4th Edition (Indian Subcontinent Adaptation), Pearson, in 11 pages.
Han, Z. et al., "Design of Intelligent Road Recognition and Warning System for Vehicles Based on Binocular Vision", IEEE Access, Oct. 2018, vol. 6, pp. 62880-62889.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Haworth, N. et al., "The Relationship between Fuel Economy and Safety Outcomes", Monash University, Accident Research Centre, Dec. 2001, Report No. 188, in 67 pages.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Huang, K.-Y. et al., "A Novel Machine Vision System for the Inspection of Micro-Spray Nozzle", Sensors, Jun. 2015, vol. 15(7), pp. 15326-15338.
Junior, J. F. et al., "Driver behavior profiling: An investigation with different smartphone sensors and machine learning", PLoS One, Apr. 2017, vol. 12(4): e0174959, in 16 pages.
Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lotan, T. et al., "In-Vehicle Data Recorder for Evaluation of Driving Behavior and Safety", Transportation Research Record Journal of the Transportation Research Board, Jan. 2006, in 15 pages.
Malamas, Elias N. et al. "A survey on industrial vision systems, applications and tools", Image and Vision Computing, Dec. 28, 2002, vol. 21, pp. 171-188.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893-New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.
Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication

(56) References Cited

OTHER PUBLICATIONS date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

(56) References Cited

OTHER PUBLICATIONS

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score—(filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seatbelt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: AI Model Development", Motive Technologies, Inc., accessed on Mar. 29, 2024 [publication date unknown], Document No. 2022Q1_849898994, in 14 pages.

Motive, "Guide: DRIVE risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WnclRs_cFw0.

Motive, "How to install your Motive AI Dashcam." [video], YouTube, Aug. 5, 2022, screenshot in 1 page. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

(56) References Cited

OTHER PUBLICATIONS

Motive, "KeepTruckin ELD Training for Drivers" [video], YouTube, Feb. 2, 2018, screenshot in 1 page. URL: https://www.youtube.com/watch?v=LKJLIT2bGS0.
Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.
Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Perez, L. et al., "Robot Guidance Using Machine Vision Techniques in Industrial Environments: A Comparative Review", Sensors, Mar. 2016, vol. 16(3), in 27 pages.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages (uploaded in 3 parts).
Samsara Support, "AI Event Detection", Samsara Inc., accessed on Feb. 7, 2024 [publication date unknown]. URL: https://kb.samsara.

(56) References Cited

OTHER PUBLICATIONS com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm458564145580163323842957870 4 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.
U.S. Appl. No. 18/308,536, Ride Along Location Tracking, Apr. 27, 2023.
U.S. Appl. No. 18/468,463, Ride Along Location Tracking, Sep. 15, 2023.
U.S. Appl. No. 18/512,497, Ride Along Location Tracking, Nov. 17, 2023.
U.S. Appl. No. 17/931,354, Power Optimized Geolocation, Sep. 12, 2022.
U.S. Appl. No. 18/308,549, Low Power Geofencing, Apr. 27, 2023.
U.S. Appl. No. 18/468,478, Low Power Geofencing, Sep. 15, 2023.
U.S. Appl. No. 18/752,000, Rolling Encryption and Authentication in a Low Power Physical Asset Tracking System, Jun. 24, 2024.
U.S. Appl. No. 18/753,250, Anonymization in a Low Power Physical Asset Tracking System, Jun. 25, 2024.
U.S. Appl. No. 18/753,180, Packet Structure in a Low Power Physical Asset Tracking System, Jun. 25, 2024.
U.S. Appl. No. 18/747,336, Low Power Physical Asset Location Determination, Jun. 18, 2024.
U.S. Appl. No. 18/752,307, Dynamic Geofence Generation and Adjustment for Asset Tracking and Monitoring, Jun. 24, 2024.

(56) References Cited

OTHER PUBLICATIONS

U.S. Appl. No. 18/753,458, Providing Left-Behind Alerts Based on Real-Time Monitoring of Asset Groups, Jun. 25, 2024.
U.S. Appl. No. 18/753,571, Dynamic Geofence Management and Alerting for Asset Movement Monitoring, Jun. 25, 2024.
U.S. Appl. No. 18/753,948, Dynamic Asset Mismatch Detection and Notification, Jun. 25, 2024.

* cited by examiner

CONNECTION THROTTLING IN A LOW POWER PHYSICAL ASSET TRACKING SYSTEM

TECHNICAL FIELD

Implementations of the present disclosure relate to gateway devices, low power sensors, systems, and methods that allow for physical asset location tracking with improved power efficiency.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Tracking the location of unpowered assets can be important but presents several challenges as trackers often rely on battery power, which limits their ability to determine and report their locations frequently while also maintaining sufficient battery life.

SUMMARY

The systems, methods, and devices described herein each have several aspects, no single one of which is solely responsible for its desirable attributes. Without limiting the scope of this disclosure, several non-limiting features will now be described briefly.

Tracking assets such as equipment, shipping containers, pallets, trailers, and so forth can provide valuable information. For example, tracking can enable users to determine if an asset has been stolen, determine when an asset is moved, and so forth. Tracking can help users locate lost or misplaced items. For example, users may use a tracking system to determine the location of a piece of equipment on a construction site or the location of a package in a shipping facility or warehouse. However, tracking systems may be difficult to deploy in some situations. For example, object tracking devices that are battery powered, such as might be used to track unpowered objects or objects where connections to a power source are limited, may require frequent charging and/or replacement of the battery.

Reliance on batteries can significantly limit the functionality of object tracking devices. An object tracking device may contain GPS, WiFi, and/or cellular hardware that can be used to determine the location of an object and to report the location of the object to a Backend over a cellular network (e.g., an LTE network) and/or non-terrestrial network (e.g., a satellite connection). While this approach can provide location information, its functionality is limited because GPS and cellular operations require significant power and are often associated with additional expense. Thus, users of such an object tracking device choose between long battery life with limited information, or more information at the expense of significantly shorter battery life, which may necessitate frequent recharging or battery replacement. To achieve long battery life, an object tracking device may only determine and report a location periodically, for example once per day, twice per day, and so forth.

Disclosed herein are systems and methods that enable more efficient and frequent location updates regarding an asset through coordinated communications between a Peripheral (e.g., an asset tracking device) associated with an asset, and a less power restricted device (e.g., a vehicle gateway that is configured as a Central) that can at least temporarily communicate with the Peripheral, and that may be powered by the vehicle battery or another asset that can provide power (e.g., a trailer). In various implementations, the asset tracking device (e.g., the Peripheral) includes a low power Bluetooth (BLE) module that advertises (or broadcasts) information associated with the Peripheral, which information may be detected by a Central when the Peripheral is within BLE range of a Central (e.g., a vehicle gateway). The Centrals can receive the information from the Peripheral, and can communicate that information to a Backend, along with location information associated with the Centrals. Accordingly, the Backend can determine an approximate location of the asset via the association between the asset and the Peripheral, and the Peripheral and the Central (e.g., at the point in time at which the Peripheral was in range of the Central).

In various implementations, for example, an asset tracking device that is in a trailer may be in BLE range of a Gateway (e.g., a vehicle gateway) in a cab of the vehicle that is pulling the trailer. When in BLE range, if the asset tracking device includes GPS and/or LTE functionality (e.g., if it is an asset gateway), the GPS and/or LTE communications of the asset tracking device are suppressed (e.g., the asset gateway is configured to operate as a Peripheral) in favor of the vehicle tracking device indicating to a cloud server that the asset tracking device has the same location. This "ride along" technology extends battery life of the asset tracking device while also allowing more frequent location updates via the vehicle gateway, which derives its power from the vehicle and thus can determine and report location information with reduced concern for battery life. In some embodiments, the vehicle gateway and asset tracking device may maintain a continuous connection, while in other embodiments, the vehicle gateway and asset tracking device may connect periodically or may not establish a connection. In some embodiments, the vehicle gateway may operate in central mode (and referred to as a "Central" herein) and the asset tracking device may operate in peripheral mode (and referred to as a "Peripheral" herein), while in other embodiments, the vehicle gateway may operate in peripheral mode and the asset tracking device may operate in central mode. In some embodiments, other communication protocols (e.g., rather than BLE and LTE) may be used.

Various combinations of the above and below recited features, embodiments, and aspects are also disclosed and contemplated by the present disclosure.

Additional implementations of the disclosure are described below in reference to the appended claims and/or clauses, which may serve as an additional summary of the disclosure.

In various implementations, systems and/or computer systems are disclosed that comprise one or more computer readable storage mediums having program instructions embodied therewith, and one or more processors configured to execute the program instructions to cause the systems and/or computer systems to perform operations comprising one or more aspects of the above- and/or below-described implementations (including one or more aspects of the appended claims and/or clauses).

In various implementations, computer-implemented methods are disclosed in which, by one or more processors executing program instructions, one or more aspects of the above- and/or below-described implementations (including one or more aspects of the appended claims and/or clauses) are implemented and/or performed.

In various implementations, computer program products comprising one or more computer readable storage medium are disclosed, wherein the computer readable storage medium(s) has program instructions embodied therewith, the program instructions executable by one or more processors to cause the one or more processors to perform operations comprising one or more aspects of the above- and/or below-described implementations (including one or more aspects of the appended claims and/or clauses).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
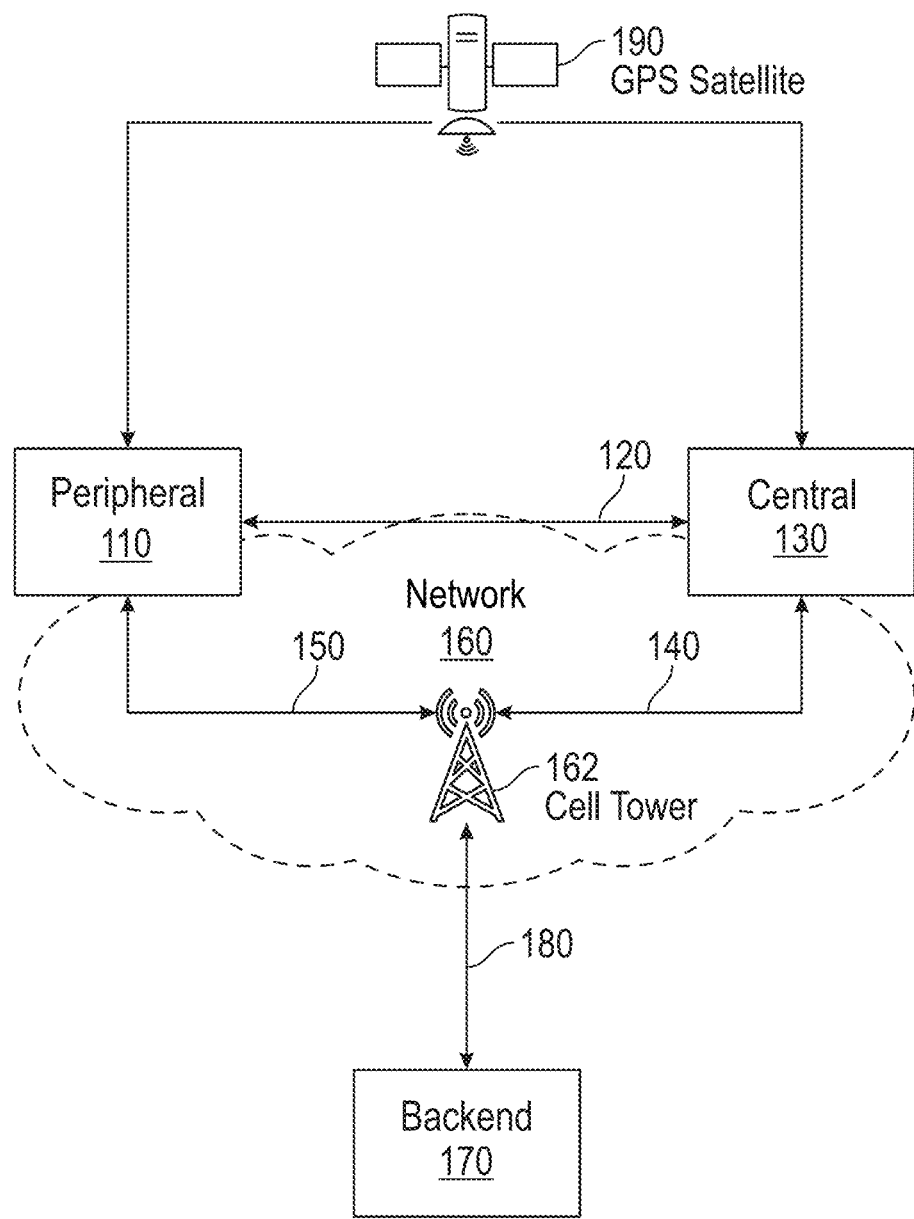
FIG. 1 is an example diagram showing location determination and communication, according to various implementations.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Backend (also referred to herein as "cloud," "backend server," "backend server system," and/or the like): one or more network-accessible servers configured to communicate with various devices, such as Centrals (including, for example, vehicle gateways, asset gateways, industrial gateways, and/or the like), Sensor Devices, and/or the like. For example, a Backend may be configured to communicate with multiple Gateways (e.g., vehicle gateways, asset gateways, and/or the like) associated with each of a fleet of hundreds, thousands, or more vehicles, assets, and/or the like. Similarly, a Backend may be configured to communicate with multiple Peripherals (e.g., asset tracking devices) attached to and/or corresponding to respective assets, vehicles, and/or the like. Additionally, a Backend may be configured to communicate with multiple Sensor Devices (e.g., data sources, information sources, and/or the like). Such communication between a Backend and Peripherals, and/or a Backend and Sensor Devices, may be provided via one or more Centrals (e.g., Gateways). Thus, the Backend may have context and perspective that individual devices (including Centrals, Peripherals, and Sensor Devices) do not have. With reference to vehicles, for example, the Backend may include data associated with a large quantity of vehicles, such as vehicles across a fleet or within a geographic area, which may be provided via various Centrals, Peripherals, and/or Sensor Devices. Thus, the Backend may perform analysis of vehicle/asset data across multiple vehicles and between groups of vehicles (e.g., comparison of fleets operated by different entities). A Backend may also include a feedback system that periodically updates event models used by Centrals, Peripherals, and/or Sensor Devices to provide immediate in-vehicle alerts, such as when the Backend has optimized an event model based on analysis of asset data associated with many safety events, potentially across multiple fleets of vehicles.

Sensor Device: an electronic device comprising one or more electronic components and configured to and/or capable of providing data and/or information (e.g., sensor data, sensed data, and/or the like). Sensor Devices may be positioned in or on a vehicle and/or asset, and may be configured to communicate with a Backend directly, and/or via a Gateway. A Sensor Device can include one or more sensors, and/or be configured to communicate with one or more sensors, such as one or more video sensors, audio sensors, accelerometers, global positioning systems (GPS), and the like, which may be housed in a single enclosure (e.g., a dashcam, a device housing, and/or the like) or multiple enclosures. A Sensor Device may include a single enclosure that houses multiple sensors as well as communication circuitry configured to transmit sensor data to a Backend and/or Gateway. Alternatively, a Sensor Device may include multiple enclosures that may variously house sensors, circuitry, communications elements, and/or the like. Examples of Sensor Devices include dashcams, which may be mounted on a front window of a vehicle. A Sensor Device (e.g., dashcam) may be configured to acquire various sensor data, such as from one or more cameras, and communicate sensor data to a vehicle gateway, which can include communication circuitry configured to communicate with the Backend. Sensor Devices can also include memory for storing software code that is usable to execute one or more event detection models, such as neural network or other artificial intelligence programming logic, that allow the Sensor Device to trigger events without communication with the Backend. In some implementations, Sensor Devices may be configured as Centrals, which generally indicates that a device is configured to scan or observe broadcasted packets from Peripherals, such as using BLE communications.

Gateway (also referred to herein as "gateway device," "vehicle gateway," "VG," "asset gateway," "AG," and/or the like): an electronic device comprising one or more electronic components and configured to obtain and/or receive data and/or information, and communicate the data and/or information to and/or from a Backend. Gateways can include, for example, vehicle gateways (or "VGs"), which may be Gateways associated with vehicles. Gateways can further include, for example, asset gateways (or "Ags"), which may be Gateways associated with assets (e.g., trailers, containers, equipment, towers, mobile assets, and/or the like (and just to name a few)). Gateways can be positioned in or on vehicles/ assets, and can be configured to communicate with one or more Sensor Devices, sensors, Peripherals, and/or the like. Gateways can further be configured to communicate with a Backend. Gateways, (e.g., a vehicle gateway) can be installed within a vehicle by coupling an interface of the vehicle gateway to an on-board diagnostic (OBD) port of the vehicle. Gateways may include short-range communication circuitry, such as near field communication ("NFC"), Bluetooth ("BT"), Bluetooth Low Energy ("BLE"), and/or the like, for communicating with sensors, Sensor Devices, Peripherals, and/or the like (which may, for example, be in a vehicle and/or other devices that are in proximity to the vehicle (e.g., outside of the vehicle)). Gateways can further include GPS receivers for determining a location of the Gateway. Gateways can further include cellular and/or WiFi radios for communicating with a Backend. In some implementations, a cellular and/or WiFi radio may be used to approximate the location of a Gateway. Gateways may be configured as Centrals, which generally indicates that the Gateway is configured to scan, observe, and/or receive broadcasted packets from Peripherals, such as using BLE communications, and provide such Peripheral information to a Backend. Gateways may, in some implementations, be configured to functional as Peripherals, which generally indicates that the Gateway is configured to suppress location determinations via GPS, and communications via LTE and/ or WiFi, in favor of simpler communications with a Central via short-range communications (e.g., via BLE), as described herein.

Central: any electronic device, such as a Gateway, Sensor Device, mobile device, and/or the like, and/or functionality, that is configured to detect short-range communications (e.g., BLE advertisements/broadcasts) from Peripherals. As used herein, the term "Central" may refer to the communication functionality of a device (e.g., the BLE communication functionality) or the term "Central" may refer to the device containing the BLE communication functionality. Thus, a Central may refer to a Gateway, Sensor Device, mobile device, and/or any other device that is configured with functionality to scan, observe, and/or receive broadcasted packets from Peripherals. Further, these Centrals (e.g., Gateways of various types) are also configured to communicate with a Backend. Centrals further include functionality for determining a location of the Central (e.g., GPS receiver, cellular radio, WiFi, and/or the like), which location can be communicated, e.g., to a Backend. A location of a Central can also be determined and/or specified by a user (e.g., via user-entered location/GPS pinning) or another system. Such alternative location determination may be useful for indoor/poor GPS signal locations.

Peripheral (also referred to herein as "asset tracking device," "object tracking device," and/or the like): any electronic device configured to be positioned in, on, near, and/or in association with, an asset, vehicle, and/or the like, and which is configured to communicate with Centrals (e.g., Gateways) via short-range communications (e.g., BLE). A Peripheral may include short-range communication circuitry, such as near field communication ("NFC"), Bluetooth ("BT"), Bluetooth Low Energy ("BLE"), and/or the like, for communicating information to Centrals. Typically, a Peripheral is a dedicated, relatively simple electronic device which includes short-range communication circuitry, but not other communications circuitry, such as Wi-Fi or cellular radio. For example, in various implementations, the communications circuitry of a Peripheral may include only BLE-related communications circuitry. In some implementations, and as described herein, a more complicated device, such as a Gateway (e.g., an asset gateway), may function as a Peripheral. For example, an asset gateway may be configurable to operate in a peripheral mode in which location determinations via GPS, and communications via LTE and/or WiFi, are suppressed in favor of simpler communications with a Central via short-range communications (e.g., via BLE). Accordingly, a device, when operating as a Peripheral, will utilize only functionality as if it were a dedicated Peripheral device. As described herein, Peripherals may advantageously require significantly less power to operate (as compared to, for example, a Gateway under normal operations) and may therefore have extended battery life for an equivalent sized battery. In general, a Peripheral communicates a limited amount of information, including an identification of the Peripheral, via advertisements, to Centrals (as further described herein). Advertisements transmitted by Peripherals may also be referred to herein as "Bluetooth advertisements," "Bluetooth broadcasts," "BLE advertisements," "BLE broadcasts," "peripheral communications," "peripheral broadcasting packets," "broadcasted packets," "broadcast packets," "peripheral broadcasts," "broadcasts," and/or the like).

Data Store: Any computer readable storage medium and/or device (or collection of data storage mediums and/or devices). Examples of data stores include, but are not limited to, optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, and/or the like), non-relational databases (e.g., NoSQL databases, and/or the like), in-memory databases, spreadsheets, comma separated values (CSV) files, Extensible Markup Language (XML) files, text (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments, such data may be combined and/or separated in any appropriate way into one or more databases, one or more tables of one or more databases, and/or the like. As used herein, a data source may refer to a table in a relational database, for example.

Example Ride Along Features and Functionality

FIG. 1 is an example diagram showing location determination and communication according to some embodiments. A Peripheral 110 and a vehicle gateway 130 (e.g., configured as a Central) are configured to determine location from GPS satellite 190 (which may be a plurality of satellites). The Peripheral 110 and the vehicle gateway 130 can communicate with a Backend 170 over a wireless connection (e.g., wireless connection 140 and/or wireless connection 150) via a network 160, which may include any combination of one or more networks, such as a LAN, WAN, PAN, the Internet, and/or the like. In the example of FIG. 1, the network 160 includes cellular tower 162 and/or other network access points (e.g., a Wi-Fi network) that provide communications with the Backend 170 (e.g., via network connection 180). The Peripheral 110 and the vehicle gateway 130 can be communicatively coupled via a wireless connection 120, which may be, for example, a BLE connection or other connection suitable for lower power communications. The Peripheral 110 and the vehicle gateway 130 may make determinations about location reporting based at least in part on the presence or absence of the wireless connection 120. For example, if the wireless connection 120 is present, the Peripheral may not determine and report its own location, and the vehicle gateway 130 may report its own location as the location of the Peripheral 110. In some embodiments, the vehicle gateway 130 can report a received signal strength indicator ("RSSI") for the wireless connection 120 (e.g., a measurement of the power of the signal received from the Peripheral 110). In some embodiments, the vehicle gateway 130 can report an estimated distance between the vehicle gateway 130 and the Peripheral 110, for example as determined based on the received signal strength indicator. If the wireless connection 120 is not present, then the Peripheral 110 and the vehicle gateway 130 may separately determine and report their own locations independently of one another.

Figure 2:
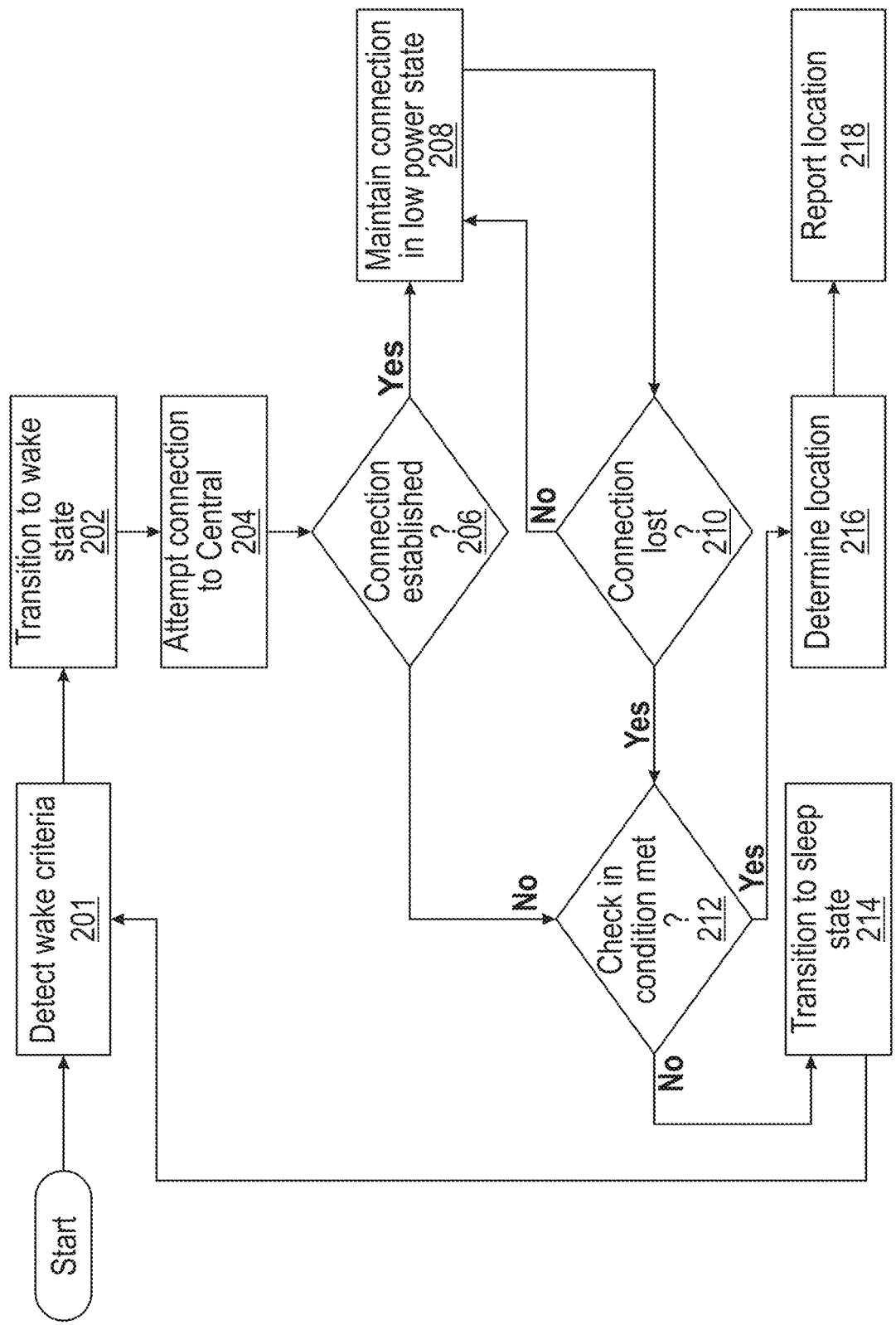
FIG. 2 is a flowchart illustrating an example process for low power location determination which may be executed on a Peripheral, according to various implementations.

FIG. 2 is a flowchart illustrating an example process for low power location determination which may be executed on a Peripheral according to some embodiments. Depending on the embodiment, the process of FIG. 2 may include fewer or additional blocks and/or blocks may be performed in an order different than is illustrated.

In FIG. 2, a Peripheral detects wake criteria at block 201 and transitions from a sleep state to a wake state at block 202. For example, a Peripheral may move to a wake state in response to passage of a predetermined time since last awake, passage of a predetermined time since last determining a location using an on-board GPS receiver, a predetermined value of one or more sensors (e.g., accelerometer, gyroscope, magnetometer, and/or the like) of the Peripheral (e.g., waking in response to motion), and/or detection of a signal from a vehicle gateway.

Next, at block 204, the Peripheral attempts to locate and connect to a vehicle gateway, such as via a low power communication protocol such as Bluetooth Low Energy (BLE). For example, the Peripheral can broadcast a signal indicating its presence, and upon receiving said signal, the vehicle gateway can send a request to connect to the Peripheral. At decision 206, if the Peripheral established a connection to the vehicle gateway, the Peripheral may maintain the connection to the vehicle gateway in a low power state at block 208 and may monitor the connection. Maintaining a connection does not necessarily require continuous communication between devices, but may include periodic (e.g., every minute, five minutes, twenty minutes, hour, six hours, and/or the like) communications between the devices. In some embodiments, maintaining a connection comprises the vehicle gateway transmitting a ping signal to the Peripheral, which requires minimal power for the Peripheral to respond. In some embodiments, maintaining a connection comprises the Peripheral transmitting a ping single to the vehicle gateway and receiving a response. In some embodiments, communication can be one-way, for example from the Peripheral to the vehicle gateway. In some embodiments, communication can include an advertisement/broadcast from the Peripheral. In some embodiments, communication can include a scan response from the vehicle gateway. In some embodiments, when the Peripheral is in a low-power state, battery power may be reserved for maintaining the BLE connection with the vehicle gateway, while eliminating power consumption to all other components of the Peripheral (e.g., GPS receivers, cellular transceivers, Wi-Fi transceivers, and so forth).

If the connection is lost at decision 210, the Peripheral may determine if a check in condition has been met at decision 212. The check in condition may be, for example, a time since last check in to a Backend, a wake reason (e.g., motion), and so forth. If no check in condition has been met, the Peripheral may transition to a sleep state at block 214 and may remain in the sleep state until detecting wake criteria at block 201. If a check in condition has been met, the Peripheral may, at block 216, determine a location of the Peripheral (e.g., using GPS) and at block 218 may transmit the location to a Backend, for example over a cellular connection.

Figure 3:
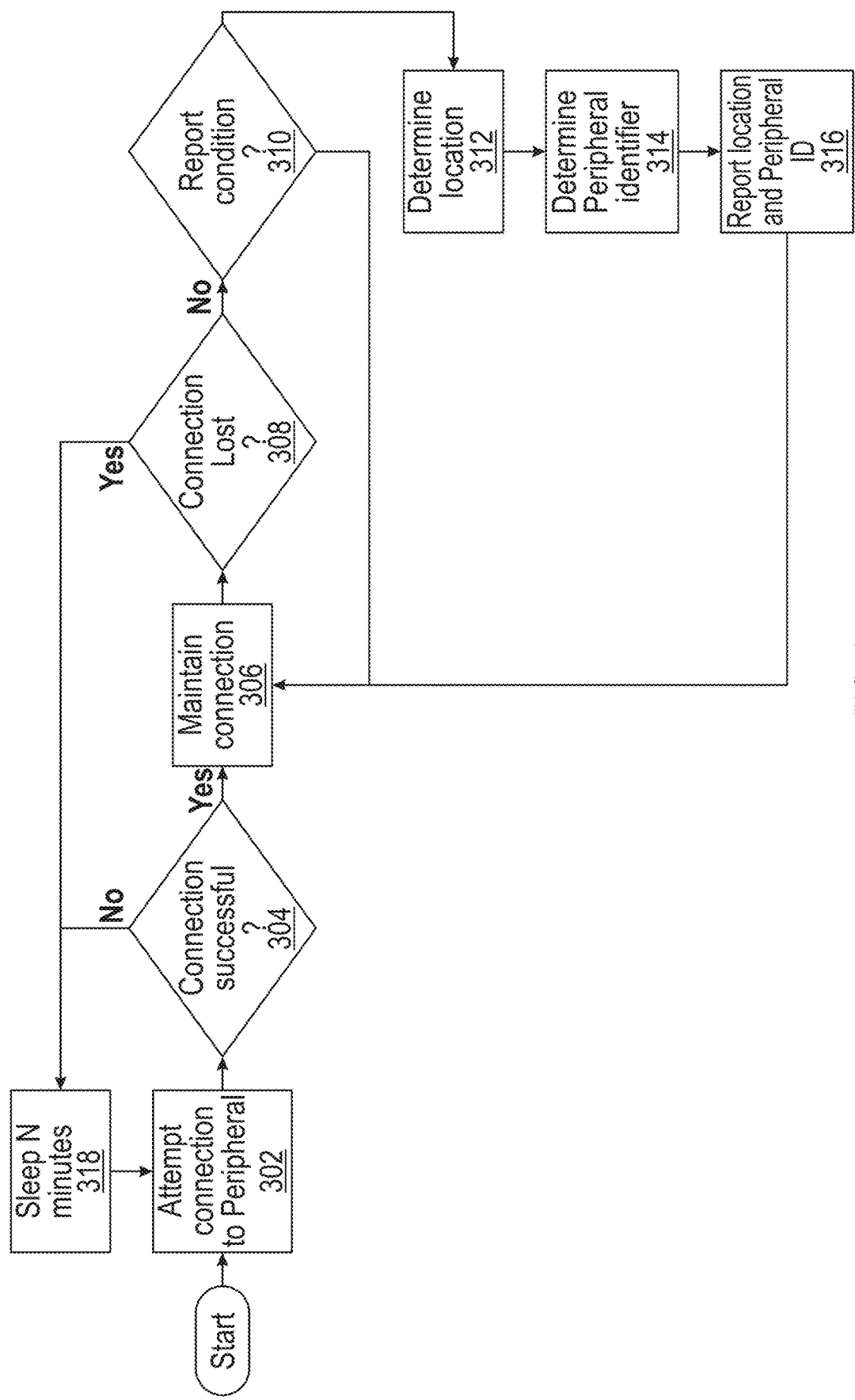
FIG. 3 is a flowchart illustrating an example process for low power location determination which may be executed on a vehicle gateway, according to various implementations.

FIG. 3 is a flowchart illustrating an example process for low power location determination that may be executed on a vehicle gateway according to some embodiments. Depending on the embodiment, the process of FIG. 3 may include fewer or additional blocks and/or the blocks may be performed in an order different than is illustrated.

Beginning at block 302, the vehicle gateway may attempt to connect to a Peripheral. At decision 304, if the connection was not successful, the vehicle gateway may, at block 318, wait for a threshold period of time before attempting to connect again. If the connection was successful, the vehicle gateway may at block 306 maintain the connection (e.g., through periodic communications with the Peripheral). At decision 308, if the connection is lost (e.g., a response from the Peripheral is not received in response to a periodic ping), the vehicle gateway may, at block 318, wait for a threshold period of time before attempting to reconnect. The wait time may vary depending on, for example, whether the vehicle gateway was unable to connect at all or was able to connect but lost the connection to the Peripheral. If the connection to the Peripheral has not been lost, at block 310, the vehicle gateway may determine if a vehicle gateway location reporting status indicates a reporting condition has been met, such as motion (e.g., the vehicle gateway is currently moving, such as based on accelerometer data, gyroscope data, and/or magnetometer data). In some embodiments, the vehicle gateway may be configured to report the Peripheral location continuously or any time the vehicle gateway would otherwise be sending its location to a cloud server (e.g., the Backend of FIG. 1). In some embodiments, a report condition is triggered at a predefined time period since the last self-reported location from the Peripheral was transmitted to the cloud (e.g., block 316). If a report condition has been met, the vehicle gateway may, at block 312, determine its location (e.g., geolocation using GPS) and, at block 314 determine a Peripheral identifier associated with the Peripheral. The vehicle gateway may, at block 316, report the determined location of the vehicle gateway along with the Peripheral identifier to the Backend, thereby allowing the Backend to use the vehicle gateway's location as a proxy for location of the Peripheral, without the Peripheral itself having to consume power to determine and transmit (e.g., via cellular communication) its own location.

Figure 4:
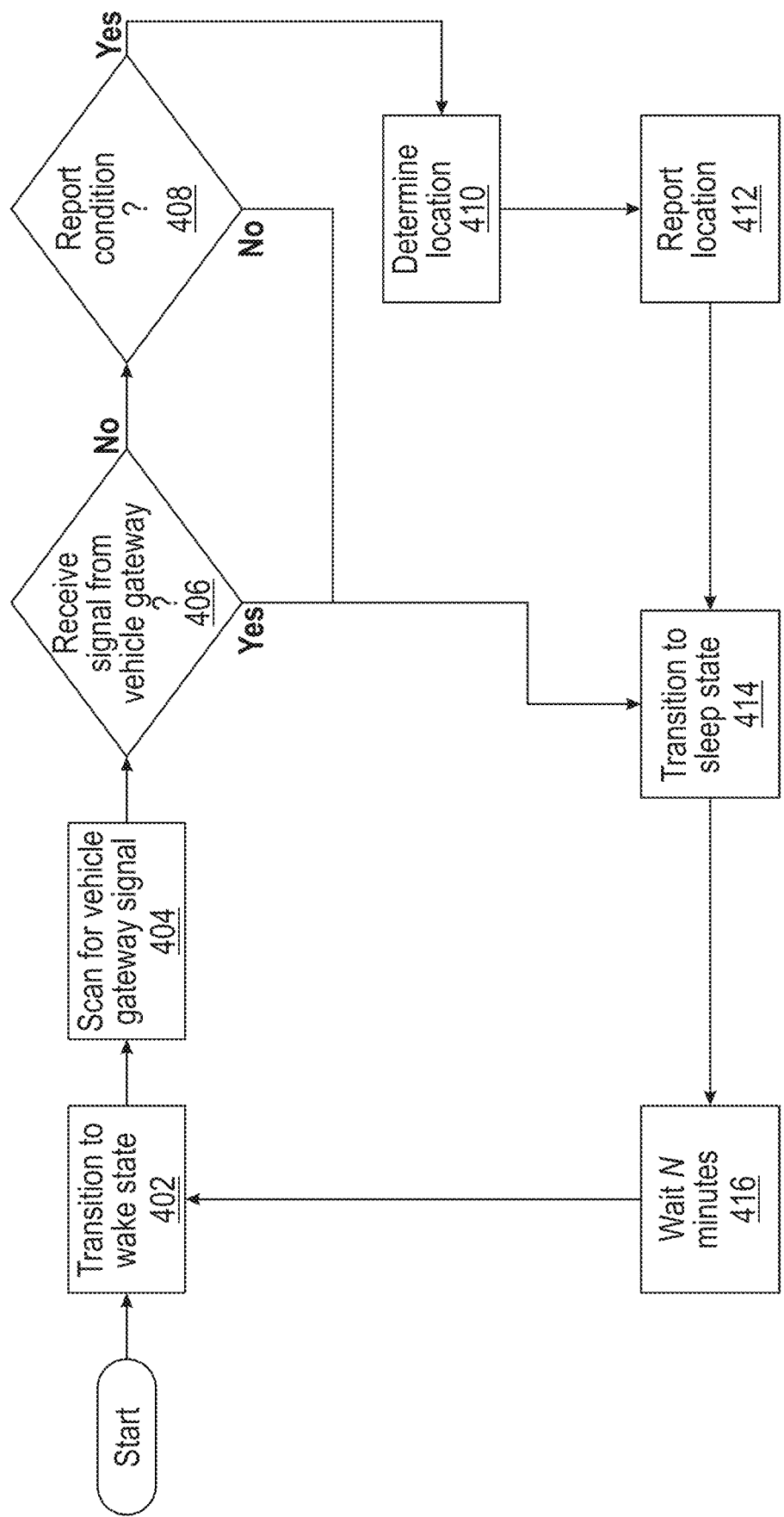
FIG. 4 is a flowchart illustrating another example process for low power location determination that may be executed on a Periphera,l according to various implementations.

FIG. 4 is a flowchart illustrating another example process for low power location determination that may be executed on a Peripheral according to some embodiments. Depending on the embodiment, the process of FIG. 4 may include fewer or additional blocks and/or the blocks may be performed in an order different than is illustrated.

Beginning at block 402, the Peripheral may transition to a wake state. At block 404, the Peripheral may scan for a vehicle gateway signal. At decision 406, if the Peripheral received a signal from the vehicle gateway, the Peripheral may, at block 414, transition to a sleep state and may, at block 416, remain in the sleep state for a threshold period of time or until a condition triggers scanning for a vehicle gateway signal. In some embodiments, the Peripheral and vehicle gateway may not connect to one another. For example, the detection can be based on the presence of a signal from the vehicle gateway and does not require two-way communication between the Peripheral and the vehicle gateway. If, at decision 406, the Peripheral did not detect a vehicle gateway, the Peripheral may, at decision 408, determine if a reporting condition has been met. If a reporting condition has not been met, the Peripheral may transition to a sleep state at block 414 and may remain in the sleep state for a threshold period of time at block 416. If a reporting condition has been met, the Peripheral may, at block 410, determine its location (e.g., using GPS) and at block 412 may report its location to a cloud server (e.g., the Backend of FIG. 1) over a network connection (e.g., over a cellular connection) and at block 414, may transition to a sleep state and may remain, at block 416, in the sleep state for a predetermined threshold period of time.

Figure 5A:
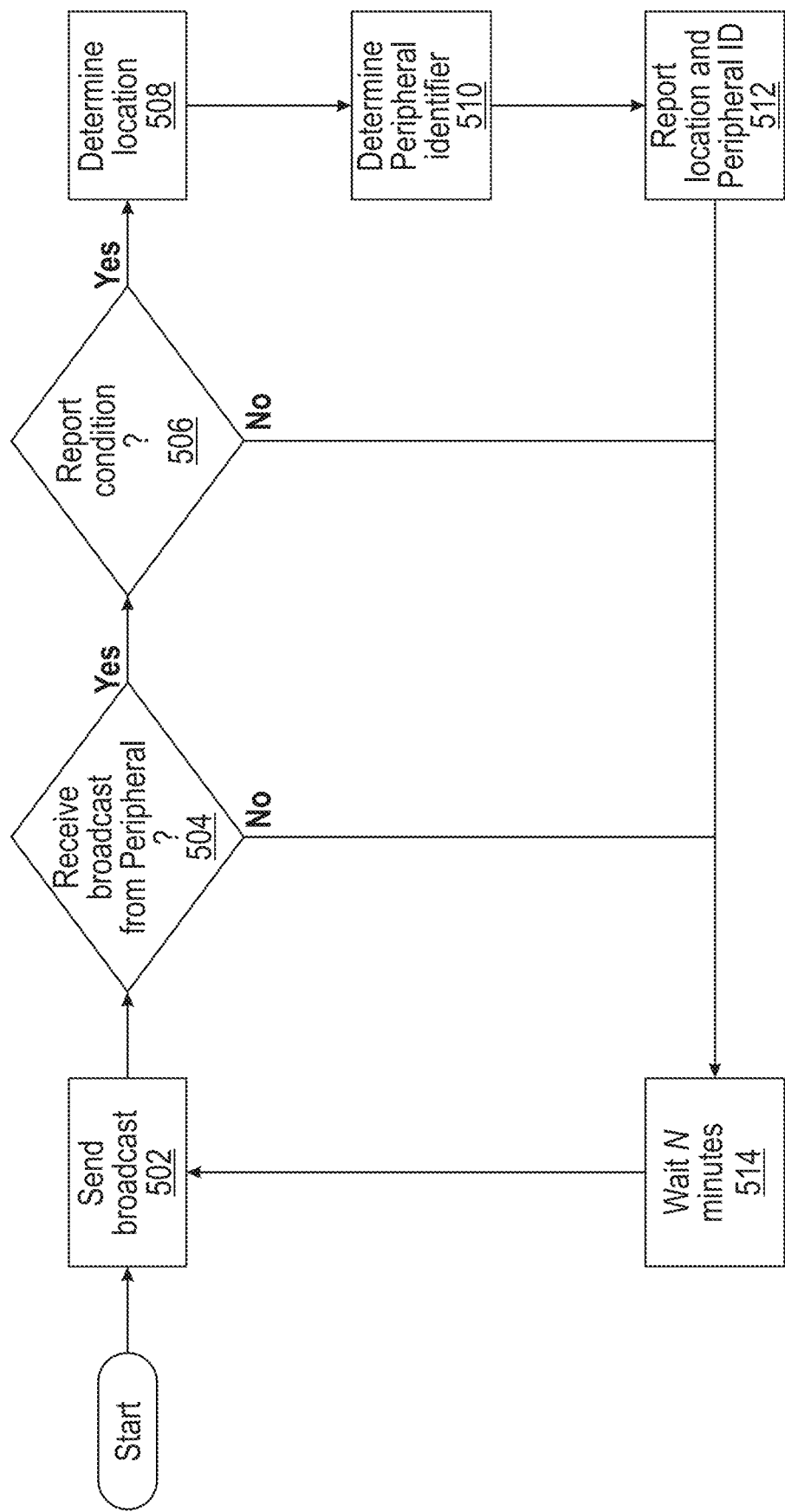
FIG. 5A is a flowchart illustrating another example process for low power location determination that may be executed on a vehicle gateway, according to various implementations.

FIG. 5A is a flowchart illustrating another example process for low power location determination that may be executed on a vehicle gateway (or other Central), and/or a Peripheral, according to various embodiments. Depending on the embodiment, the process of FIG. 5A, the vehicle gateway may operate over BLE in peripheral mode, although other configurations are possible, for example the vehicle gateway may operate in central mode and an asset gateway (or other Peripheral) may operate in peripheral mode.

Beginning at block 502, the vehicle gateway may send or broadcast an advertisement/broadcast (e.g., a packet of data). At decision 504, the vehicle gateway may determine if it has received information from a Peripheral (e.g., an asset gateway operating in peripheral mode). If the vehicle gateway has not received information from the Peripheral, the vehicle gateway may, at block 514, wait for a threshold period of time before trying again. Alternatively, the Peripheral may wait a threshold period of time before again broadcasting. If the vehicle gateway has received information from a Peripheral, the vehicle gateway may, at block 506, determine if a reporting condition has been met. If a reporting condition has not been met, the vehicle gateway may, at block 514, wait for a threshold period of time. If a reporting condition has been met, the vehicle gateway may determine a location and a Peripheral identifier at blocks 508 and 510, and may report the location and the Peripheral identifier to a cloud server (e.g., the Backend of FIG. 1) over a network connection (e.g., over a cellular connection, satellite connection, or Wi-Fi connection) at block 512.

Figure 5B:
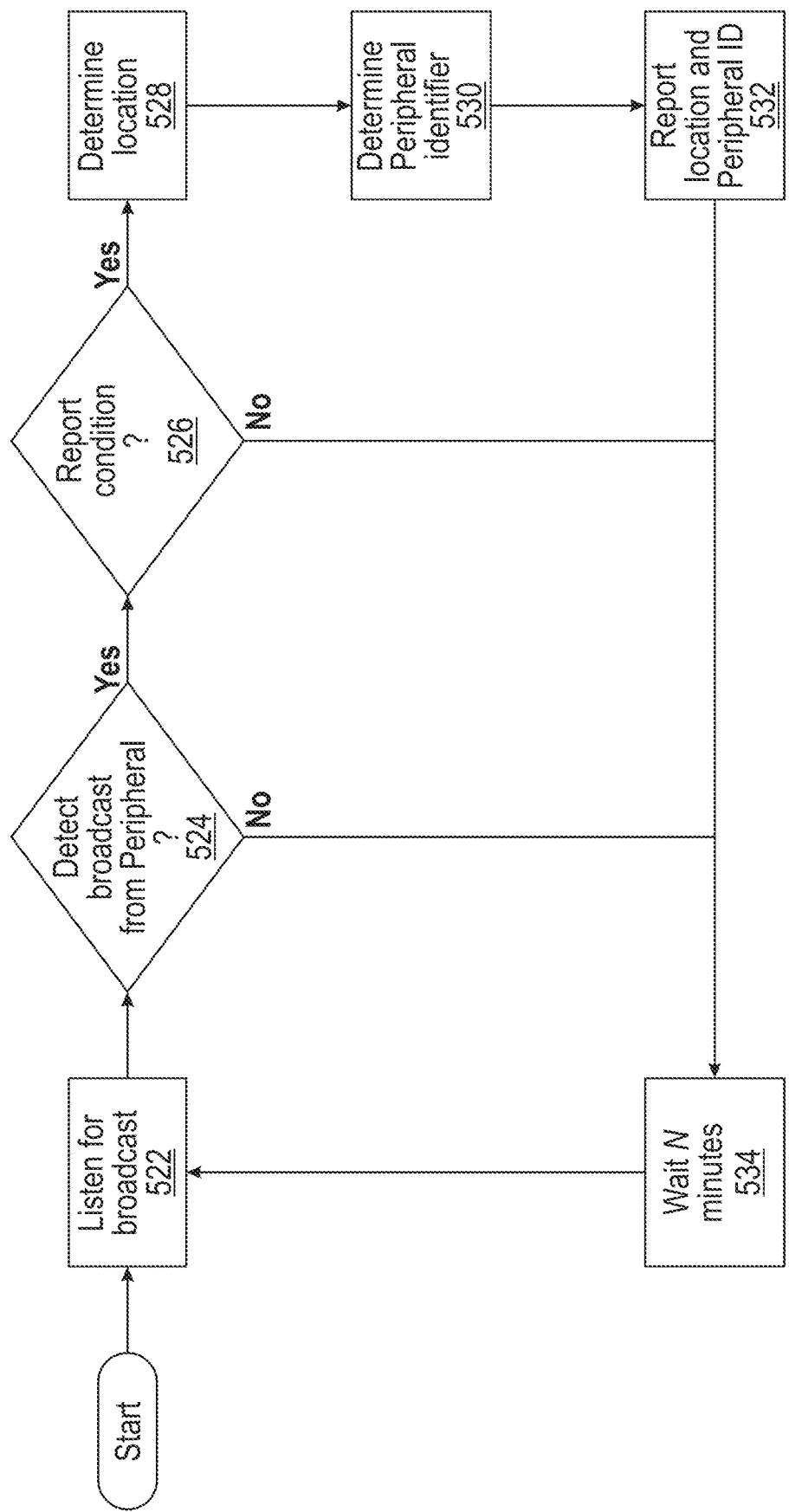
FIG. 5B is a flowchart illustrating another example process for low power location determination that may be executed on a vehicle gateway, according to various implementations.

FIG. 5B is a flowchart illustrating another example process for low power location determination according to some embodiments. Unlike the process depicted in FIG. 5A, in FIG. 5B the Peripheral can operate in peripheral mode and the vehicle gateway can operate in central mode. It will be appreciated that in some embodiments, Peripherals and vehicle gateways can be configured to operate in either peripheral or central mode. For example, in some embodiments, users may configure a Peripheral or vehicle gateway to operate in either mode.

Beginning at block 522, the vehicle gateway can listen for an advertisement/broadcast from the Peripheral (e.g., an asset gateway in peripheral mode, and/or another Peripheral). At decision 524, the vehicle gateway determine if it has received a broadcast from the Peripheral. If the vehicle gateway has not received a broadcast from the Peripheral, the vehicle gateway can, at block 534, wait for a threshold period of time before listening for a broadcast again. In some embodiments, the vehicle gateway may continuously listen for a broadcast from the Peripheral. That is, block 534 can be skipped in some embodiments, and the process can proceed directly from decision 524 to block 522 if a broadcast is not detected by the vehicle gateway. As mentioned above, in various implementations, the Peripheral may wait a threshold period of time before again broadcasting. If the vehicle gateway has detected a broadcast from the Peripheral, then at decision 526, the vehicle gateway can determine if a report condition is met. If a reporting condition has not been met, the vehicle gateway can wait for a threshold period of time at block 534 and then proceed to block 522. If a reporting conditioning has been met, the vehicle gateway can, at block 528, determine a location of the vehicle gateway, for example using GPS, nearby Wi-Fi access points, nearby cellular towers, and so forth. At block 530, the vehicle gateway can determine an identifier of the Peripheral, for example based on the broadcast received from the Peripheral. At block 532, the vehicle gateway can report the location and identifier of the Peripheral to a cloud server (e.g., the Backend of FIG. 1) over a network connection (e.g., over a cellular, satellite, or Wi-Fi connection).

Figure 6:
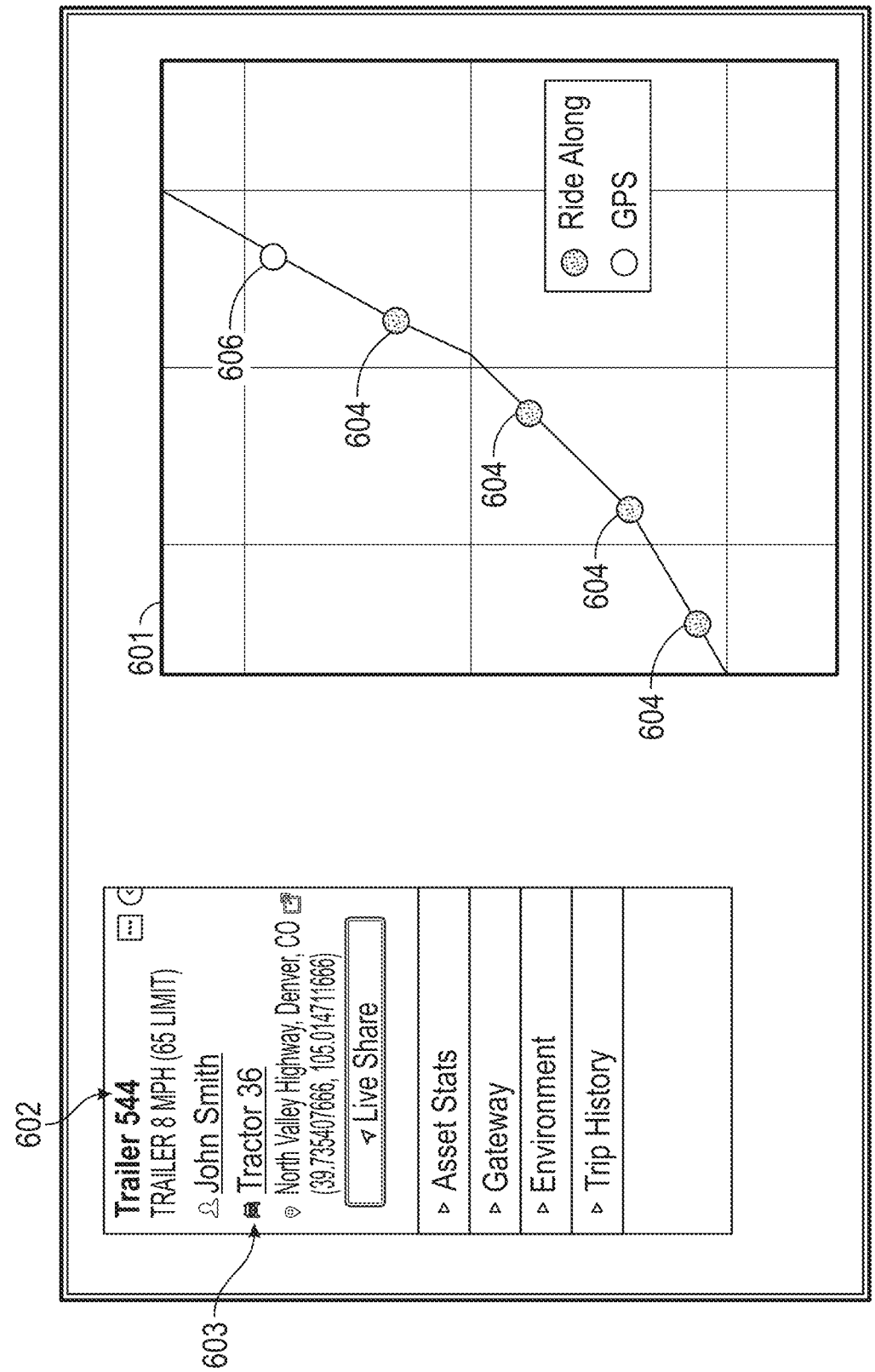
FIG. 6 is an example user interface for tracking asset locations, according to various implementations.

FIG. 6 is an example user interface for tracking asset locations according to some embodiments. For example, the user interface may be provided to a fleet administrator, project manager, manager, and/or the like, having an interest in tracking location of assets with associated Peripherals. For example, user interface may be provided on a user device (e.g., mobile phone, tablet, laptop, desktop, and/or the like) via network communications connection to the Backend 170.

In the example of FIG. 6, the user interface provides location tracking information for a single asset (e.g., a trailer), but multiple asset locations may be included in the user interface. The user interface may include a map 601 that depicts that location history of the asset. The map may provide an indication of how the location was determined (e.g., using the Peripheral's on-board GPS (if present) or using ride along mode (e.g., location of a vehicle gateway that is moving in conjunction with the Peripheral)). For example. The user interface in FIG. 6 shows that Peripheral locations 604 are based on ride along locations of a vehicle gateway, while location 606 is based on a GPS location determined by the Peripheral itself.

In the example of FIG. 6, the user interface includes an asset identifier 602 and an identifier of the current vehicle gateway 603. In some embodiments, the user interface may include additional information. For example, the user interface may include a table that shows which vehicle gateway the Peripheral was connected to at different times/locations. Hovering over a point on the map may provide more information, such as timestamps, vehicle gateway ID, and so forth.

In the above description, ride along location tracking does not necessarily associate the Peripheral and the vehicle gateway with each other. In some cases, a Peripheral and vehicle gateway may be unable to maintain a connection, broadcast advertisements/broadcasts, receive advertisements/broadcasts, and/or the like. For example, radio frequency interference may prevent connection, a battery of a Peripheral may need to be replaced or recharged, and so forth. In some embodiments, a Backend can be configured to enable association of a Peripheral and a vehicle gateway. For example, a vehicle gateway can be disposed in or on a tractor and a Peripheral can be disposed in or on a trailer, in or on an asset inside a trailer, and so forth. The trailer may be coupled to the tractor. In some embodiments, location data reported by the vehicle gateway may be used as the location of the associated Peripheral even if a connection between the vehicle gateway and Peripheral cannot be established. In some embodiments, a Backend may be configured to limit the time such tracking may be enabled. In some embodiments, a user may be able to configure a time limit for such tracking. In some embodiments, other conditions may additionally or alternatively be used to determine if the location of the vehicle gateway should be used as the location of the associated Peripheral. For example, a limit can be based on a distance traveled, which may, in some embodiments, be configurable by a user (e.g., a longer distance may be permitted for long haul highway trips, while shorter distances may be permitted for local deliveries, job sites, and/or the like) Imposing conditions on the association can be significant for several reasons. For example, while a connection may be lost temporarily because of a lack of power, interference, and/or the like, a connection may also be lost because an asset has been lost or stolen or is otherwise no longer co-located with the vehicle gateway.

Figure 7:
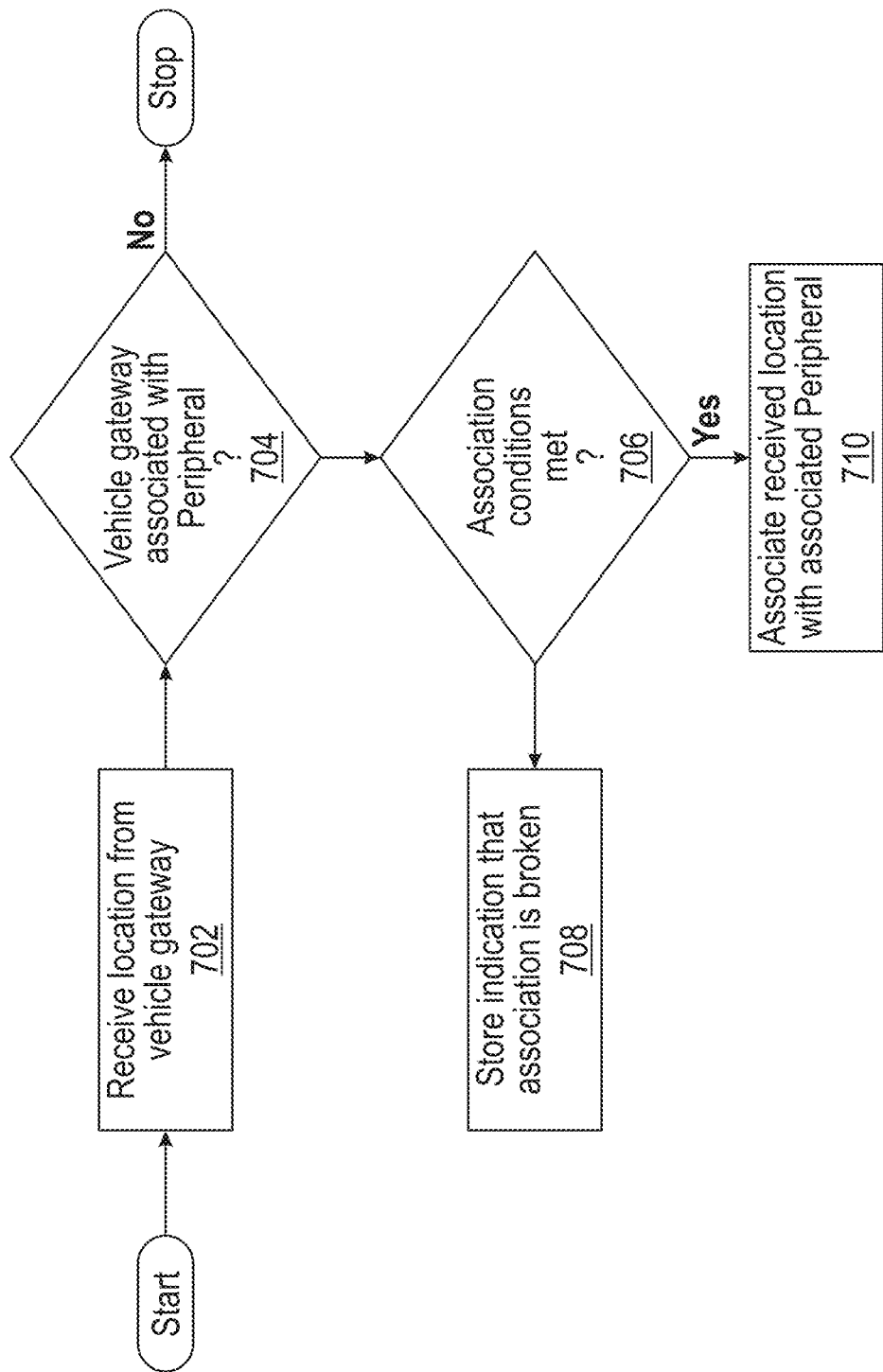
FIG. 7 illustrates an example of a process that can be executed on a Backend, according to various implementations.

FIG. 7 illustrates an example of a process of detecting Peripheral locations based on an association with a vehicle gateway. The process of FIG. 7 may be executed on a Backend according to some embodiments. Depending on the embodiment, the method of FIG. 7 may include fewer or additional blocks and the blocks may be performed in an order that is different than illustrated.

In FIG. 7, at block 702, the Backend can receive location information from a vehicle gateway. At decision point 704, the Backend can determine if the vehicle gateway is associated with a Peripheral (e.g., an asset gateway in peripheral mode, and/or another Peripheral), for example by querying a database. If not, the process can stop. At decision point 706, the Backend can determine if one or more association conditions (e.g., time, distance, and/or the like) are met. If not, at block 708 the Backend can store an indication that the association between the Peripheral and the vehicle gateway is broken. The indication may be used to, for example, alert a user that the association is broken. If the association conditions are met, at block 710 the Backend can associate the received location of the vehicle gateway with the associated Peripheral.

The preceding discussion focuses on embodiments in which a Peripheral is in communication with a Central (e.g., a vehicle gateway). In some embodiments, a Peripheral can be in communication with multiple Centrals or other devices that can be used to report the location of the Peripheral. In some embodiments, a Peripheral can be in communication with one or more other Peripherals. In some embodiments, a smartphone or other device can be a gateway. In some embodiments, a smartphone can be associated with a particular driver.

Associating a Peripheral and a smartphone (or other device that is commonly carried by the user, such as a security tag) can have several advantages. For example, it can be possible to know which individual is associated with assets (e.g., tools, equipment, cargo, and/or the like) on a particular day. The associated individual may change from day to day. For example, a particular individual may have the day off, may only complete a portion of a trip, and/or the like. In some embodiments, a smartphone app, web site, or the like may be used to aid the associated individual in ensuring that all assets are accounted for. For example, a driver taking equipment, cargo, and/or the like, to another location may check that they have loaded all the expected assets before departing a warehouse or other location. In some embodiments, a driver or other individual may ensure that all assets have been reloaded onto a truck at the end of the day.

Figure 8:
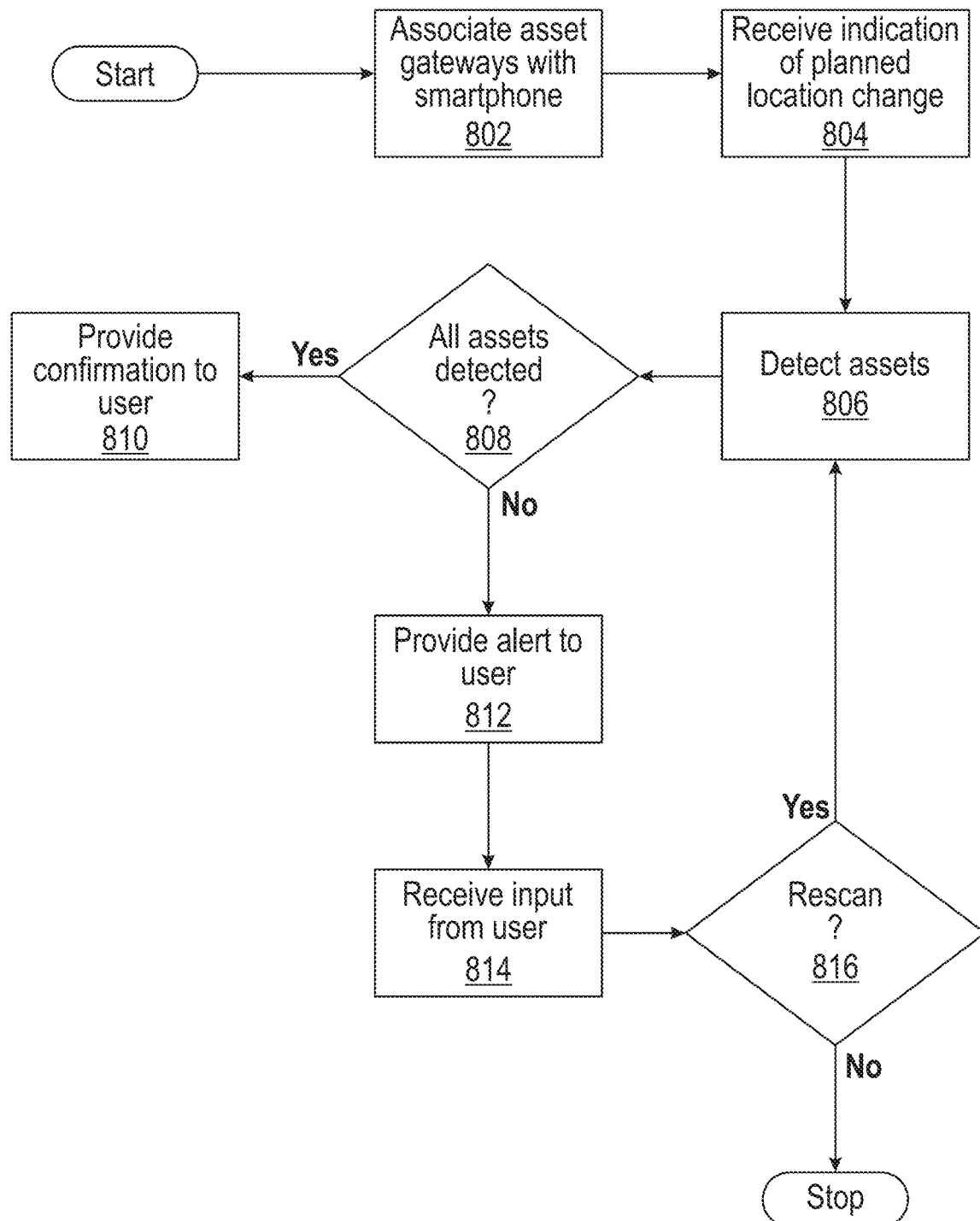
FIG. 8 is a flowchart illustrating an example process, according to various implementations.

FIG. 8 is a flowchart that illustrates an example process of associating a Peripheral with an electronic device of a user. The process depicted in FIG. 8 can be carried out on a Backend and/or on a smartphone or other electronic device. Depending on the embodiment, the method of FIG. 8 may include fewer or additional blocks and the blocks may be performed in an order that is different than illustrated.

Beginning at block 802, Peripherals can be associated with a smartphone (or other suitable device). For example, a user may access an app or web site to associate Peripherals with the smartphone. At block 804, the Backend or app can receive an indication of a planned location change. For example, a user may access an app or web site and indicate that they are preparing to leave a location. Alternatively or additionally, a user may not provide such an indication, and the web site or app may instead provide an interface indicating which Peripherals have been detected and which are unaccounted for. At block 806, the smartphone or other device may detect nearby assets. At decision point 808, the Backend and/or the smartphone or other device may determine if all associated assets have been detected. If so, at block 810, an indication that all assets have been detected may be provided to a user. For example, a web site or app may show a notification or otherwise inform a user that all assets have been detected. If not all assets have been detected, the app or web site may provide an indication to the user that one or more assets are missing at block 812. At block 814, the user may provide input. For example, the user may indicate that one or more assets have been lost, damaged, stolen, that a Peripheral is inoperable (e.g., due to a lack of power), and so forth. At decision point 816, the user may provide an indication (e.g., via an app or web site) to rescan for Peripherals. If the user requests a rescan, the process can proceed to block 806 and detect nearby Peripherals again. If the user elects not to rescan, the process can stop.

In some cases, a Peripheral may communicate only with other devices that are associated with the same organization. For example, a trucking company may have a number of vehicle gateways, Peripherals, and/or the like, and the gateways may communicate with one another but may not communicate with vehicle gateways, Peripherals, and/or the like, associated with different companies or organizations.

In some cases, it can be advantageous for a gateway to communicate with gateways associated with other organizations. For example, a construction company may use Peripherals to track equipment at a job site. While the equipment is at the job site, the Peripherals may communicate with other gateways such as vehicle gateways, smartphones, and/or other gateways associated with the construction company. However, if the equipment is lost or stolen, it may be relocated to a location where the construction company does not have other infrastructure. Depending on the Peripheral, the construction company may have limited or no tracking capability. For example, if the Peripheral has on-board GPS, cellular, Wi-Fi, and/or the like, if the needed communication infrastructure is within rage of the Peripheral (e.g., a Wi-Fi hotspot is within range of a gateway with a Wi-Fi radio), the Peripheral may report its location on an intermittent basis, for example once per day, twice per day, three times per day, four times per day, and/or the like. In some cases, a Peripheral may lack a cellular radio, Wi-Fi radio, or both. In such cases, the Peripheral may not be able to report its location or may only be able to report its location on an intermittent or sporadic basis. For example, if a Peripheral has a Wi-Fi radio but not a cellular radio, the Peripheral may only be able to report its location when in range of a known Wi-Fi access point and/or when near an open Wi-Fi access point. Even if the Peripheral has a cellular radio, it may still be preferable to rely on other communications interfaces (e.g., Bluetooth, BLE) for location reporting in order to reduce power consumption by an on-board GPS receiver, cellular radio, and/or the like. Thus, it can be beneficial to carry out low power location determination as described herein even when a Peripheral is not located near another gateway associated with the same organization as the Peripheral.

In some cases, an organization may wish to allow its gateways or other infrastructure to be used to report location information for gateways that are not associated with the organization. In some cases, an organization may not want to allow its gateways or other infrastructure to be used for location reporting for gateways outside the organization. In some embodiments, organizations may opt in to sharing location data with other organizations. In some embodiments, organizations may be opted in by default and may opt out of sharing location data with other organizations. In some embodiments, organizations may be able to select or exclude sharing with particular other organizations, types of organizations, uses of the location data, and/or other criteria. For example, a company may wish to allow sharing with emergency services, with companies in other industries, and/or the like, but may not wish to allow sharing with competitors (e.g., specifically named competitors and/or based on types of business that are considered competitors).

Figure 9A:
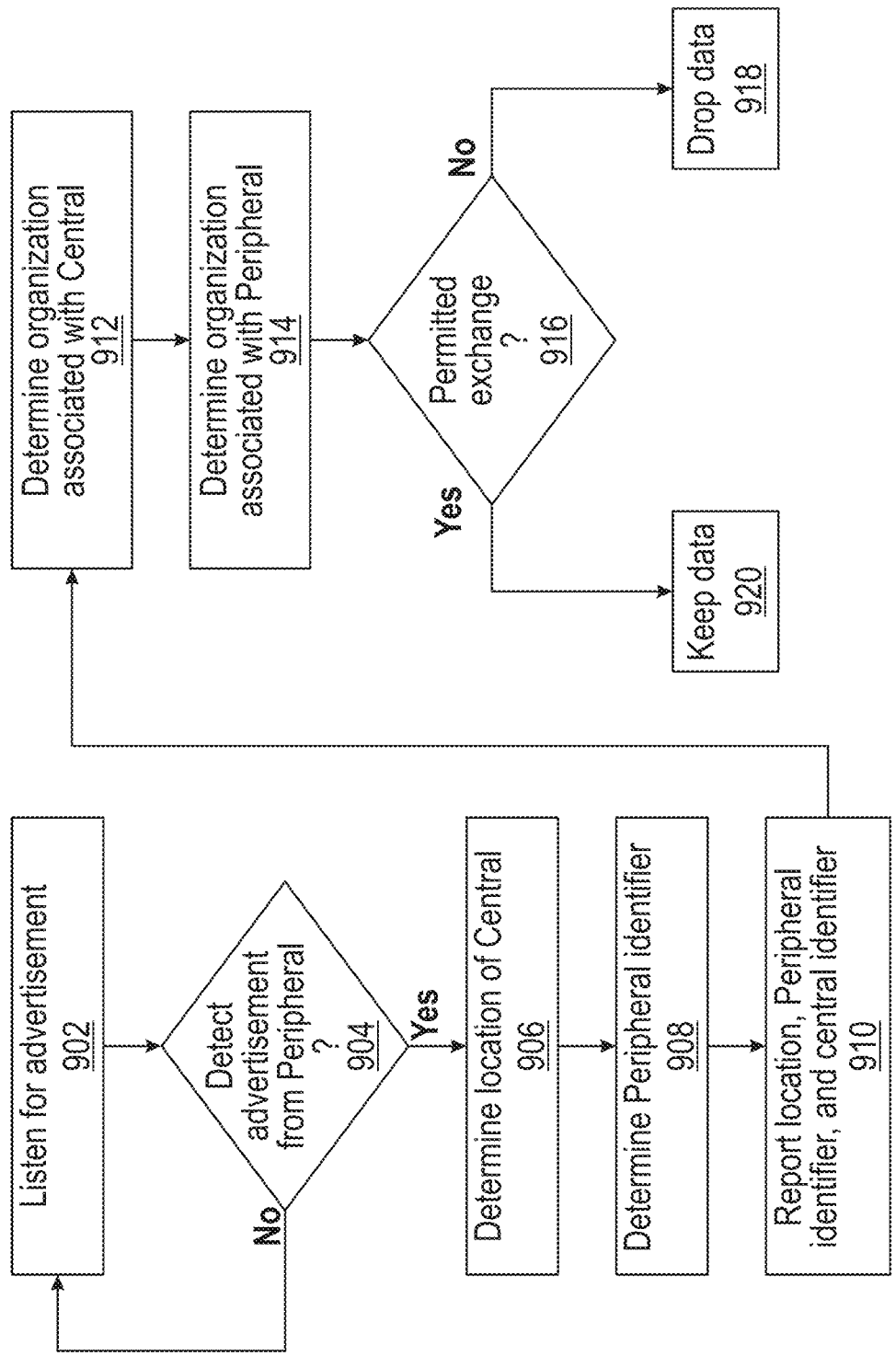
FIG. 9A is a flowchart illustrating an example process for low power location determination, according to various implementations.

FIG. 9A is a flowchart illustrating an example process for low power location determination that may be executed on a Central and/or Backend according to some embodiments. As noted herein, a Central may refer to any device (e.g., an asset gateway, vehicle gateway, smartphone, or other device) that can communicate with a Peripheral, such as a Peripheral whose location is to be determined, and that can report location information and/or other information to a Backend. Depending on the embodiment, the method of FIG. 9A may include fewer or additional blocks and the blocks may be performed in an order that is different than illustrated.

In FIG. 9A, a Central is configured to operate in central mode and a Peripheral is configured to operate in peripheral mode. At block 902, the Central may listen for a broadcast from the Peripheral. At decision point 904, if the Central does not detect a broadcast from the Peripheral, the Central can continue listening for a broadcast. If the Central detects a broadcast from a Peripheral, at block 906, the Central can determine the location of the Central. At block 908, the Central can determine a Peripheral identifier, which can be a unique identifier of the Peripheral. At block 910, the Central can report the location of the Central, the Peripheral identifier, and a Central identifier that can be a unique identifier of the Central to a Backend.

At block 912, the Backend can determine an organization associated with the Central, for example based on the Central identifier. At block 914, the Backend can determine an organization associated with the Peripheral, for example based on the Peripheral identifier. At decision point 916, the Backend can determine if sharing of location data is permitted between the organization associated with the Central and the organization associated with the Peripheral. If sharing is not permitted, the Backend can drop the data at block 918. If sharing is permitted, the Backend can retain the data at block 920.

In some implementations, the criteria for sharing location information are not linked to organizations, or are not entirely linked to organizations. For example, a gateway may be assigned sharing privileges (and/or restrictions) that are accessed to determine if location of the gateway may be shared with other gateways. Thus, the discussion herein of sharing rights associated with organizations, such as in blocks 912-914 of FIG. 9A are equally implementable with sharing privileges assigned to gateways based on other factors (e.g., other than just an associated organization).

Figure 9B:
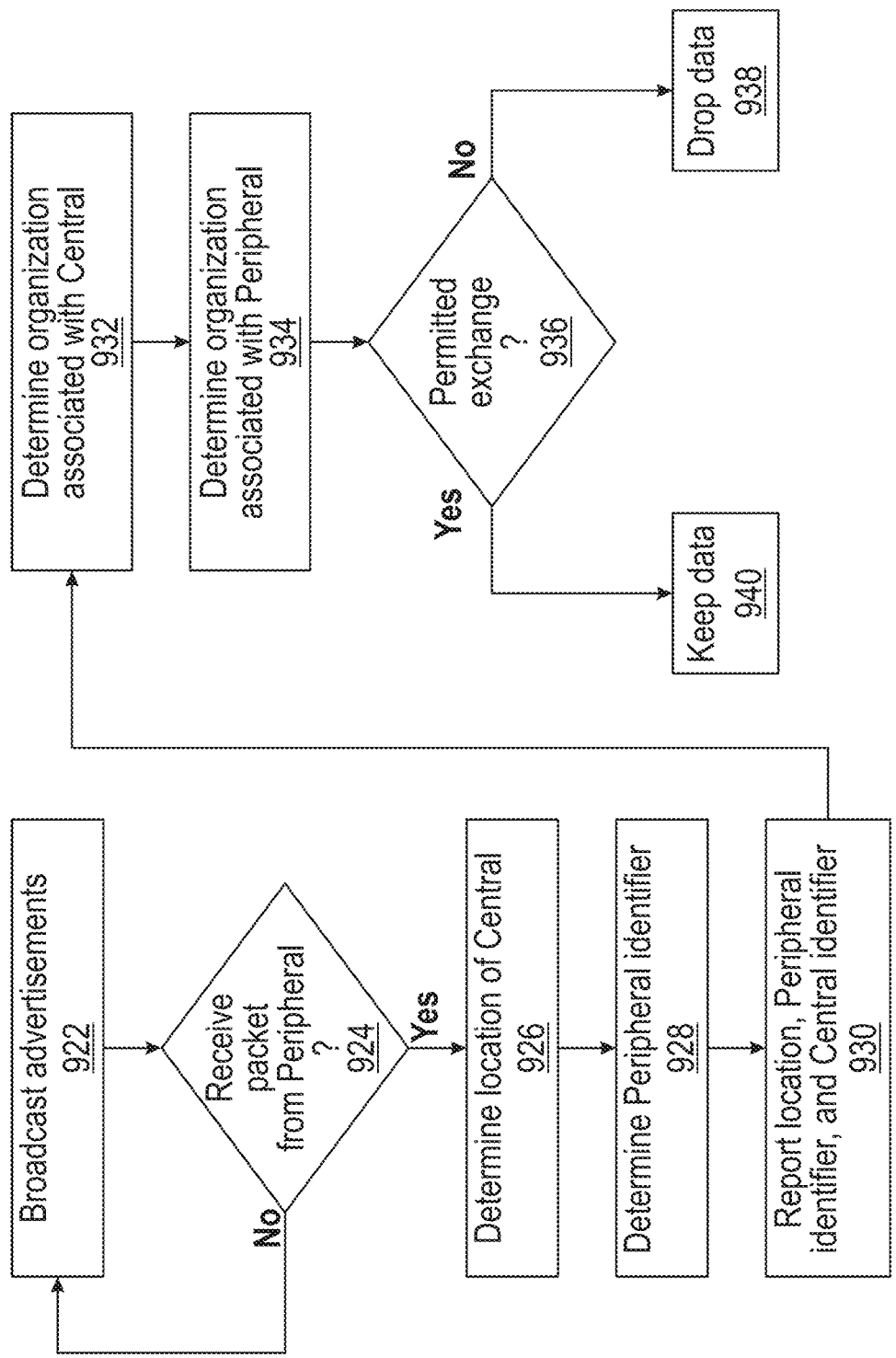
FIG. 9B is a flowchart illustrating another example process for low power location determination, according to various implementations.

FIG. 9B is a flowchart illustrating another example process for low power location determination that may be executed on a Central and a Backend according to some embodiments. The process illustrated in FIG. 9B is generally similar to the process depicted in FIG. 9A, except that the Central operates in peripheral mode and Peripheral operates in central mode. Depending on the embodiment, the method of FIG. 9B may include fewer or additional blocks and the blocks may be performed in an order that is different than illustrated.

At block 922, Central can send or broadcast advertisements/broadcasts. At decision point 924, if the Central receives a broadcast from a Peripheral, the process can proceed. If not, the Central can continue broadcasting broadcasts. In some embodiments, the Central may transmit broadcasts continuously. In some embodiments, the Central may transmit broadcasts periodically, for example every minute, five minutes, fifteen minutes, thirty minutes, one hour, and/or the like. In some embodiments, the Central may transmit broadcasts based at least in part on a change in the location of the Central. For example, if the Central is a vehicle gateway or other moving gateway, the Central may be configured to transmit broadcasts in response to moving a certain distance.

At block 926, the Central can determine the location of the Central. At block 928, the Central can determine a Peripheral identifier. At block 930, the Central can report the location, Peripheral identifier, and Central identifier to a Backend. At block 932, the Backend can determine an organization associated with the Central. At block 934, the Backend can determine an organization associated with the Peripheral. At decision point 936, the Backend can determine if data sharing is permitted between the organization associated with the Central and the organization associated with the Peripheral. If not, the data can be dropped at block 938. If so, the data can be retained at block 940.

In the processes illustrated in FIGS. 9A and 9B, a Backend may receive data and subsequently determine whether to retain or drop the data. In some embodiments, data may not be uploaded to the Backend if exchanges are not permitted.

Figure 9C:
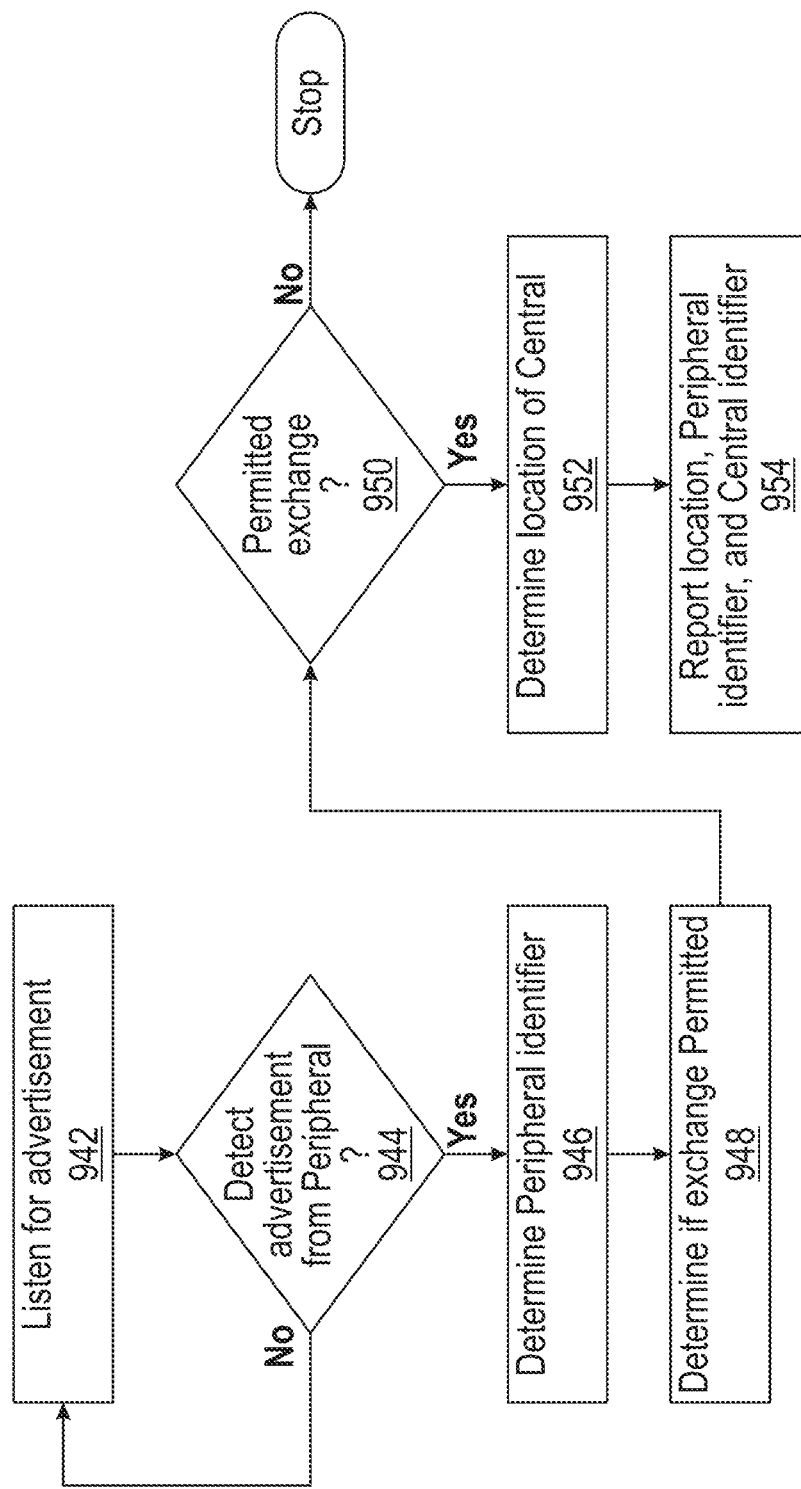
FIG. 9C is a flowchart that illustrates another process for low power location determination, according to various implementations.

FIG. 9C is a flowchart that illustrates another process for low power location determination according to some embodiments. Depending on the embodiment, the method of FIG. 9C may include fewer or additional blocks and the blocks may be performed in an order that is different than illustrated.

At block 942, a Central can listen for a broadcast from a Peripheral. At decision point 944, if no broadcast is detected, the Central can continue to listen to a broadcast. If a broadcast is detected, at block 946, the Central can determine an identifier of the Peripheral. At block 948, the Central can determine if exchange is permitted. For example, the Central may send the Peripheral identifier and a Central identifier to a Backend and may receive a response indicating that exchange is or is not permitted. In some embodiments, a local data store on a memory of the Central may be used to determine if exchange is permitted. At decision point 950, if exchange is not permitted, the process can stop. If exchange is permitted, the Central can determine its location at block 952. At block 954, the Central can report the location, Peripheral identifier, and Central identifier to the Backend. In some embodiments, the Central may not report the Peripheral identifier. For example, the Backend may determine an associated Peripheral based on the previously-received query to determine if exchange is permitted between the Peripheral and the Central.

Figure 9D:
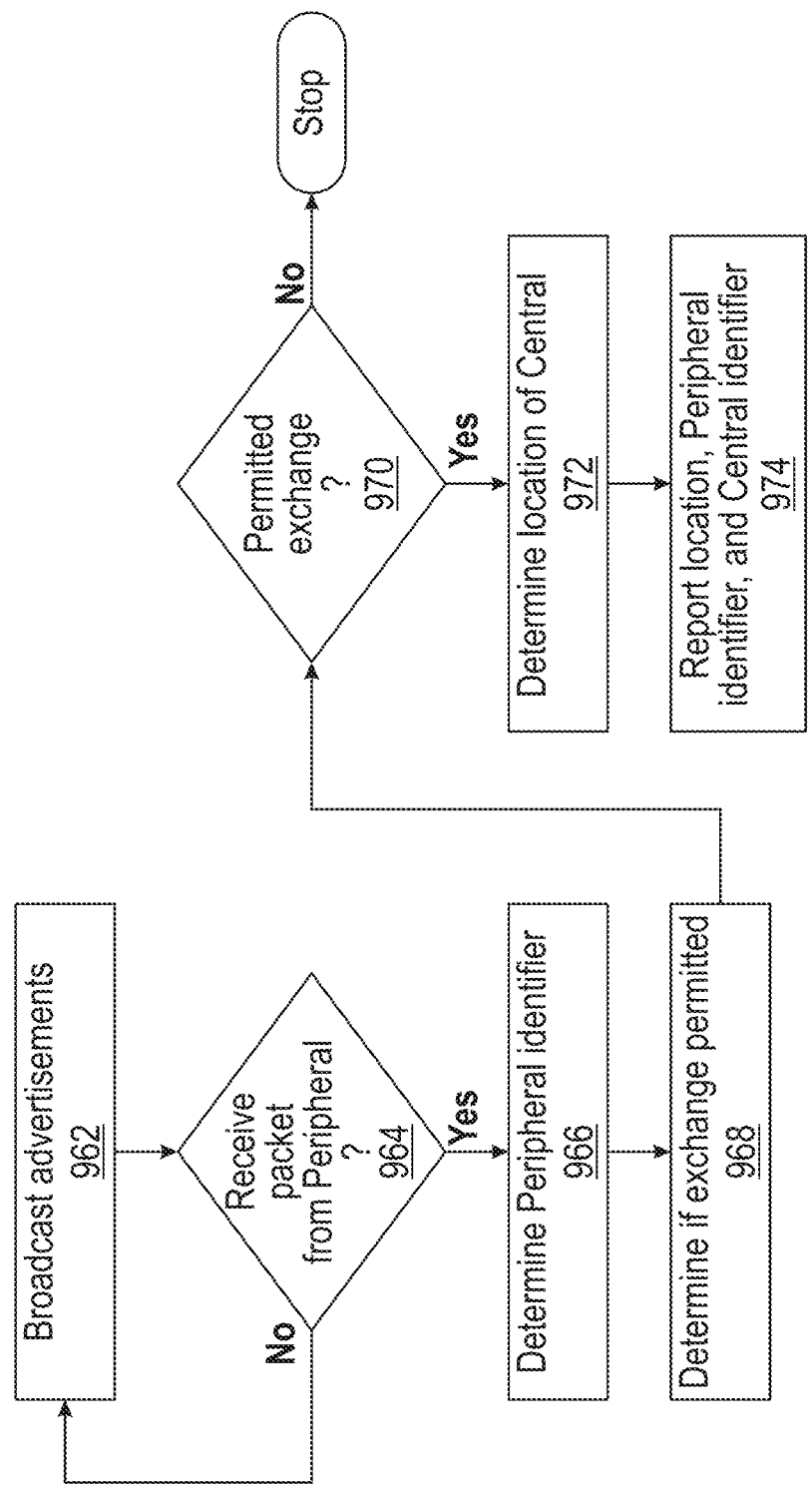
FIG. 9D is a flowchart that illustrates another process for low power location determination, according to various implementations.

FIG. 9D is a flowchart that illustrates another process for low power location determination according to some embodiments. The process of FIG. 9D is generally similar to that of FIG. 9C, except that in FIG. 9D, the Central broadcasts advertisements/broadcasts at block 962 and, at decision point 964, determines if it has received a packet from a Peripheral. Block 966, block 968, block 970, block 972, and block 974 may proceed in a manner generally similar to similar blocks described above in reference to FIG. 9C. Depending on the embodiment, the method of FIG. 9D may include fewer or additional blocks and the blocks may be performed in an order that is different than illustrated.

In some embodiments, a Peripheral may maintain a low power connection to a Central. For example, the Peripheral may be a Peripheral attached to cargo in a vehicle, and the Central may be a vehicle gateway connected to the vehicle. In some embodiments, if the Peripheral has already established and is maintaining a connection to a Central, the Peripheral may not transmit broadcasts and/or may not respond to broadcasts broadcast by other Centrals. Such an approach can prevent or reduce the reporting of duplicative location data to a Backend.

In some embodiments, a Peripheral (e.g., a Peripheral) may be configured to first attempt connections to gateways associated with the same organization as the Peripheral, and may only connect to other gateways associated with other organizations if the Peripheral is unable to connect to a gateway associated with the same organization. For example, the Peripheral may include volatile and/or non-volatile memory that has identifiers of known gateways embodied thereon. In some embodiments, the identifiers may be identifiers of gateways associated with the same organization as the Peripheral. In some embodiments, the identifiers may include other gateways not associated with the same organization as the Peripheral. For example, if equipment, vehicles, and/or the like, are often located at a customer site, that customer's gateways may be included.

In some cases, there may be a large number of Centrals within range of a Peripheral. For example, in dense urban areas, along busy highways, at rest stops and truck stops, and/or the like, there may be a large number of Centrals within range of a Peripheral. If each Central within range reports location information for the Peripheral, there can be a large amount of location data for the Peripheral that is largely duplicative.

Retaining all reported location data can have several drawbacks. For example, a significant amount of storage space may be used to store the location data. As another example, showing all the data on a map may lead to slow performance, the map may appear cluttered, and/or the like. In some embodiments, data collected at or near the same location at or near the same time can be filtered, combined, partially dropped, and/or the like. Such data manipulation can reduce storage demands, improve user interface performance, and so forth.

In some embodiments, location data can be kept or dropped based on, for example, the number of data points at the same or similar location close in time, signal strength between the Central and the Peripheral, and/or the like. For example, if two Centrals determine a location for a Peripheral, but one of the gateways had a low signal strength and the other gateway had a higher signal strength, the low signal strength data may be dropped. Low signal strength can be caused by a variety of factors such as, for example, distance, atmospheric conditions, intervening structures (e.g., buildings, walls, trailers, and/or the like).

In some embodiments, location information from multiple Centrals may be used. For example, in some embodiments, a Backend may calculate a geometric mean of the reported locations to better determine the actual location of the Peripheral. In some embodiments, the location information reported by each Central can be weighted based on the signal strength between the Central and the Peripheral. For example, a Central that was close to the Peripheral (as may be indicated by a relatively high signal strength) may be weighted more strongly than location information received from a Central that was farther away from the Peripheral. In some embodiments, signal strength may be used to estimate a distance between a Central and a Peripheral.

Figure 10:
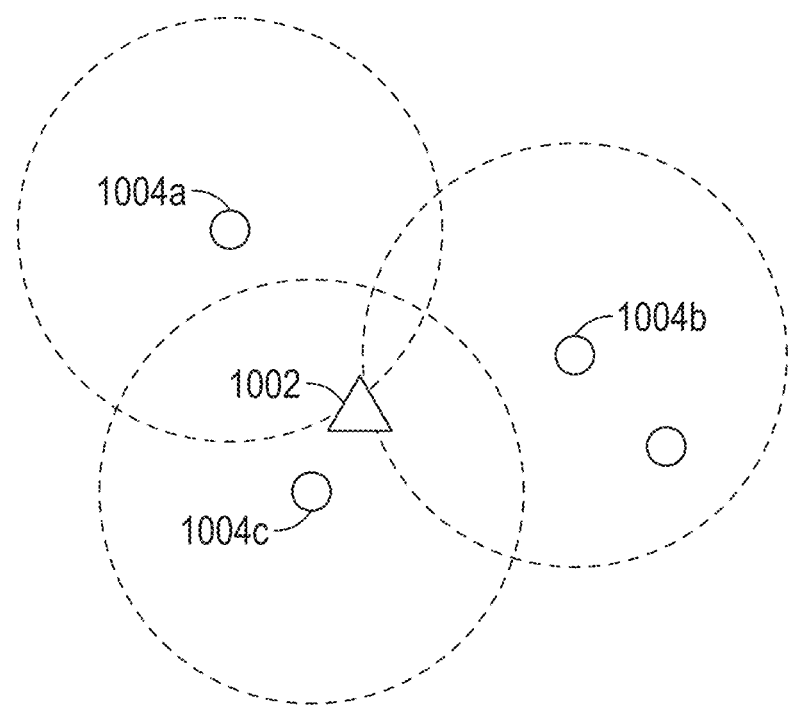
FIG. 10 is an example diagram showing location determination, according to various implementations.

FIG. 10 is an example diagram showing location determination according to some embodiments. In FIG. 10, a Peripheral 1002 is within range of three Centrals 1004a, 1004b, 1004c. In some embodiments, the locations of the Centrals 1004a, 1004b, 1004c can be reported to a Backend and used as approximate locations of the Peripheral 1002. In some embodiments, each data point may be maintained on the Backend and/or may be shown to a user viewing the location data of Peripheral 1002. In some embodiments, the location of the Peripheral 1002 can be computed as the geometric mean of the locations of the Centrals 1004a, 1004b, 1004c. In some embodiments, additional information can be used to more precisely locate the Peripheral 1002. For example, as mentioned above, the signal strength between the Peripheral 1002 and each of the Centrals 1004a, 1004b, 1004c can be used to estimate the distance between the Peripheral 1002 and each Central 1004a, 1004b, 1004c and to determine an estimated or proxy location of the Peripheral 1002.

Figure 11:
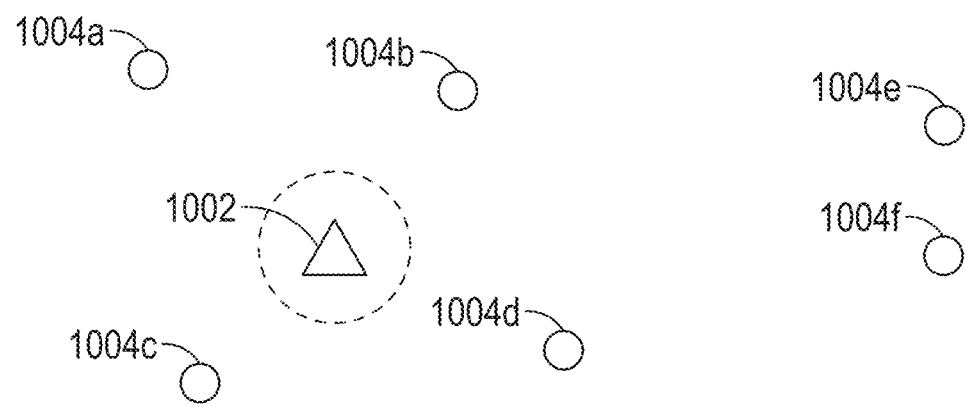
FIG. 11 is an example diagram showing location determination of a Peripheral, according to various implementations.

FIG. 11 is an example diagram showing location determination of a Peripheral according to some embodiments. As shown in FIG. 11, in some embodiments, the Peripheral 1002 can be within range of multiple Centrals 1004a-1004f. In FIG. 11, the Centrals 1004a-1004d are relatively close to the Peripheral 1002 while Centrals 1004e, 1004f are relatively far. In some embodiments, the Backend can receive location information from the Centrals 1004a-1004f. In some embodiments, the Backend may exclude the data from the Centrals 1004e, 1004f, for example based on a determination that the signal strength between the Peripheral 1002 and the Centrals 1004e, 1004f is too low, based on a determination that the Centrals 1004e, 1004f are far away from the Centrals 1004a-1004d, and/or the like. In some embodiments, Backend can determine the location of the Peripheral 1002 as the geometric means of the locations reported by the Centrals 1004a-1004d.

In some embodiments, Centrals can be excluded if they are more than a threshold distance away from the average location of other Centrals that have detected the Peripheral. In some embodiments, the threshold distance can be fixed. In some embodiments, the threshold distance can be variable. For example, the threshold distance may be relatively small if there are at least a minimum number of Centrals within range of the Peripheral. In some embodiments, the threshold distance may be relatively large if there are below the minimum number of Centrals within range of the Peripheral. Such an approach may result in more accurate determination of a Peripheral's location when there are many Centrals nearby, while still providing at least an approximate location when there are relatively few Centrals within range of the Peripheral.

In some embodiments, location history of a Central may be used to exclude a Central from calculations to determine the location of a Peripheral. For example, if the location of a Central shows errant behavior (e.g., the location of the Central changes more or in a different manner than would be expected for a Central that is traveling on a vehicle), the Central may not be used to determine the location of the Peripheral. In some embodiments, a Backend can determine whether a Central is fixed or movable (e.g., installed at a facility, job site, and/or the like, or attached to a vehicle), for example by querying a database that includes information about the Centrals. In some embodiments, fixed Centrals may be favored over movable Centrals. For example, a Backend may be configured to drop location information from movable Centrals when at least one fixed Central has also reported location information for a Peripheral.

In some embodiments, the amount of location data that is uploaded to a Backend can be limited. For example, there may be dozens or hundreds of Centrals within range at a depot, in a dense urban area, and/or the like. If all Centrals report the location of the Peripheral, there can be a large amount of data uploaded to a Backend, which can increase network capacity demands, processing demands, data storage demands, and/or the like. In some embodiments, Centrals can be configured to report the location of a Peripheral with reduced frequency. For example, in some embodiments, a Central can determine whether or not to report the location of the Peripheral based on the number of other Centrals nearby. In some embodiments, Centrals may operate as both central and peripheral devices to facilitate determination of the number of nearby Centrals. In some embodiments, a Central can have a probability of reporting the location of the Peripheral based on the number of other Centrals nearby. For example, if there are many other Centrals nearby, the Central may have a low probability of reporting the location of the Peripheral, while if there are relatively few other Centrals nearby, the Central may have a relatively high likelihood of reporting the location of the Peripheral. For example, the probability of reporting the location of the Peripheral can be 1/x, 2/x, 3/x, 4/x, and/or the like, where x is the number of Centrals nearby. In some embodiments, the reporting probability may be binned or grouped. For example, if there are below a first number of nearby Centrals, the Central may have a first reporting probability, if there are between the first number and a second number of nearby Centrals, the Central may have a second probability, and so forth. For example, the reporting probability may be 1 if the number of nearby Centrals is between 1 and 4, 0.5 if the number of nearby Centrals is between 5 and 10, and 0.25 if the number of nearby Centrals is greater than 10. In some embodiments, a reporting probability may be fixed. For example, a Central may only report 25% of the time, 50% of the time, 75% of the time, 100% of the time, or any other pre-defined value.

Figure 12:
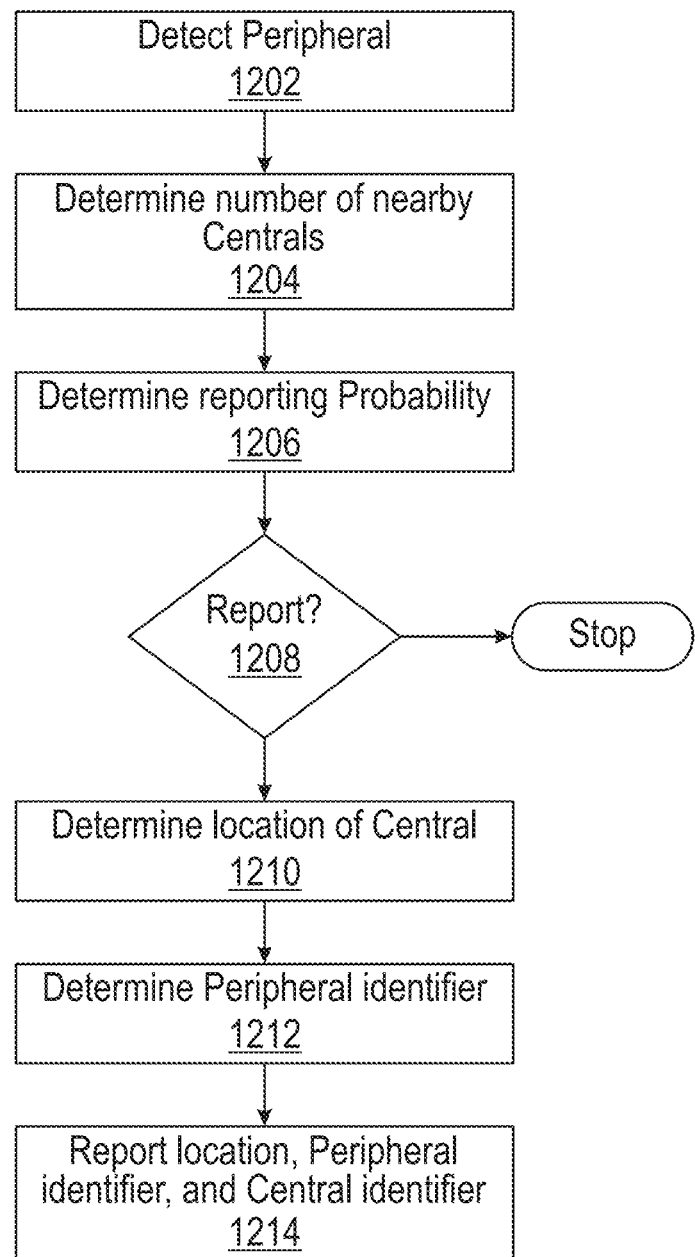
FIG. 12 illustrates an example process that may be run on a Central, according to various implementations.

FIG. 12 illustrates an example process that may be run on a Central according to some embodiments. At block 1202, the Central may detect a Peripheral. At block 1204, the Central may determine the number of nearby Centrals. At block 1206, the Central may determine a reporting probability, which can determine whether or not the Central reports location information to a Backend. At decision point 1208, the Central can determine whether or not to report location information to the Backend. If not, the process can end. If so, the Central can, at block 1210, determine the location of the Central. At block 1212, the Central can determine an identifier of the Peripheral. At block 1214, the Central can report the location, Peripheral identifier, and Central identifier to a Backend.

In some embodiments, a Peripheral may be connected to another gateway in ride along mode, as described herein. In some embodiments, the Peripheral may be configured not to transmit broadcasts when operating in ride-along mode. In some embodiments, the Peripheral may be configured to broadcast an indication that the Peripheral is operating in ride-along mode. In some embodiments, if a Central is provided with an indication that the Peripheral is operating in ride-along mode, the Central may not report the location of the Peripheral.

Figure 13A:
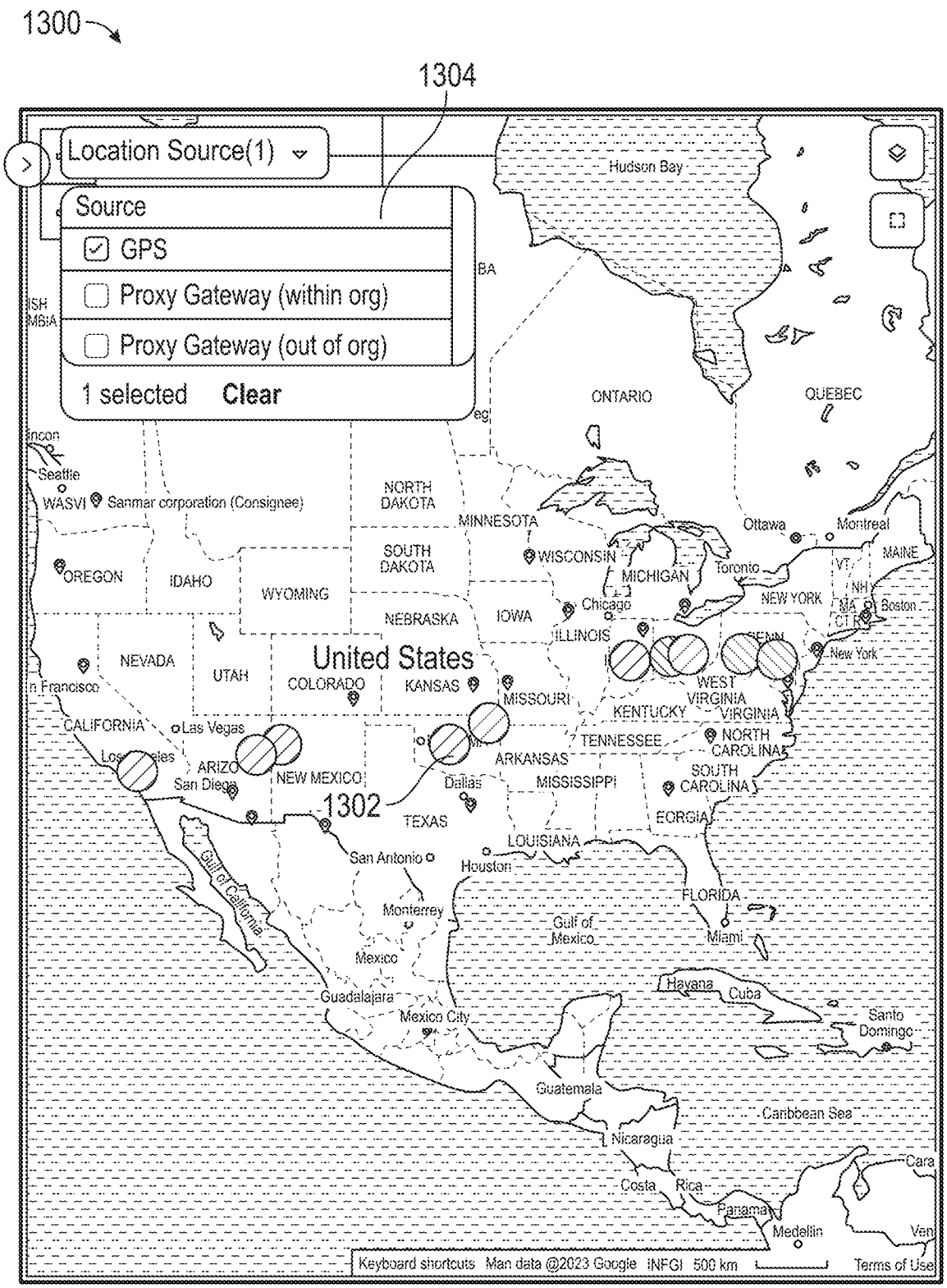
FIG. 13A illustrates a map that shows the location of a Peripheral, according to various implementations.

FIG. 13A illustrates an example user interface depicting a map that shows the location of a Peripheral over time, such as the Peripheral is moved from the east to west coast of the US. As shown in FIG. 13A, the map 1300 can include indicators 1302 that show the location of the Peripheral over time. A dropdown 1304 can allow a user to select which location points to show on the map. For example, in FIG. 13A, only GPS data is selected. The GPS data can be, for example, data reported by the Peripheral itself. The location data can be relatively sparse. For example, a Peripheral may be configured to report its location one per day, twice per day, and/or the like. The dropdown 1304 can include additional location selections. For example, a user can select to display locations received from Centrals (also referred to herein as proxy gateways). In some implementations, the user can select Centrals within the same organization as the Peripheral and/or Centrals in a different organization than that of the Peripheral. As noted above, permissions for sharing of Central locations may be limited by certain organizations, such as to limit sharing of location data with Peripherals associated with a particular entity or of a particular type.

Figure 13B:
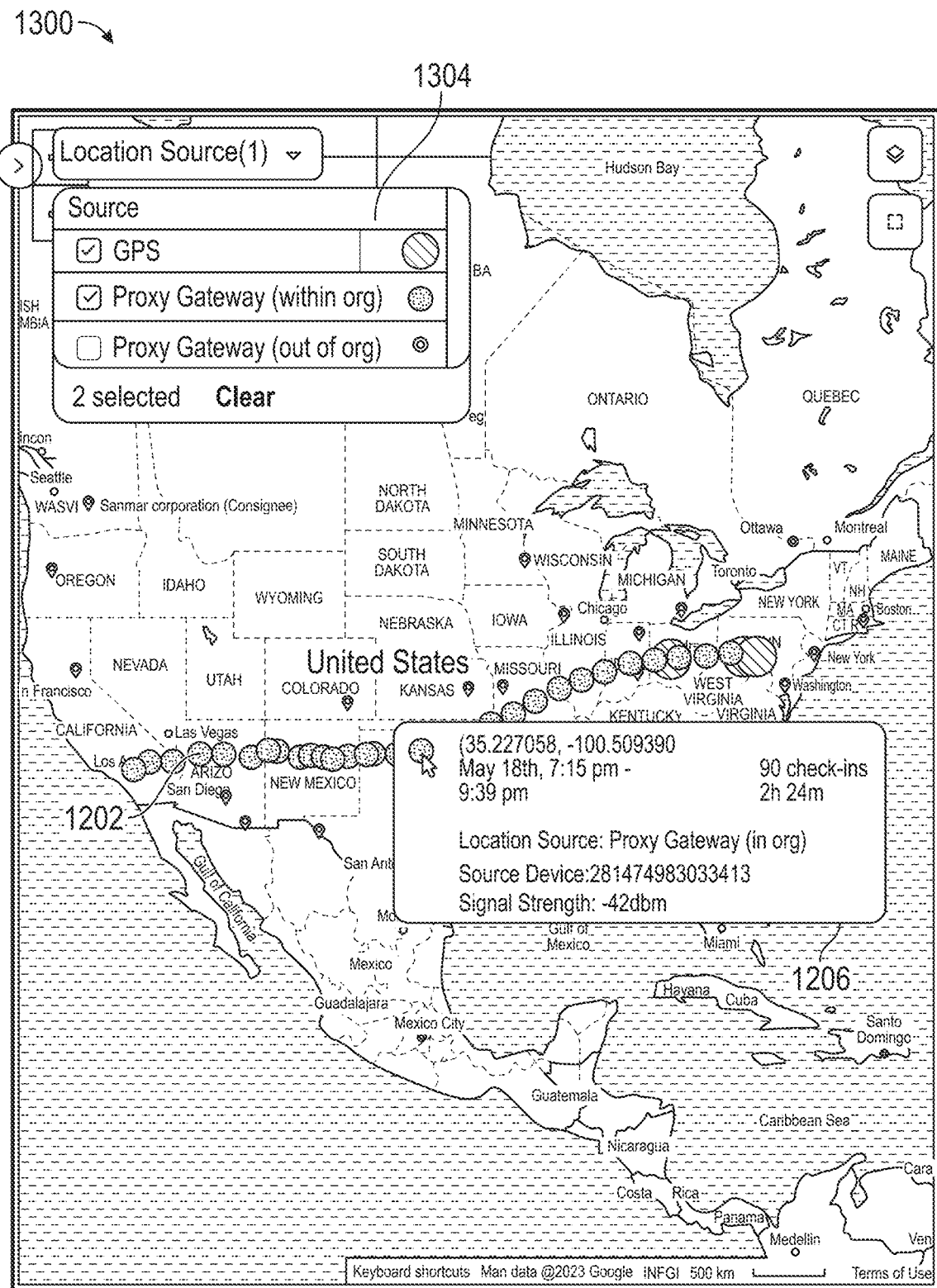
FIG. 13B illustrates another map that shows the location of a Peripheral, according to various implementations.

FIG. 13B illustrates the example user interface of FIG. 13A, now with the map updated to show locations of the Peripheral form both GPS sources and in-organization Centrals. As compared with FIG. 13A, more location information is shown, which can provide a more complete picture of the movement of the Peripheral. As shown in FIG. 13B, in some embodiments, a user interface can be configured to show an information bubble 1306 or otherwise present additional details when a user hovers and/or clicks a location on the map. The information bubble 1306 can display information such as, for example, latitude and longitude, time when the location was reported, time elapsed since the last reporting, the source of the location information (e.g., GPS, proxy gateway within the organization, proxy gateway outside the organization, and/or the like), an identifier of the source device, signal strength, number of check ins, and/or the like. In some embodiments, the information bubble 1306 may provide a link that enables a user to view information about the source device. For example, a user may click on the link to see location information about the source device. Such information may include, for example, location history, device details (e.g., serial number, model number, and/or the like), organization, and so forth.

In some embodiments, the colors of locations shown on the map can indicate a source of the location information. For example, GPS data may be a first color, Central data from within the organization may be a second color, and Central data from outside the organization may be a third color. In some embodiments, other coloring or other visualization approaches may be used. For example, GPS data may be a first color and reporter data (from both within and outside of the organization) may be a second color. In some embodiments, other differentiators may be used additionally or alternatively. For example, different shapes or sizes may be used to indicate the source of the data.

In some embodiments, the size of a point shown on the map can vary. For example, the size of the point may indicate a confidence in the location. For example, if there is relatively high confidence in the accuracy of a determined location, the point can be relatively small, and if there's relatively low confidence in the accuracy of a determined location, the point can be relatively large. In some embodiments, a point can be represented by, for example, a circle, and the radius of the circle can cover an approximate area within which the Peripheral was located.

Figure 14A:
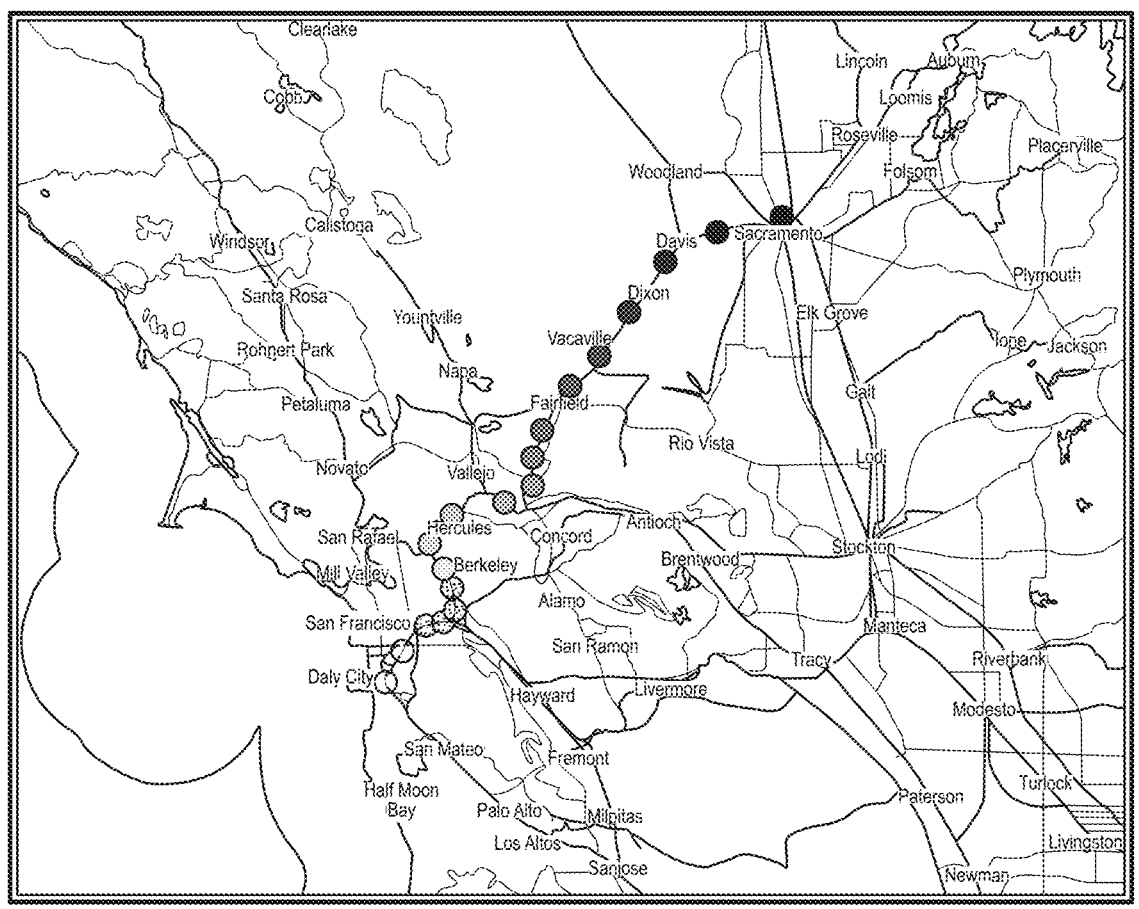
FIGS. 14A and 14B illustrate an example of trip replay, according to various implementations.
Figure 14B:
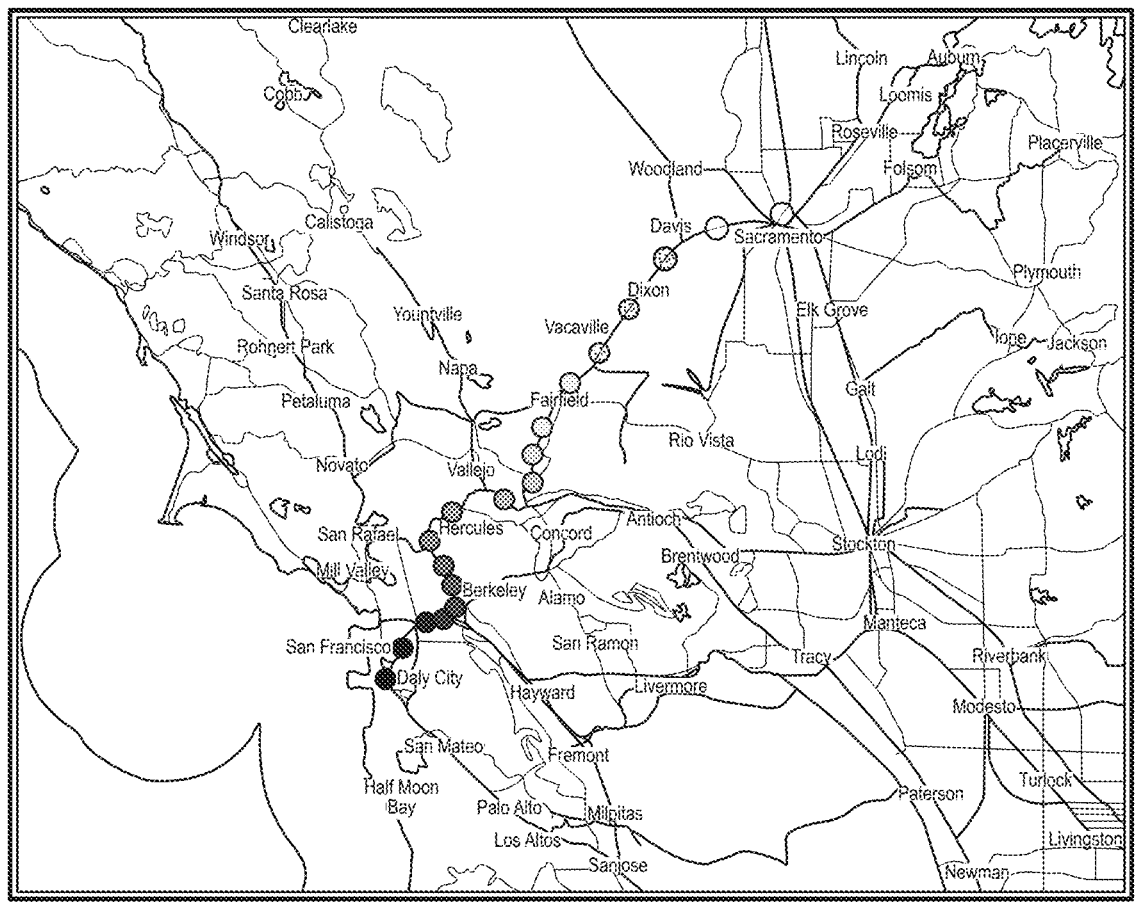

In some embodiments, a user interface can include a trip replay feature that enables a user to view a time lapse of a trip. FIGS. 14A and 14B illustrate an example of trip replay according to some embodiments. In FIG. 14A, the location points at the beginning of the trip are filled in and the opacity of later data points is reduced. As the trip replay progresses, data points from later in the trip can be filled in. In some embodiments, the opacity of earlier data points can be reduced. In other embodiments, the opacity of earlier data points can remain fixed. In FIG. 14B, location points near the end of the trip are opaque while those near the beginning of the trip have reduced opacity. In some embodiments, location points may only appear as the trip progresses.

In some cases, it can be beneficial to ensure that assets remain within a defined area. In some embodiments, geofencing can be used to define an area in which an asset is expected to remain. In some conventional geofencing applications, the geofenced area can be fixed and typically may not have a defined lifespan. However, it can be significant to provide geofencing capabilities that include one or more of expiring geofences, moving geofences, and/or the like. For example, for an asset loaded onto a vehicle, the vehicle may be a central point of a geofence. In some embodiments, an individual may be used to define a central point of a geofence. For example, an individual such as a driver, construction worker, and/or the like, may have a smartphone that can act as a BLE device to track a nearby asset.

Figure 15A:
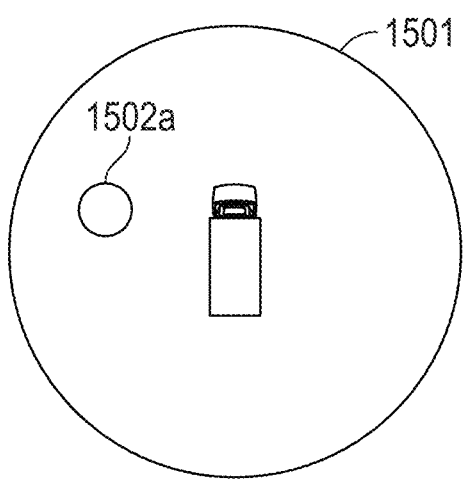
FIGS. 15A and 15B illustrate an example geofence, according to various implementations.
Figure 15B:
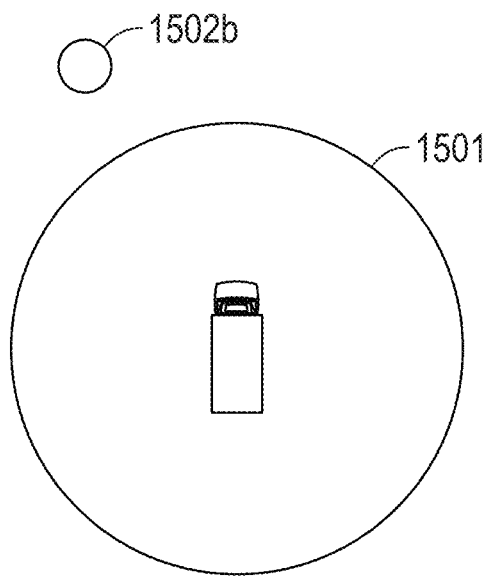
Figure 16A:
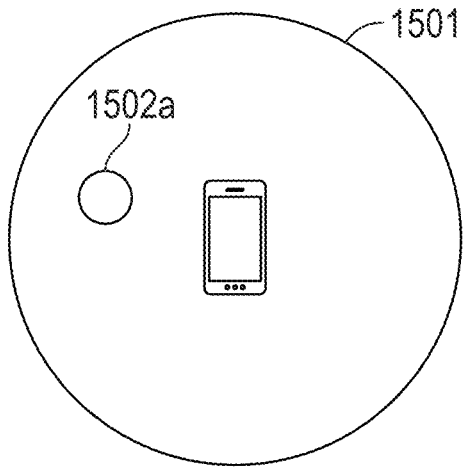
FIGS. 16A and 16B illustrate another example geofence, according to various implementations.
Figure 16B:
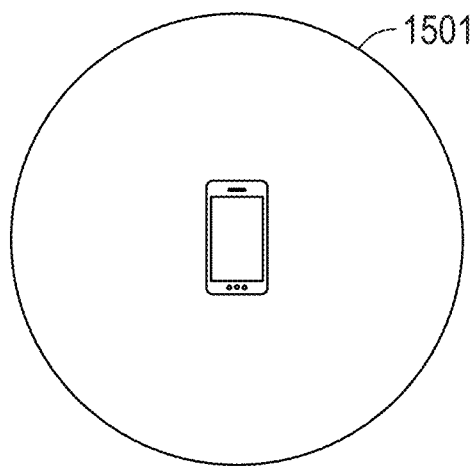

FIGS. 15A and 15B illustrate an example geofence according to some embodiments. In FIGS. 15A and 15B, a vehicle is used as the central point of the geofence. Thus, as the vehicle moves, the geofence area moves also. In FIG. 15A, the object 1502a is inside the geofence 1501. In FIG. 15B, the object 1502b is outside the geofence 1501. FIGS. 16A and 16B are similar to FIGS. 15A and 15B, except that a smartphone is used to define the geofence.

In some embodiments, a geofence may change over time. For example, an asset such as a tool may be loaded onto a first vehicle on a first day and onto a second vehicle on a second day. In some embodiments, the asset may have a default geofence, such as warehouse, a fixed facility, or a particular vehicle. In some embodiments, the geofence can be temporarily changed from the default geofence to a temporary geofence when the asset is sent out (e.g., the Peripheral communicates with a vehicle gateway after leaving the default geofence). In some embodiments, a temporary geofence can last for a short period of time, such as while a worker is out on a job, for a day, for a week, and/or the like. In some embodiments, a temporary geofence may last for a longer period of time. For example, a company that leases equipment out to others may define a temporary geofence around the location where the equipment is to be located. The equipment may remain at the location for weeks, months, or even years. Such a geofence can help the company keep track of equipment that has been leased to others, for example to identify if a piece of equipment has been moved from its designated location (for example, stolen, sent to another job site, and/or the like).

In some embodiments, a Peripheral can be determined to be outside a geofence if a signal from the Peripheral is no longer detected by a vehicle gateway, smartphone, or other device used to define the geofence. In some embodiments, a geofence may be less than the range of a vehicle gateway, smartphone, and/or the like. For example, in some embodiments, a received signal strength indicator (RSSI) can be used to determine an approximate distance from the vehicle gateway, smartphone, and/or the like, to the Peripheral. In some embodiments, a Peripheral may include in a BLE signal a transmit power indicating the power level at which the Peripheral transmitted the BLE signal. In some embodiments, the received signal strength indicator and the transmit power can be used to determine an approximate distance between the Peripheral and the receiving gateway (e.g., vehicle gateway, smartphone, and/or the like). In some embodiments, the transmit power may not be transmitted. For example, the transmit power of a particular Peripheral may be predetermined or determined by querying a database that includes information about the Peripheral and/or the distance may be determined using an approximate transmit power.

Figure 17:
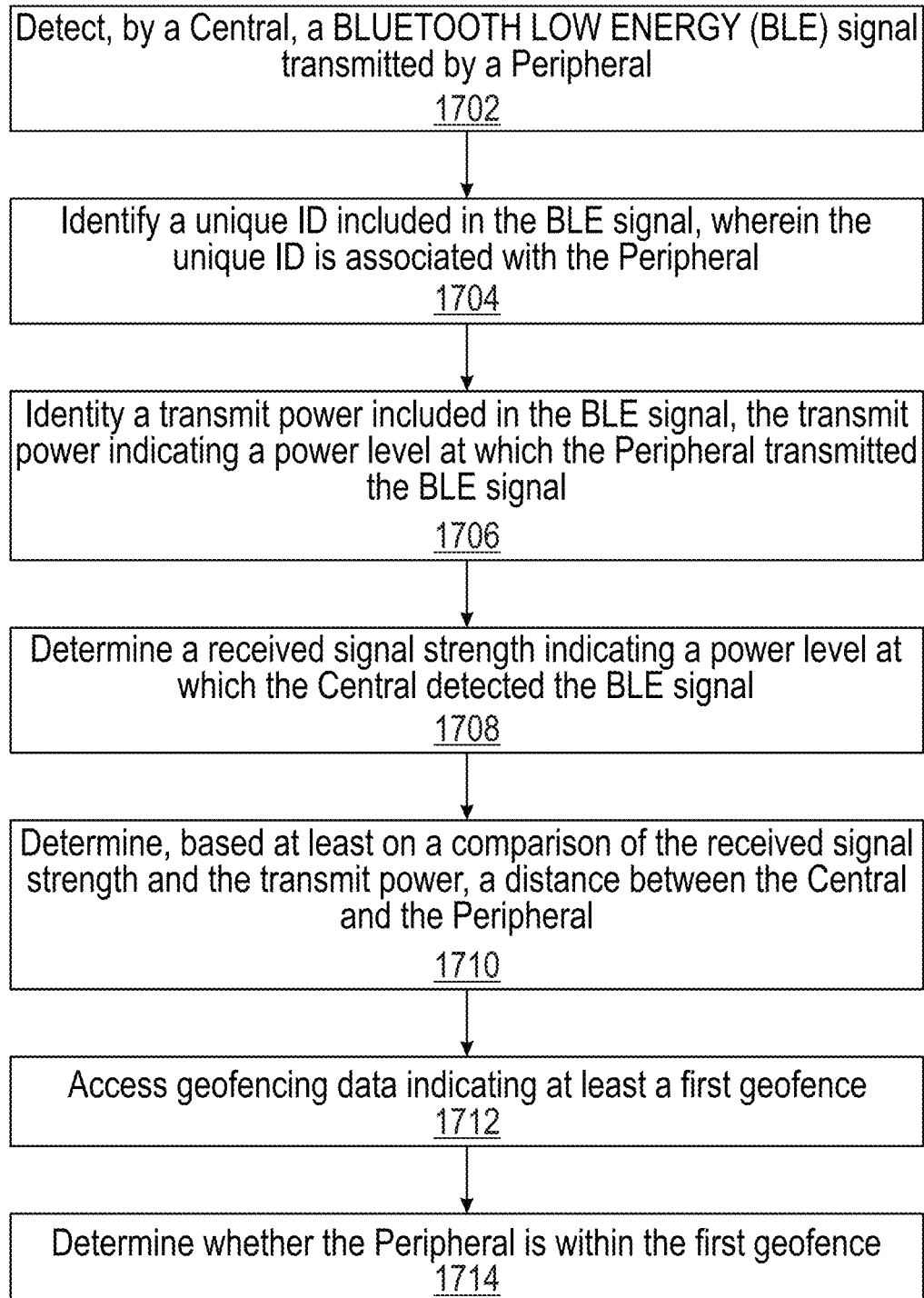
FIG. 17 is a flowchart illustrating an example of geolocation, according to various implementations.

FIG. 17 is a flowchart illustrating an example of geolocation according to some embodiments. The process shown in FIG. 17 may be executed on a gateway device (e.g., a Central) and/or on a Backend according to some embodiments. While the description below may refer to performance of various blocks by a particular device (e.g., a Central), in some implementations the blocks may be performed by another device (e.g., a Backend) and/or a combination of devices. Depending on the embodiment, the process of FIG. 17 may include fewer and/or additional blocks and/or blocks may be performed in an order different than is illustrated.

At block 1702, a Central can detect a BLE signal transmitted by a Peripheral (e.g., an asset gateway in peripheral mode, and/or another Peripheral). At block 1704, the Central can identify a unique ID included in the BLE signal, the unique ID associated with the Peripheral. At block 1706, the Central can identify a transmit power included in the BLE signal. The transmit power level may indicate a power level at which the Peripheral transmitted the BLE signal. At block 1708, the Central can determine a received signal strength indictor (RSSI). The RSSI can indicate a power level at which the Central detected the BLE signal. At block 1710, the Central can determine a distance between the Central and the Peripheral using the RSSI and the transmit power. At block 1712, the Central can access geofencing data indicating at least a first geofence. In some embodiments, there can be multiple geofences. In some embodiments, the Central may query a database or other information store to determine the first geofence. At block 1714, the Central may determine whether the Peripheral is within the first geofence.

While the above description refers to vehicle gateways and Peripherals, it will be appreciated that various implementations are possible and vehicle gateways and Peripherals are not necessarily restricted in where they can be deployed. For example, a vehicle gateway can be installed in a tractor or other vehicle. A vehicle gateway can, additionally or alternatively, be installed on other equipment, such as a trailer or even a non-moving object. A Peripheral can be installed on various items, such as cargo, tools, trailers, vehicles, and so forth.

Example Low Power Geofencing Features and Functionality

Tracking objects such as equipment, shipping containers, pallets, trailers, and so forth can provide valuable information. For example, tracking can enable users to determine if an asset has been stolen, detect when an asset is moved, and so forth. Tracking can help users locate lost or misplaced items. For example, users may use a tracking system to determine the location of a piece of equipment on a construction site, location of a package in a shipping facility or warehouse, or location of a trailer (e.g., shipping container) in transit. However, tracking systems may be difficult to deploy in some situations. For example, object tracking devices that are battery powered, such as might be used to track unpowered objects or objects where connections to a power source are limited, may require frequent charging and/or replacement of the battery.

Reliance on batteries can significantly limit the functionality of object tracking devices. An object tracking device may contain GPS, WiFi, and/or cellular hardware that can be used to determine the location of an object and to report the location of the object to a Backend over a cellular network (e.g., an LTE network or other cellular network). While this approach can provide location information, its functionality is limited because GPS and cellular operations require significant power and are often associated with additional expense. Thus, users of such an object tracking device are presented with a trade-off between longer battery life with limited information (e.g., frequency and/or quantity) and more information at the expense of significantly shorter battery life, which may necessitate frequent recharging or battery replacement. To achieve longer battery life, an object tracking device may only determine and report a location periodically, for example once per day, twice per day, and so forth. Moreover, if an object is lost, stolen, or otherwise can't be reached, frequent check-ins may result in the device being tracked for a short period of time before the battery runs out and the object can no longer be tracked. Periodic check-ins can conserve battery, but at the expense of limited and potentially stale information.

In some embodiments, object tracking may include the use of geofences. For example, a user might wish to receive a notification when an object enters or leaves an area. For example, a user might wish to know when a delivery arrives, or a construction company might want to receive a notification if a piece of equipment is removed from a job site. Periodic check-ins can be of limited utility in geofencing applications, especially if the time between check-ins is long. If the check-in frequency is increased, users can be notified more quickly if an object enters or leaves a geofenced area, but this can cause increased battery drain. As just one example, an object tracking device may be designed to operate for three years with two check-ins per day. If the check-in frequency is increased to once every thirty minutes, the battery may only last about two months. Moreover, even thirty minutes may be an unacceptably long delay to receive a notification that an object has left a geofenced area. Checking in at an acceptable rate may reduce battery life to hours, days, or weeks, which may be unacceptably short.

In some embodiments, a geofence can be a moving geofence. For example, a geofence can be defined around a moving object such as a truck. For example, it may be desirable to know if a tool was left behind at a job site, if an object fell off a truck, and so forth. In some embodiments, a geofence can be ephemeral. For example, a geofence can be defined in a location, around an object (which may be moving or fixed), and the geofence can expire after a defined period, such as one hour, two hours, four hours, eight hours, twelve hours, one day, two days, three days, one week, one month, and so forth.

As an alternative to checking in on a fixed schedule (or in addition to checking in on a fixed schedule), an object tracking device may be equipped with one or more motion sensors (e.g., an accelerometer, gyroscope, magnetometer, and/or the like). The device may check-in based on detecting motion. However, if the sensitivity of the accelerometer is too high, needless check-ins may occur. For example, it may not be desirable to receive a notification every time an object is moved a small amount. Excessive check-ins may consume energy and reduce battery life. On the other hand, if the sensitivity is not high enough, the object tracking device may not detect motion that should trigger a check-in, thereby permitting an object to leave or enter a geofence without triggering an alert, for example by accelerating the object slowly, moving at a relatively constant velocity, and so forth.

Disclosed herein are systems and methods that enable efficient object tracking, including use of geofences. An example Peripheral may be configured with low energy Bluetooth (BLE) functionality configured to periodically transmit a BLE signal (e.g., a check-in signal) at a constant rate, for example every one second, two seconds, three seconds, four seconds, five seconds, six seconds, seven seconds, eight seconds, ten seconds, thirty seconds, one minute, five minutes, and so forth. In some embodiments, the Peripheral may advertise for a period of x seconds every y minutes, for example thirty seconds every five minutes. The check-in frequency is not necessarily limited to any particular time or range of times. In some embodiments, an advertising interval can be any interval permitted by a relevant BLE specification. In some embodiments, the signal may be a non-connectable broadcast, an iBeacon broadcast, and so forth. Each broadcast may contain a unique identifier for the asset tracking device (e.g., the Peripheral). In some cases, the broadcast may also include a transmit power used for the transmission of the broadcast. A BLE receiver, such as may be included in an asset tracking device, a vehicle tracking device, and so forth may be used to detect the BLE broadcast from the Peripheral and the Peripheral identifier. In some embodiments, users of mobile devices may install an application that allows the mobile device to act as a Central for receiving the Peripheral signal. The BLE Central may be used to determine a location of the Peripheral based on the Central's location, the transmit power of the Peripheral, and/or properties of the received signal including metrics related to the received signal power such as a received signal strength indicator (RSSI). The Central may provide location information for the Peripheral to a Backend, and in some cases an alert may be generated when an asset leaves and/or enters a geofenced area.

While some embodiments of a Peripheral may use BLE to transmit signals, it will be appreciated that other communication methods are possible. For example, in some embodiments, the Peripheral may provide signals using an IEEE 802. 15.4-compliant communications method, such as Zigbee, or may transmit signals using ultra-wideband technology.

Transmit power (provided by the Peripheral) and signal strength (determined by the Central) may be used to locate the Peripheral more precisely. For example, for a tag broadcasting at a particular transmit power, the RSSI will be higher if the Peripheral is close to the Central than if the Peripheral is far from the Central. The transmit power may be modulated, for example using a triangle wave, sine wave, and so forth. While in theory a single transmit packet (e.g., a single BLE broadcast from an object Peripheral) with a known transmit power and known received signal property such as a metric related the received signal power (e.g., RSSI) can be used to determine a distance between the Peripheral and the Central, RSSI readings are affected by real world conditions (e.g., atmospheric conditions, physical obstacles, reflective or absorptive materials, and so forth), and thus it may be advantageous to analyze multiple packets with differing transmit power. Moreover, modulating the transmission power of the Peripheral may reduce overall energy consumed by the Peripheral, as compared to a Peripheral configured to always broadcast at a maximum power. While lower transmit powers are possible, it may be desirable to broadcast at maximum power at least part of the time to increase detection range of the Peripheral and the likelihood that a Central will detect the signal from the Peripheral even when the Central is relatively far from the Peripheral.

A Peripheral as described above may also reduce costs compared to some other tracking systems. For example, object tracking devices may include GPS, WiFi, and/or cellular hardware. This hardware can increase costs, increase the physical size of the device, increase power requirements, and so forth. As described herein, the Peripheral may not have GPS, WiFi, or cellular hardware, and instead may communicate by broadcasting over BLE or another low energy communication protocol. Thus, the Peripheral may be significantly cheaper and/or smaller than a tracking device that includes other components, such as GPS, Wi-Fi, and/or cellular communication modules. In some embodiments, however, an asset tracking device may include any of these other communication modules (e.g., GPS, Wi-Fi, cellular, and/or the like), but those communication modules may be typically (or always) disabled and/or enabled in limited circumstances.

While the Peripheral has been discussed above in relation to geofencing, such a tag can also be used for other applications. For example, the Peripheral can be used for general purpose asset tracking, with the limitation that tracking information may only be available if the Peripheral is in proximity to a BLE Central that is listening for the Peripheral signal. The Peripheral may be used for relatively precise and frequent tracking in some scenarios, such as on highways or at pick up and drop off points, where BLE Centrals may be common, but may only provide limited information in other situations, such as when the Peripheral is loaded onto a vehicle that lacks a BLE Central or when the Peripheral is far away from major roads and highways. The simplicity and reduced cost of the Peripheral may make it attractive for use when tracking assets that are less valuable, which may render the cost of deploying a tracking device with GPS and cellular functionality prohibitively expensive.

Figure 18A:
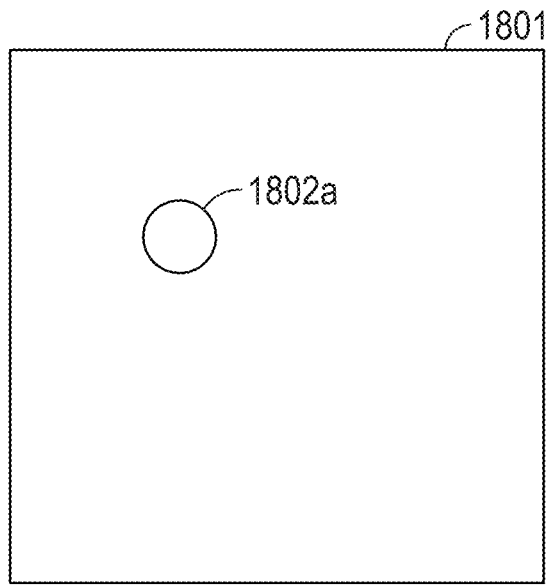
FIGS. 18A and 18B are example diagrams that illustrate geofencing, according to various implementations.
Figure 18B:
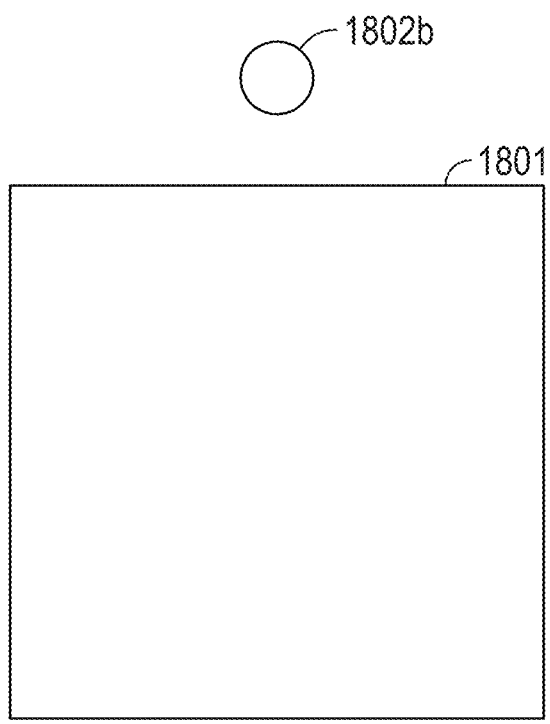

FIGS. 18A and 18B are example diagrams that illustrate geofencing according to some embodiments. In FIG. 18A, a Peripheral 1802a is located inside a geofence region 1801. The geofence region may be a physical space such as a building or job site or a virtual space corresponding to a physical area, for example a particular area within a facility or area on a map. In some embodiments, the geofence area may change over time. For example, the geofence area may be defined with respect to a moveable object such as a tractor, trailer, or other object. In some embodiments, the geofence may be defined by a distance over which a Central can detect a signal from the Peripheral. For example, a geofence may include a circular area with a radius of the expected Peripheral distance such that the Peripheral 1802a may be considered to be inside the geofence 1801 as long as a Central can receive a signal from the Peripheral 1802a. In other implementations, the geofence area could be smaller than an area covered by a Central or plurality of Centrals.

FIG. 18B depicts an example of a Peripheral 1802b outside a geofence region 1801. When the Peripheral 1802b is outside the geofence region 1801, a Backend may be configured to initiate one or more alerts or notifications to indicate that the Peripheral 1802b has left the geofence area 1801. This is but one example of how a geofencing system could work. In some embodiments, for example, rather than triggering an alert when a Peripheral leaves a geofence area, the system may be configured to generate an alert when a Peripheral enters a geofence area. For example, it may be desirable to know when an asset arrives at a facility.

Figure 19:
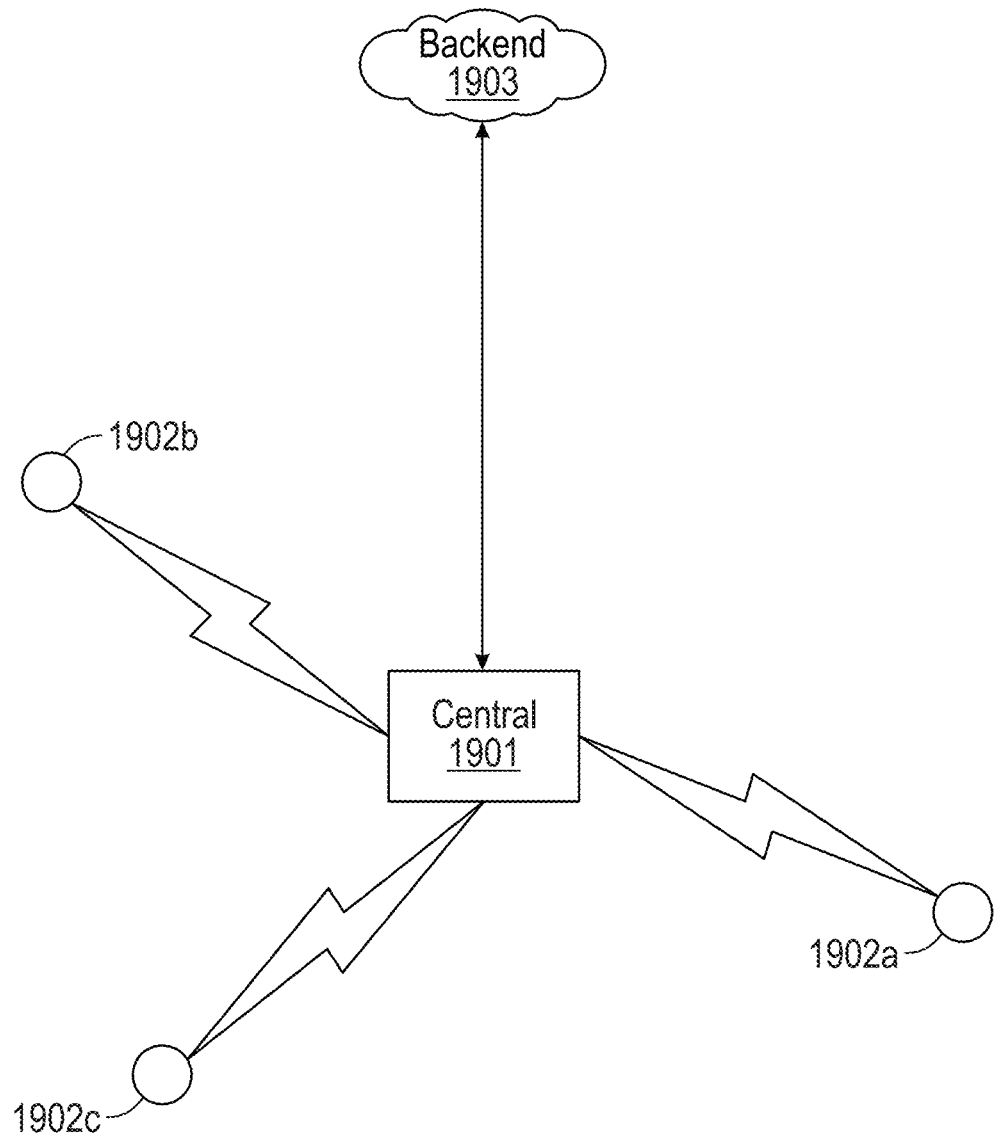
FIG. 19 is a diagram that illustrates an example of tracking Peripherals, according to various implementations.

FIG. 19 is a diagram that illustrates an example of tracking Peripherals according to some embodiments. In FIG. 19, a Central 1901 is configured with a wireless receiver (e.g., a Bluetooth low energy receiver or other wireless receiver) for receiving a signal from one or more Peripherals 1902a, 1902b, 1902c that are emitting a tracking signal. In this example, the Central 1901, which may be part of a gateway, mobile phone, or other device, includes a network communications interface (for example, a WiFi radio, a cellular or LTE radio, or a wired network connection) that enables the Central 1901 to communicate with a Backend 1903 for providing location information about the Peripherals 1902a, 1902b, 1902c. As discussed above, in some embodiments, the Central 1901 may report that it has received a signal (e.g., detected a BLE broadcast) from a Peripheral. In some embodiments, the Central 1901 may determine an approximate distance from the Central 1901 to a Peripheral from which the signal was detected. For example, in some embodiments, the Central 1901 may determine a strength of a received signal to approximate a distance to the Peripheral 1902 that transmitted the signal. In some embodiments, a transmit power is included in the signal from the Peripheral 1902 and used in more precisely determining distance from the Central 1901 to the Peripheral 1902. For example, if a Central detects BLE broadcasts from each of Peripherals 1902a and 1902b at a strength of 2Mw, but the BLE broadcast from Peripheral 1902a indicates a transmission power of 10 Mw while the BLE broadcast from Peripheral 1902b indicates a transmission power of 4 Mw, the Central (and/or gateway, mobile device, or other device associate with the Central) may determine that Peripheral 1902b is closer to the Central 1901 than to Peripheral 1902a. In some embodiments, the Central 1901 may provide an indication to the Backend that a previously-detected Peripheral is no longer being detected.

Figure 20:
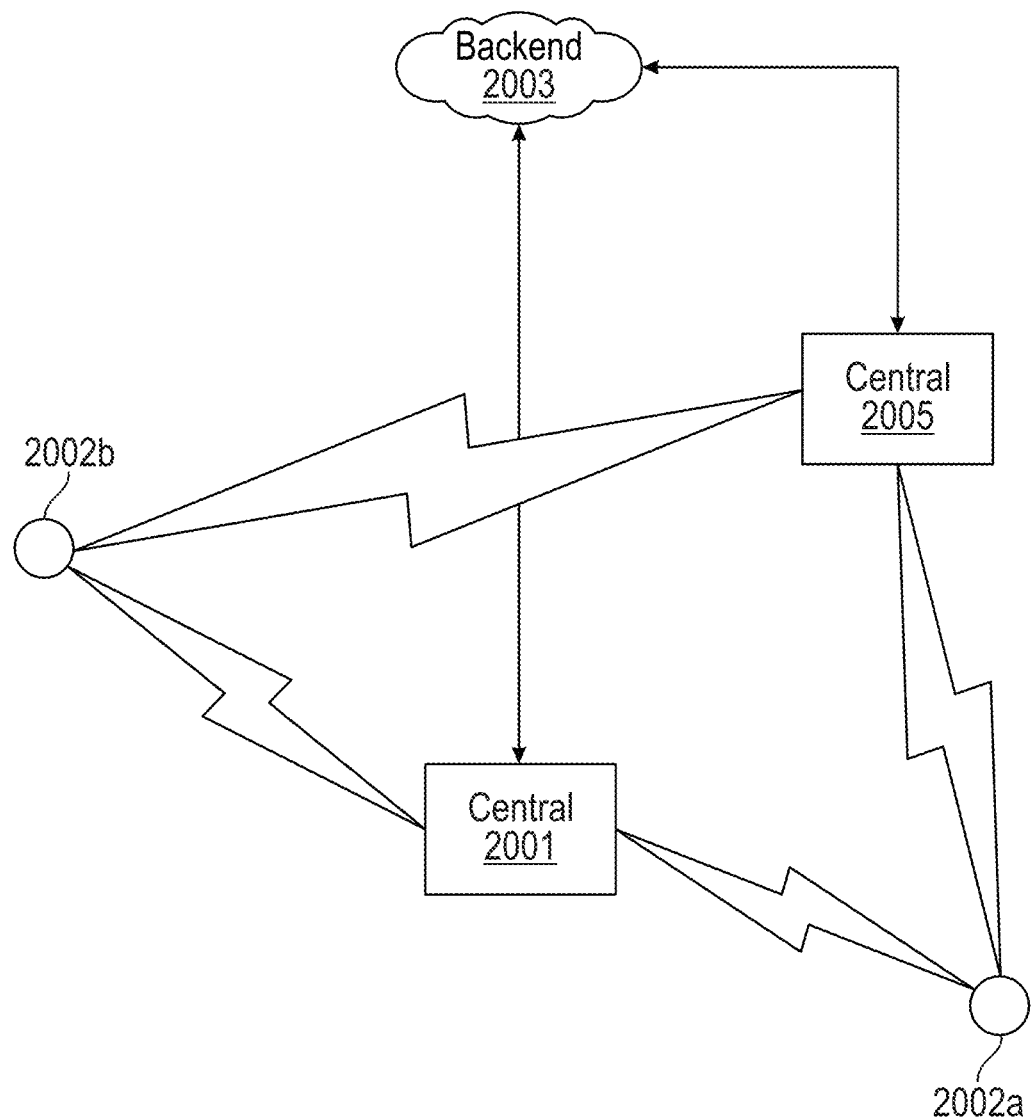
FIG. 20 is a diagram that illustrates an example of tracking Peripherals using multiple Centrals, according to various implementations.

FIG. 20 is a diagram that illustrates an example of tracking Peripherals using multiple Centrals according to some embodiments. Centrals 2001 and 2005 may be configured to receive signals from Peripherals 2002a, 2002b. Each Central 2001, 2005 may be equipped with a wireless receiver for receiving signals from Peripherals (e.g., Peripherals 2002a, 2002b) and a network interface for communicating with a Backend 2003. By deploying multiple Centrals, it may be possible to more accurately and/or precisely determine a location of a Peripheral. For example, as shown in FIG. 20, Peripherals 2002a and 2002b are closer to Central 2001 than to Central 2005. Thus, the signals received by Central 2001 may be stronger and/or at a different phase than the signals received by Central 2005. The difference in signal strength, phase, and so forth may be used to improve the determined locations of the Peripherals 2002a and 2002b. The use of multiple Centrals may also enable improved definition of a geofence area. Depending on the implementation, any quantity of Centrals may be associated with a geofence, and information from multiple Centrals may be combined to aid in determining the location of a Peripheral with reference to the geofence.

As depicted in FIG. 20, the Centrals 2001 and 2005 are in communication with the Backend 2003 but not with each other. In some embodiments, the Centrals 2001 and 2005 may be equipped with suitable communications hardware to enable them to communicate with each other. For example, the Centrals 2001 and 2005 may include Bluetooth, WiFi, infrared, or other communications hardware to enable the Centrals to communicate with each other. In some embodiments, locations of the Centrals may be determined (and/or otherwise known) by the Backend (or by another system in communication with the Backend) so that the Backend may use triangulation, trilateration, multilateration, and/or other techniques to more determine a more precise location of the Peripherals 2002. In some embodiments, however, a Central may determine the location of a Peripheral based on received signals and may provide the determined location to the Backend 2003. In some embodiments, a Central may be configured to receive information from one or more other Central for use in determining the location of a Peripheral. In some embodiments, the Centrals may not communicate with a Backend, but may instead act as local servers. For example, the Centrals may communicate with nearby devices (e.g., laptops, desktops, smartphones, tablets, and so forth) to provide location information and notifications, for example over Wifi, Bluetooth, or another suitable communication method. Such a local configuration may be desirable in locations where there is limited or no access to an internet connection.

Figure 21:
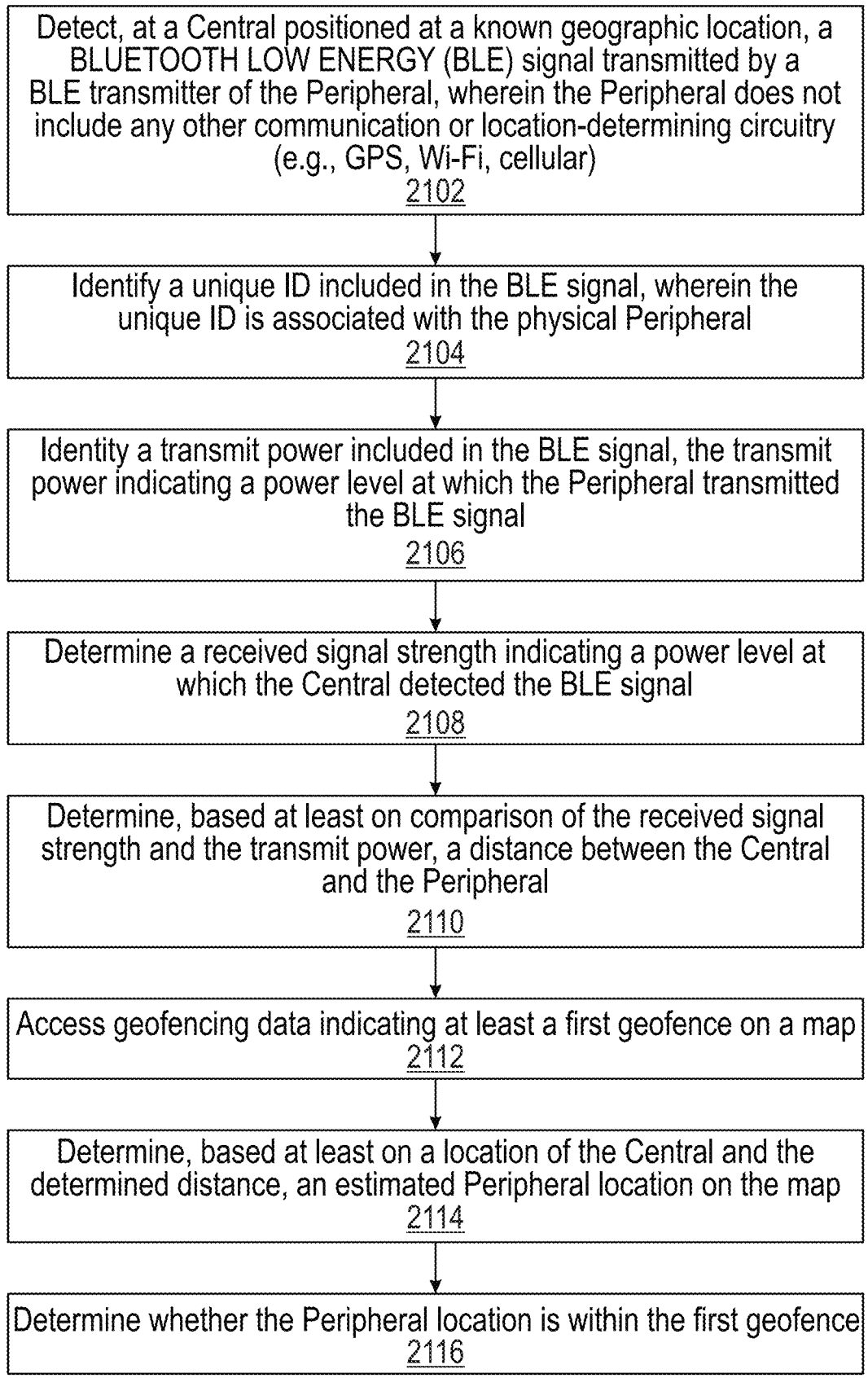
FIG. 21 is a flowchart that illustrates an example process for determining if a Peripheral is within a geofence which may be executed on a Central and/or at a Backend, according to various implementations.

FIG. 21 is a flowchart that illustrates an example process for determining if a Peripheral is within a geofence which may be executed on a Central and/or at a Backend according to some embodiments. While the description below may refer to performance of various blocks by a particular device (e.g., a Central), in some implementations the blocks may be performed by another device (e.g., the Backend) and/or a combination of devices. Depending on the embodiment, the process of FIG. 21 may include fewer or additional blocks and/or blocks may be performed in an order different than is illustrated.

In FIG. 21, a Central at a known geographic location detects a signal transmitted by a Peripheral at block 2102, for example a BLE signal. The Peripheral may not include other circuitry for communications or location determination, such as GPS, Wi-Fi, or cellular and, thus, may require a fraction of the power that would be necessary to power a Peripheral that includes these other communication circuits. At block 2104, the Central identifies a unique ID included in the BLE signal that is associated with the particular Peripheral (e.g., a serial number or MAC address of the Peripheral, such as a 48-bit value that uniquely identifies the BLE communication circuit of the Peripheral). At block 2106, the Central identifies a transmit power in the BLE signal, the transmit power indicating the power level at which the Peripheral transmitted the BLE signal. At block 2108, the Central determines a received signal strength indicating the power level at which the Central detected the BLE signal. At block 2110, the Central determines, using at least the received signal strength and the transmit power, a distance between the Central and the Peripheral. At block 2112, the Central accesses geofencing data that indicates at least a first geofence on a map. At block 2114, the Central determines, based at least in part on the location of the Central and the determined distance of the Peripheral, an estimated (or "proxy") geographic location of the Peripheral, such as, for example, coordinates (e.g., latitude and longitude or a set of latitudes and longitudes) that may be used to indicate the position on a map. At block 2116, the Central determines whether the Peripheral location is within the first geofence.

FIG. 21 is provided as one example and other embodiments of a low power geofencing system are possible. For example, in some embodiments, the Central may not perform blocks 2110, 2112, 2114, and 2116, and those blocks may instead be performed by a Backend or by a second Central that is in communication with the Central.

Example Asset Tracking and Peripheral Features and Functionality

Described below are further example implementations, features, and functionality of the system and associated components described above. These further example implementations, features, and functionality involve, consistent with the description provided above, communications among Peripherals, Centrals, and a Backend.

As generally described herein, a Central may be a device, such as a gateway (which may be powered or unpowered), that scans or observes for broadcasts from Peripherals, such as over BLE (Bluetooth Low Energy). Centrals may log identifying information of Peripherals. Combining the Central's data (on the Central and/or on the Backend), the Backend (or Central) can compute an approximate location of the Peripheral. A "Central" may also be referred to herein as a "Scanner," an "Observer," a "Crux Central," and/or the like.

As also generally described herein, a Peripheral may be a device that sends a broadcast (e.g., a BLE advertisement) that may be received by a Central. In some implementations, Peripheral's communication functionality may only include BLE communication functionality. A Peripheral's location may be determined and/or approximated by association with a Central (the location of which may be known or provided by the Central via, e.g., GPS functionality of the Central), and may be stored (e.g., at a Backend) and displayed on a user interface. A "Peripheral" they also be referred to herein as an "Advertiser," a "Broadcaster," and/or the like.

As further generally described herein, the recording of a broadcast by a Central may be referred to as an observation. Observations may be sent up to the Backend via WiFi and/or cellular communications, and then associated with the latest GPS location of the Central sent up by the Central, and finally written to a statistics ("stats") stream as the Peripheral's approximate location. In various implementations, this combined observation and location stat may be referred to as a proxy location for the peripheral. Further description and details are provided herein.

Figure 22A:
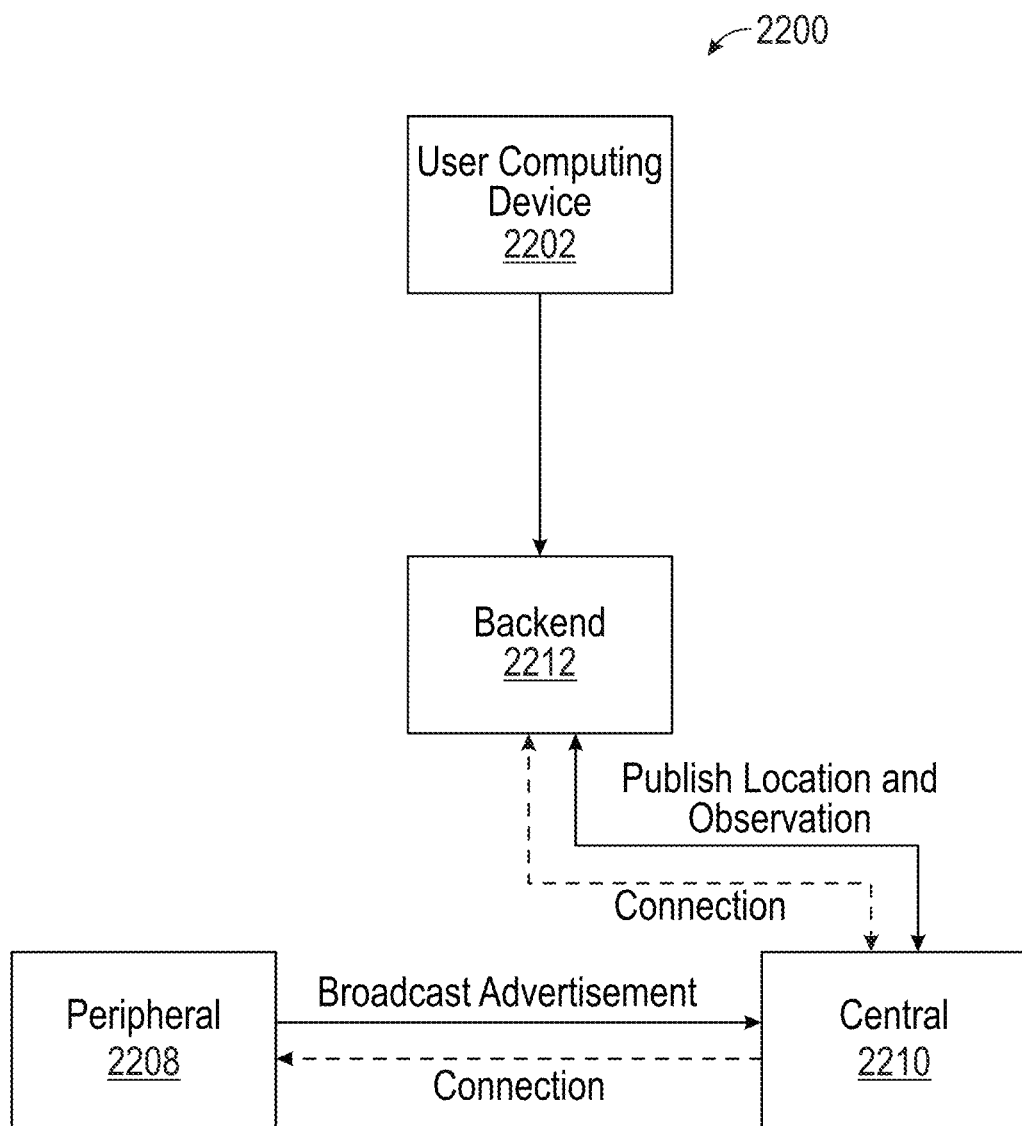
FIG. 22A is a block diagram illustrating an example operating environment of the system, according to various implementations.

FIG. 22A is a block diagram illustrating an example operating environment 2200 of the system, including example communications among Peripherals, Centrals, and a Backend. Such communications may be referred to herein as "crux communications," "crux protocol," and/or the like. The communications may include protocols or methods of communication provided, in part, via Bluetooth communications, broadcasts, observations, and/or the like. The communications may further be paired with algorithms for interpreting Bluetooth observations and converting them to accurate location data. In the illustrated example, operating environment 2200 includes one or more user computing devices 2202, one or more peripherals 2208, one or more centrals 2210, and a backend 2212.

In some implementations, user computing device 2202 may be any mobile device, such as a mobile phone, tablet, laptop, desktop, and/or the like. In some implementations, user computing device 2202 may be another system, component of a system, application programming interface (API), or other computing device that may communicate with the backend 2212. The user computing device 2202 may communicate with the backend 2212 via a web interface or standalone application, such as via an application programming interface (API) configured to communicate with the backend 2212. The user computing device 2202 may communicate with the backend 2212 via one or more networks, such as a local area network, wide area network (e.g., the internet), and/or the like. Communications may enable management of connected operations and allow users to monitor assets such as peripherals 2208.

A central 2210 may be a gateway (that may or may not be powered) that scans or observes advertisements/broadcasts from peripherals 2208, such as over BLE (Bluetooth Low Energy). A central 2210 may log identifying information of one or more peripherals 2208, which may be referred to herein as an observation stat. As discussed further below, data from a central 2210, such as observations of peripherals 2208, may be combined on the central 2210 and/or on the backend 2212. This may enable the backend 2212 to compute an approximate location of a peripheral 2208.

A peripheral 2208 may be any device that sends a broadcast that may be received by a central 2210. The communication functionality of a peripheral 2208 may include BLE communication functionality. The location of a peripheral 2208 may be determined and/or approximated by association with a central 2210 (the location of which may be known or provided by the central 2210 via, e.g., GPS functionality of the central 2210), and may be stored (e.g., at the Backend 2212) and displayed on a user interface, such as those discussed above with reference to FIGS. 6, 13A-13B, and 14A-14B.

A central 2210 may be configured to geolocate itself using, for example, Global Positioning System (GPS) functionality, and/or the like. Additionally, the central 2210 may be configured to record, or observe, broadcasts (also referred to herein as "advertisements") from a peripheral 2208. A broadcast can be a specifically formatted message. A central 2210 may send observations (e.g., received broadcasts) to the backend 2212 via a network connection such as WiFi and/or cellular communications. The observations may then be associated with the latest GPS location of the central 2210 as communicated by the central 2210. This may allow the system to infer the location of a peripheral 2208. For example, a central may report to the backend that it has received a broadcast from the peripheral 2208 and is located at location L. The backend can then associate Location L (+/− an estimated distance between the central 2210 and the peripheral 2208) with the peripheral 2208. In some cases, this inferred location may be referred to as a proxy location for the peripheral 2208. This proxy location may be written to a statistics ("stats") stream as the approximate location of the peripheral 2208.

In some implementations, the central 2210 may perform self-geolocation and observations asynchronously at a firmware level. To ascertain a proxy location for the peripheral 2208, the geolocation and observation stats may be matched based on timestamps. For example, when an observation is received at time t, a location that was collected as closely as possible to t may be associated with the peripheral 2208. The central 2210 and/or the backend 2212 may be configured to match timestamps including in the stats.

Use of proxy locations for peripherals may provide various technical improvements to an asset tracking system. For example, the use of proxy locations may enable lower power requirements, providing for increased flexibility in the size of a peripheral 2208, and the types of batteries installed, such as flight-safe batteries. Additionally, proxy locations enable simpler electronic design and a smaller form factor. Further, use of proxy locations may allow faster and/or more frequent location updates than other low-power consuming devices. Finally, proxy locations may be optimized through communication with out-of-organization centrals 2210 (e.g., a peripheral may be managed by a different organization than the central) to provide a greater range of location coverage and improved location accuracy.

Timestamp matching may be handled at either the Central or Backend. Implementing the matching at the Backend may provide certain advantages. For instance, backend implementation may enable centralization of matching logic. If done at the Central level, the matching logic may need to be written for each system-compatible device and/or firmware, which may create fragmentation. However, if performed at the Backend, the same matching logic may be used for all devices. Additionally, backend matching may simplify the system communication protocol such that the Central can simply listen for Peripheral messages (e.g., broadcasts from Peripherals) and forward them to the Backend "as is". This can minimize code changes to make a gateway "enabled" for communications in the system and/or operating environment (e.g., "Crux Enabled"). Further, code written in the Backend may be easier and faster to write, test, and deploy than firmware code for Centrals. Also, while the Centrals collect some data directly, the Backend can access even more data, giving better perspectives for feature evolution, such as for cell and/or wifi-based geolocation, or interpolated locations).

Figure 22B:
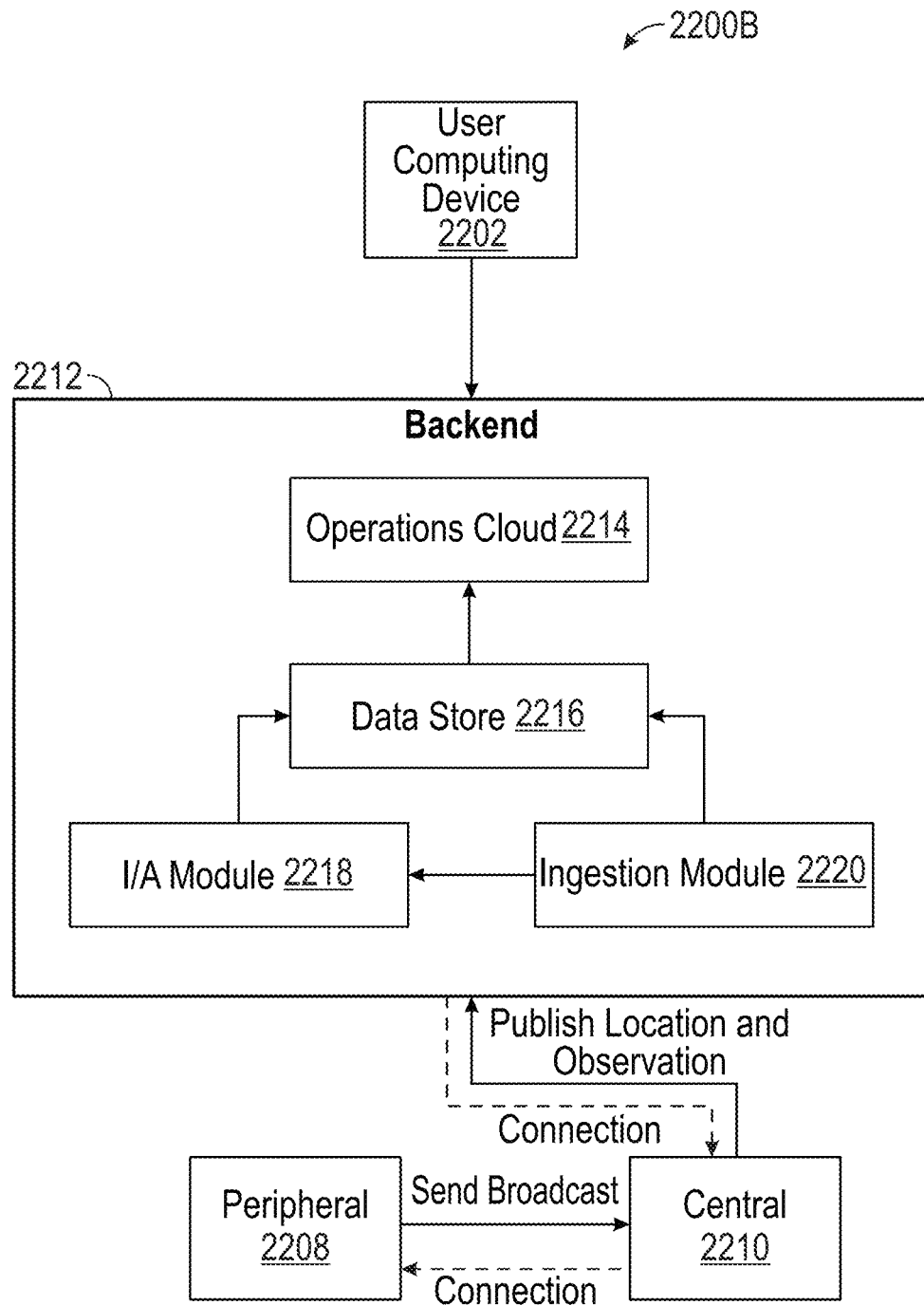
FIG. 22B is another block diagram illustrating a further example operating environment of the system, according to various implementations.

FIG. 22B is a block diagram illustrating a further example operating environment 2200B, which may be similar or the same as the operating environment of FIG. 22A, with additional details of an example backend 2212, as illustrated. In the illustrated example, operating environment 2200B also includes one or more user computing devices 2202, one or more peripherals 2208, one or more centrals 2210, and a backend 2212. In this example, the backend 2212 includes an operations cloud 2214, a data store 2216, an inference and aggregation (I/A) module 2218, and an ingestion module 2220.

The operations cloud 2214 represents a system that communicates with physical assets, such as sensors associated with a fleet of vehicles, to provide comprehensive visibility into operations across an entire organization. This operations cloud 2214 is configured to integrate with various physical operations, such as through communications with sensors and/or devices in industries such as construction, transportation and logistics, home and commercial services, food and beverage, local government, passenger transit, utilities, and/or the like. In the example of FIG. 22B, the operations cloud 2214 is shown in communication with a user computing device 2202. The user computing device 2202 may be used by a user, such as a manager, supervisor, or employee of an organization. The user computing device 2202 is configured to display interactive data to the user, including real-time dashboards that provide up-to-date information about the physical assets of the organization. This enables effective monitoring, management, and decision-making regarding physical assets.

The operations cloud 2214 may utilize advanced data processing and analytics to aggregate and analyze data from diverse sources, ensuring accurate and actionable insights. It may support scalable and secure communication protocols to ensure reliable data exchange between the cloud and the physical assets. Additionally, the operations cloud 2214 may be customized to meet specific operational needs of different industries, facilitating tailored solutions that enhance operational efficiency and productivity.

The data store 2216 may be used to store time series data (and/or non-time series data) including, for example, information relating to locations of centrals 2210 and peripherals 2208 at various times. The operations cloud 2214 may access data from the data store 2216, such as to provide location data of centrals and peripherals to, e.g., users via various user interfaces of user computing device 2202.

The details of the communications methods and processes may be encapsulated in peripheral/central firmware and an ingestion pipeline comprising the ingestion module 2220 and the inference and aggregation ("I/A") module 2218. The ingestion module 2220 may be configured to receive observation and location information from centrals 2210 as a data and/or statistics stream. The ingestion module 2220 may write data and/or statistics directly to the data store 2216 and communicate data and/or statistics to the I/A module 2218.

The I/A module 2218 may be configured to ingest data and/or statistics received from the ingestion module 2220. The I/A module 2218 may parse geolocation and observation stats to determine a timestamp for each event and match timestamps to determine proxy locations of the peripheral 2208. For example, the I/A module 2218 can record geolocation stats, each indicating locations of the Central 2210 at different times, and observation stats, each indicating specific Peripherals and times at which broadcasts were received. The I/A module 2218 can parse these location and observation stats to determine a timestamp for each. The I/A module 2218 can then match geolocation stats to observation stats, such as by determining whether timestamps of the corresponding geolocation and observation events match, e.g., an exact match or within a particular time threshold. Matched geolocation and observation stats can be used to infer a proxy location for the peripheral 2208. This proxy location can be written to the data store 2216 as the location for the peripheral 2208. In some implementations, the proxy locations are used by the operations cloud 2214 in the same manner as locations obtained via direct location determination of devices, such as via a GPS antenna. In some implementations, the operations cloud 2214 may maintain distinctions between proxy and direct locations, such as to allow a user to selectively view proxy and/or direct locations of a Peripheral on a map.

Figure 22C:
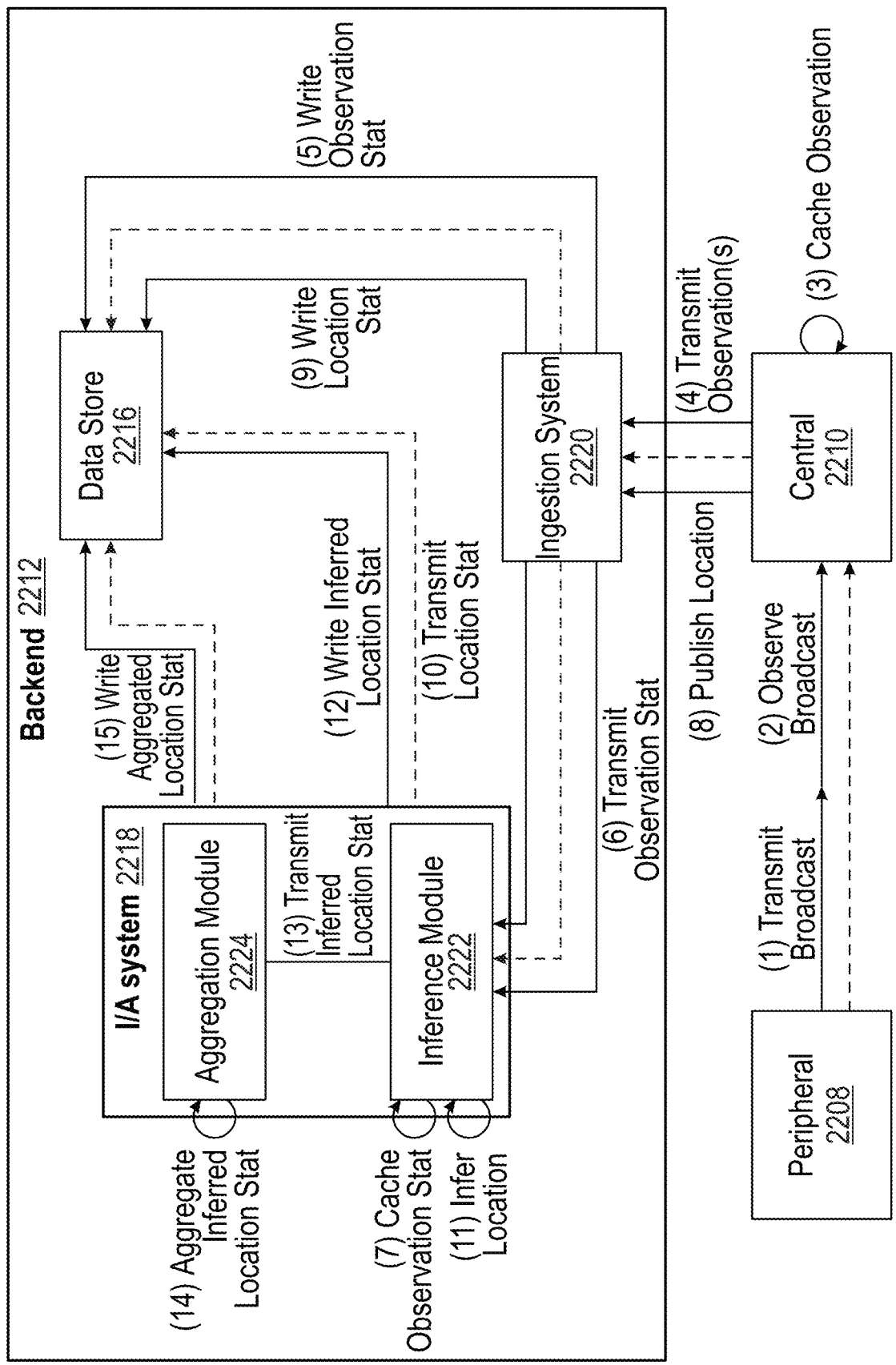
FIG. 22C is a block and data flow diagram illustrating an example operation of the system, according to various implementations.

FIG. 22C is a block and data flow diagram illustrating further example implementation details of communications among various components of the system of, e.g., FIGS. 22A-22B, according to various implementations. In the illustrated example, the I/A module 2218 includes an inference module 2222 and an aggregation module 2224. As discussed in further detail herein, the inference module 2222 can receive observation and location data and/or statistics from the ingestion module 2220, infer a location based on the received information, and write the inferred location to the data store 2216 and/or provide to the aggregation module 2224. The aggregation module 2224 can receive inferred location statistics from the inference module 2222, aggregate the received information, and write the aggregated location statistic to the data store 2216.

An example implementation of the proxy location determination and aggregation is discussed below with reference to actions 1-14 illustrated in FIG. 22C. In various implementations, the processes may be performed by fewer or additional modules, and/or the processes may be performed in an order different than is illustrated.

In the example of FIG. 22C, at action (1) the peripheral 2208 periodically broadcasts a Bluetooth broadcast. Centrals 2210, such as VGs, AGs, or mobile devices configured as centrals, can listen for and receive these broadcasts. A received broadcast may be referred to as an observation, and information associated with the observation as an observation stat. At action (2), the central 2210 observes one or more broadcasts broadcast by the peripheral 2208. At action (3), the central 2210 temporarily stores, or caches, the observation(s), which may be combined with other observations before transmitting to the Backend 2212. Caching of individual observations can allow the central 2210 to conserve cellular data that would otherwise be expended through constant or more frequent connection to the backend 2212, such as by transmitting each individual observation to the backend 2212. At action (4), the central 2210 transmits the cached observations to the backend 2212, such as to an ingestion module 2220 of the backend 2212 that performs stat ingestion operations.

At action (5), the ingestion module 2220 receives the observations from the central 2210 and writes the observations to the data store 2216. Concurrent with action (5), at action (6) the ingestion module 2220 transmits the observations to the inference module 2222. In some implementations, the observations may be transmitted at different times to the inference module and the data store. In some implementations, the inference module 2222 accesses observations from the data store 2216, such that the ingestion module 2220 may not need to separately send the observations directly to the inference module 2222. At action (7) the inference module 2222 caches the observations for association with a location of the central 2210.

At action (8), the central 2210 periodically provides its GPS location (e.g., at regular intervals or in response to a trigger, such as a change of location) to the backend 2212, using the illustrated ingestion module 2220. At action (9), the ingestion module 2220 receives the location information (also referred to herein as "locations" or "location stat") and writes the location stat to the data store 2216. Concurrent with action (9), at action (10) the ingestion module 2220 transmits the location stat to the inference module 2222. In some implementations, the locations may be transmitted at different times to the inference module and the data store. In some implementations, the inference module 2222 accesses location stats from the data store 2216, such that the ingestion module 2220 may not need to separately send the location stats directly to the inference module 2222.

At action (11), the inference module 2222 uses the location and observation stats to infer a location of the peripheral 2208. For example, the inference module 2222 may use the timestamp matching processes described above with reference to FIG. 22A, matching timestamps of location and observation stats to determine proxy locations of the peripheral 2208. At action (12), the inference module 2222 writes the inferred location to the data store 2216.

At action (13), the inference module 2222 transmits the inferred location to the aggregation module 2224. Alternatively, the aggregation module 2224 may access the inferred location from the data store 2216. At action (14), the aggregation module 2224 aggregates inferred locations of Peripherals. For example, the aggregation module 2224 may identify multiple inferred locations of a peripheral 2208 that may be triangulated to generate a more precise inferred location of the peripheral 2208. For example, the ingestion module 2220 may receive observations and location stats from a plurality of centrals 2210 that correspond to a single peripheral 2208. The inference module 2222 may initially access this information and generate a plurality of inferred locations for the peripheral 2208, such as one for each central 2210. These inferred locations may then be accessed by the aggregation module 2224, which may attempt to triangulate a location of the peripheral 2208 based on the inferred locations.

In some implementations, the aggregation module 2224 may receive information about the Bluetooth heuristics of the central 2210 associated with each inferred location, such that for each inferred location a circular range in which the peripheral 2208 may be located may be generated. The aggregation module 2224 can utilize an algorithm and the generated ranges to triangulate a location of the peripheral 2208. The aggregation module 2224 may not use all inferred locations associated with the peripheral 2208. For example, the aggregation module may use only inferred locations associated with a particular time range and discard any outside that range. For example, inferred locations for a peripheral with timestamps that are all within a time range of x seconds (e.g., 1, 2, 3, 4, 5, 10, 20, 30, or 60 seconds) may be used to determine an updated inferred location of the peripheral. In some implementations, the aggregation module 2224 may use machine learning to determine which inferred locations to utilize in triangulation and in performing the actual triangulation of the peripheral 2208 location. If an updated inferred location is determined for a peripheral, the aggregation module 2224 may, at action (15), write the location stat to the data store 2216.

Example Connection Throttling Features and Functionality

Figure 23:
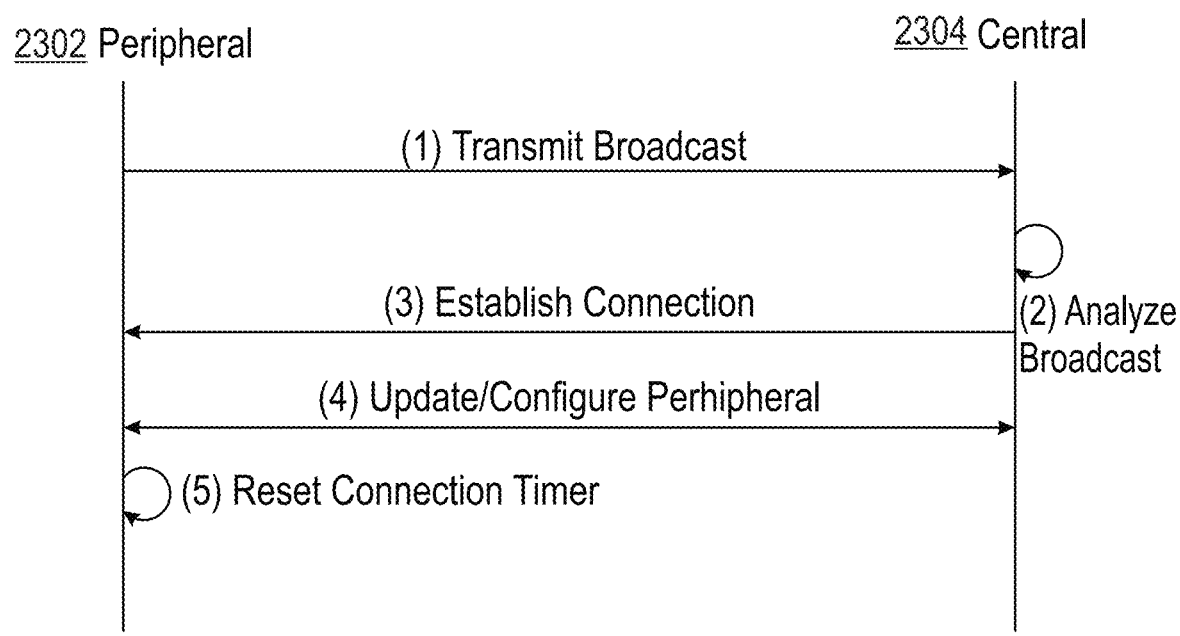
FIG. 23 illustrates a data flow diagram illustrating an example of communications between a peripheral and a central to enable connection throttling, according to various implementations.

FIG. 23 illustrates a data flow diagram illustrating an example of communications between a peripheral 2302 and a central 2304 to enable connection throttling. Connection throttling is an optimization related to bi-directional communications between Centrals and Peripherals. A "connection," as discussed herein, generally refers to a bi-directional communication between a Central and a Peripheral that allows the Central to configure settings on the Peripheral and/or update the Peripheral. Connection throttling allows for fewer connections between centrals and peripherals, which can lead to improved location services and peripheral battery life as well as reduced bandwidth, while still allowing for updates to, and configuration of, a peripheral. While connected, peripherals may stop broadcasting broadcasts. In such case, determining a proxy location of the connected peripheral can be impaired by a lack of broadcast observations by centrals. Thus, reducing the connection time and/or number of connections can lead to improved location services. Additionally, connections can utilize a significant amount of power, such that reducing connection time and/or the number of connections can lead to improved battery life of a peripheral. As discussed further below, connections between Centrals and Peripherals may be limited to address these technical challenges.

Although actions are illustrated in a particular order in the example of FIG. 23, in other implementations actions may be performed multiple times, the order of the actions can be changed, and/or one or more actions can be performed concurrently. Additionally, fewer, more, or different actions can be performed.

As illustrated, at action (1) the peripheral 2302 periodically broadcasts a Bluetooth broadcast, which may be detected by nearby devices. For example, the peripheral 2302 may broadcast a broadcast every 8 seconds. In some implementations, the peripheral 2302 may transmit broadcasts at shorter or longer intervals and/or the interval may vary from one peripheral to another or may be dynamically determined. Centrals, such as VGs and powered AGs, can listen for and receive broadcasts. In some implementations, broadcasts may include metadata indicating a time since connection, a distance threshold, and/or firmware data, such as firmware image or configuration version information. A time since connection indicates an amount of time that has passed since the last connection of the peripheral to any central. A distance threshold indicates a limit on how far away a central can be from the peripheral before establishing a connection is recommended. Firmware data may indicate a firmware image or configuration version information, which provides details about the peripheral's current software version and/or configuration. This metadata may be encoded into a few bits of the broadcast, which may be used to determine the corresponding data by the central, such as in a lookup table. For example, the time since connection may be indicated as a count in the broadcasts that is representative of a time period that may be looked up by the central based on the example below:

| Count | Time Since Connection |
| --- | --- |
| 0 | Unknown |
| 1 | Less than 15 minutes ago |

-continued

| Count | Time Since Connection |
| --- | --- |
| 2 | 15-30 minutes |
| 3 | 45-60 minutes |
| 4 | 1-2 hours |
| 5 | 2-4 hours |
| 6 | 4-8 hours |
| 7 | 8-24 hours |
| 8 | 1-2 days |
| 9 | 2-4 days |
| 10 | 4-7 days |
| 11 | 1-2 weeks |
| 12 | 2-4 weeks |
| 13 | 4-8 weeks |

In this example, a count of 4 indicates a last connection was successful 1-2 hours prior to the broadcast's timestamp. In other implementations, metadata in other formats may be used to encode the various data of the broadcasts.

In some implementations, each broadcast from a peripheral may include the time since connection. In other implementations, the time since connection may be included in broadcasts only after a threshold time has passed since a previous connection to a Central. For example, broadcasts from a Peripheral may only include the time since connection when the time exceeds a threshold, such as one day, one week, one month, etc. In some implementations, the distance threshold may begin to increase after a time since connection has reached a threshold.

In some implementations, the peripheral 2302 may increase the distance threshold over time, e.g., based on the time since connection. For example, the distance threshold for the peripheral 2302 may start out at a radius of 100 feet and increase every hour or day until a connection is made with a central, such as central 2304. In some implementations, the distance threshold may not begin to increase until a time since connection has reached a threshold. In some implementations, the distance threshold can increase at a slower or faster rate (e.g., 10 feet, 50 ft, etc.) and/or at shorter or longer time intervals (e.g., every 6 hours, 12 hours, 24 hours, etc.). For example, a distance threshold associated with a first peripheral may be configured to increase at a rate of 100 feet every 24 hours until successfully connected to a central, while another peripheral may be configured to increase a distance threshold by 100 feet every 24 hours until the time since connection reaches two weeks, at which point the distance threshold may increase 500 feet every 24 hours until successful connection. These settings may have default values or may be customizable by an organization for all associated peripherals and/or any subset of peripherals of an organization. In some implementations, these settings may be dynamically adjusted by a machine learning algorithm.

At action (2), the central 2304 has identified a broadcast from the peripheral 2302 and parses the broadcast to determine time since connection of the peripheral 2302. The central 2304 may then compare the advertised time since connection to a connection time threshold, such as may be set on the central 2304 and/or provided by the peripheral. The connection time threshold indicates a minimum time between connections of the peripheral to a central. Thus, if the current time since connection of a peripheral is less than the connection time threshold, a connection between the peripheral and central is not initiated, saving bandwidth and battery power of the peripheral and allowing the peripheral to continue to be discoverable by centrals. The connection time threshold may be a period of time such as one day, one week, or one month, for example, and may be user customizable for all peripherals or some subset of peripherals of an organization.

In some implementations a connection time threshold at a central may be overridden, such as to reduce (or disregard) the time threshold to expedite an urgent software update to peripherals. The connection time threshold may vary based on peripheral characteristics, such as model or capabilities of the peripheral. For example, an urgent firmware update for model X of a peripheral may be pushed to model X peripherals by temporarily overriding the connection time threshold (e.g., setting the time to 0 hours) for the model X peripherals, while maintaining the connection time threshold for other models of peripherals to which the firmware update is not applicable.

In implementations where a distance threshold is provided in the broadcast, the central 2304 can parse the broadcast to determine the distance threshold. In some implementations, a distance threshold may be set at the central 2304, which may be applied to all peripherals. The central 2304 can determine the distance of the central 2304 from the peripheral 2302, such as central 2304 based on a RSSI (received signal strength indicator), a transmit power of the peripheral 2302 (as included in the broadcast from the peripheral 2302), and/or a combination of this information or other information. The central 2304 may be configured to not initiate a connection with the peripheral 2302 if the determined distance to the peripheral 2302 is greater than the applicable distance threshold.

In some implementations, the central 2304 may be configured, e.g., by default or user-configurable settings, to prioritize connecting to peripherals based on proximity, which may improve efficiency of communications and minimize potential interference. For example, the central 2304 can compare the distance between the central 2304 and multiple peripherals that are available for connection (e.g., based on meeting the time since last connection threshold) and prioritize connections based on the distances. In some implementations, the central 2304 may determine a connection order based on a combination of time since connection and distance of multiple peripherals.

In some implementations, the central 2304 can also parse the broadcast structure to determine firmware data, such as firmware image or configuration version information peripheral 2302. In some implementations, the central 2304 may determine, based on the firmware image or configuration version, that the peripheral 2302 does not require an update and/or configuration and, therefore, may determine not to establish a connection. Similarly, if the central 2304 determines that the peripheral 2302 does require a firmware update and/or configuration update, and the time threshold and/or distance threshold are satisfied, the central 2304 may initiate a connection with the peripheral 2302.

At action (3) the central 2304 establishes a Bluetooth connection to the peripheral 2302, which allows bi-directional communications. Then, at action (4), the central 2304 can perform functions enabled by connection to the peripheral 2302, such as providing a firmware update to the peripheral 2302. Similarly, the central 2304 may also perform a configuration update of the peripheral 2302, such as an update to the transmit power or advertising interval of the peripheral 2302. Additionally, the central 2304 may direct the peripheral 2302 to perform a specific function. For example, to support RSSI from a mobile device, the central 2304 may direct the peripheral 2302 to temporarily boost broadcasts by modifying the advertising interval of the peripheral 2302 from every 8 seconds to every 1 second for a period of 1 hour. Further, the connection may enable offloading of time series data from the peripheral to the central. At action (5) the peripheral 2302 resets the time since connection count. For example, in an implementation using the time since connection lookup table provided above, the time since connection count is reset to 1 to indicate that the last connection was less than 15 minutes ago. In some implementations, if the central 2304 determines at action (2) that connection to the peripheral is not needed because there are no updates to the firmware or configuration information, the central 2304 may indicate to the peripheral that the time since connection count may be reset also.

Example Process for a Central to Connect to a Peripheral

Figure 24:
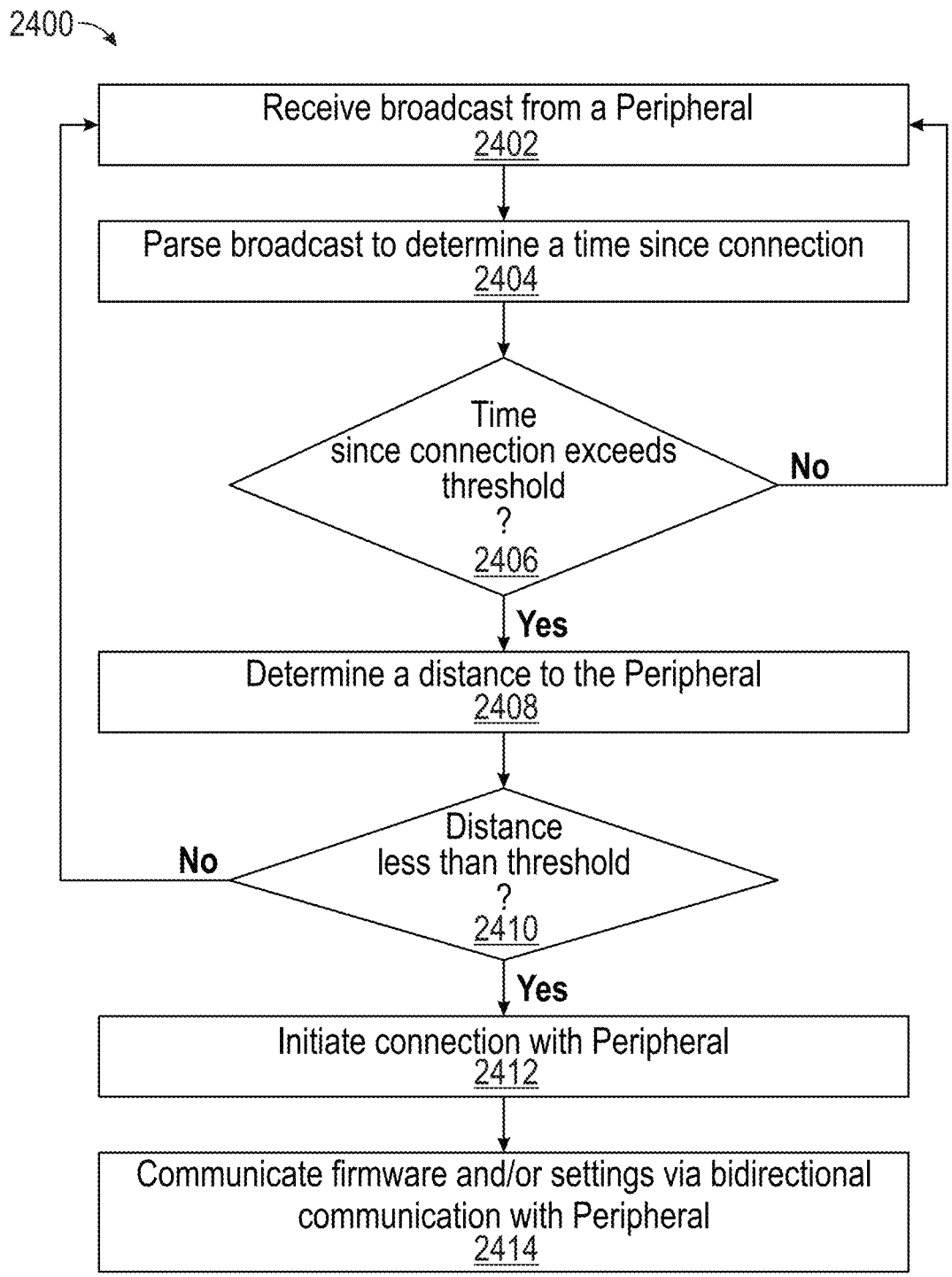
FIG. 24 is a flowchart illustrating an example process for a central to connect to a peripheral, according to various implementations.

FIG. 24 is a flowchart illustrating an example process 2400 that may be permed by a Central to determine when to connect to a Peripheral. Although blocks are illustrated in a particular order in the example of FIG. 23, in other implementations blocks may be performed multiple times, the order of the blocks can be changed, and/or one or more blocks can be performed concurrently. Additionally, fewer, more, or different blocks can be performed.

Beginning at block 2402, a Central (e.g., the Central 2304 or any other Central) receives a broadcast from a Peripheral (e.g., the peripheral 2302 or any other Peripheral). The broadcast may comprise metadata including a time since connection, a distance threshold, a time stamp, a transmit power, and/or other information.

At block 2404, the Central parses the broadcast to determine a time since connection. As described herein, the time since connection may be indicated by a count that is representative of a time period that may be looked up in a lookup table by the Central.

At block 2406, the Central determines whether the time since connection exceeds a connection time threshold. For example, the connection time threshold may correspond to a period of one day, one week, one month, or any other time period. In some cases, the connection time threshold may be maintained by the Central (e.g., set by an organization for use with all Peripherals for which broadcasts are received) and/or it may be included in the broadcast metadata (e.g., customized per Peripheral).

If the connection time threshold has not been exceeded, the process returns to block 202 without initiating a connection to the Peripheral.

If, however, the connection time threshold has been exceeded, the process continues to block 2408 where the Central determines a distance to the Peripheral. For example, the Central may determine a distance to the Peripheral based on a RSSI, a transmit power of the Peripheral (which may be included in the broadcast), and/or a combination of this or other information.

At block 2410, the Central determines whether the distance satisfies a distance threshold that is either stored by the Central and/or included in the broadcast metadata from the Peripheral. The distance threshold may indicate a maximum distance allowable for connection to the Peripheral. If the distance determined at block 2408 is more than the distance threshold, the Central may determine that the distance threshold is not satisfied and the process returns to block 2402 with initiating a connection with the Peripheral. If, however, the distance determined at block 2408 is shorter than or equal to the distance threshold, the Central may determine that the distance threshold is satisfied and the process continues to block 2412. In some implementations, the distance threshold may act as a preferred maximum distance such that it may be disregarded or exceeded in certain scenarios, such as, for example, the case of an urgent update or if a long period of time has passes since a last connection with the Peripheral. For example, if it has been longer than 3 months since a Central has connected to the Peripheral, and the threshold period is 1 month, the Central may be configured to override the distance threshold by a certain amount or altogether in an attempt to connect with the Peripheral.

At block 2412, the central initiates a connection with the Peripheral, which enables bi-directional communication between the Central and Peripheral. Then, at block 2414, the Central communication firmware and/or settings updates to the Peripheral. Upon successful connection, the Peripheral may reset it's connection timer so that a next connection with the Peripheral is deferred until the connection time threshold is again exceeded.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as "h" "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a 'ser's computer (e.g., the executing computing device), partly on the 'ser's computer, as a stand-alone software package, partly on the 'ser's computer and partly on a remote computer or entirely on the remote computer or server. In the latter scenario, the remote computer may be connected to the 'ser's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like, with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac os, iOS, Android, Chrome OS, Windows OS (e.g., Windows XP, Windows Vista, Windows 7, Windows 8, Windows 10, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like, may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

EXAMPLE CLAUSES

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computerized method, performed by a computing system configured as a central and having one or more hardware computer processors and one or more non-transitory computer readable storage device storing software instructions executable by the central to perform the computerized method comprising: receiving a broadcast from a peripheral; parsing the broadcast to determine a time since connection indicating a time period since the peripheral last connected with any of a plurality of centrals; determining whether the time since connection exceeds a threshold time period; determining, based on a signal strength of the broadcast from the peripheral, a distance from the central to the peripheral; determining whether the distance to the peripheral is less than a threshold distance; and in response to determining that the time since connection exceeds the threshold time period and the distance to the peripheral is less than a threshold distance, initiating a connection with the peripheral, wherein the connection with the peripheral enables bi-directional communication.

Clause 2. The computerized method of clause 1, wherein the peripheral is configured to reset a connection timer in response to successful connection with the central.

Clause 3. The computerized method of clause 1, wherein the broadcast comprises transmit power of the peripheral, and wherein the computerized method further comprises determining, based on the transmit power of the peripheral, a distance from the central to the peripheral.

Clause 4. The computerized method of clause 1, wherein the peripheral is a first peripheral, and wherein the computerized method further comprises: determining a distance from the central to each of at least two additional peripherals; determining that a second peripheral of the at least two additional peripherals is closer in distance to the central than a third peripheral of the at least two additional peripherals; and initiating a connection with the second peripheral.

Clause 5. The computerized method of clause 4, wherein a time since connection corresponding to the second peripheral is associated with a shorter time period than a time since connection corresponding to the third peripheral.

Clause 6. The computerized method of clause 1, further comprising, in response to a successful connection with the peripheral, performing an update to the peripheral.

Clause 7. The computerized method of clause 6, wherein the update to the peripheral comprises at least one of a firmware update or a configuration update.

Clause 8. The computerized method of clause 1, wherein the broadcast further comprises at least one of firmware image information or configuration version information.

Clause 9. The computerized method of clause 8, further comprising: determining, based on at least one of the firmware image information or the configuration version information, that the peripheral requires an update; and based at least in part on determining that the peripheral requires an update, initiating a connection with the peripheral.

Clause 10. A computerized method, performed by a computing system configured as a peripheral and having one or more hardware computer processors and one or more non-transitory computer readable storage device storing software instructions executable by the peripheral to perform the computerized method comprising: determining, based on a connection timer configured to track a time since last connection of the peripheral to a central, a time since connection; transmitting a broadcast including the time since connection, wherein the broadcast is configured to be detected by one or more centrals of a plurality of centrals; receiving a connection request from a first central of the plurality of centrals, wherein receiving the connection request indicates that the first central determined that the time since connection exceeds a threshold time; communicating with the central to receive one or more configuration updates; and resetting the connection timer.

Clause 11. The computerized method of clause 10, wherein the broadcast further comprises a distance threshold.

Clause 12. The computerized method of clause 11, wherein the distance threshold increases based on time since connection.

Clause 13. The computerized method of clause 12, wherein the distance threshold begins to increase once the time since connection exceeds the threshold time.

Clause 14. The computerized method of clause 11, wherein receiving the connection request further indicates that the first central determined that the distance threshold has been satisfied.

Clause 15. A computing system comprising: a peripheral having a first hardware computer processor and a first non-transitory computer-readable medium storing first software instructions that, when executed by the first hardware computer processor cause the peripheral to: determine, based on a connection timer configured to track a time since last connection of the peripheral to a central, a time since connection, wherein the peripheral is configured to reset its connection timer upon connection to a central of a plurality of centrals, and transmit a broadcast including the time since connection, wherein the broadcast is configured to be detected by one or more centrals of the plurality of centrals; and a central having a second hardware computer processor and a second non-transitory computer-readable medium storing second software instructions that, when executed by the second hardware computer processor, cause the central to: receive the broadcast from the peripheral, parse the broadcast to determine a time since connection; determine whether the time since connection exceeds a threshold time period, determine, based on a signal strength of the broadcast from the peripheral, a distance from the central to the peripheral, determine whether the distance to the peripheral is less than a threshold distance, and in response to a determination that the time since connection exceeds the threshold time period and the distance to the peripheral is less than a threshold distance, initiate a connection with the peripheral, wherein the connection with the peripheral enables bi-directional communication.

Clause 16. The computing system of clause 15, wherein the second software instructions further cause the central to, in response to a successful connection with the peripheral, perform an update to the peripheral.

Clause 17. The computing system of clause 16, wherein the update to the peripheral comprises at least one of a firmware update or a configuration update.

Clause 18. The computing system of clause 15, wherein the broadcast includes at least one of firmware image information or configuration version information.

Clause 19. The computing system of clause 18, wherein the second software instructions further cause the central to:

determine, based on at least one of the firmware image information or the configuration version information, whether the peripheral requires an update; and based at least in part on a determination that the peripheral requires an update, initiate a connection with the peripheral.

Clause 20. The computing system of clause 15, wherein the first software instructions further cause the peripheral to, in response to a successful connection with the central, communicate with the central to receive one or more updates.

Clause 21. A method for optimizing communication between Centrals and Peripherals in a wireless network, comprising: announcing a last connection time and/or distance threshold by each Peripheral in its broadcast structure; utilizing the announced information by Centrals to determine when to connect with a peripheral based on a time threshold time period (e.g., 1 week) since the last connection and/or a determined distance from the Peripheral; connecting between a Central and a Peripheral upon satisfying the time threshold and/or the determined distance satisfying the distance threshold, enabling bi-directional communication for configuration and/or firmware updates; and resetting the Periphral's connection timer and/or distance threshold upon reconnection.

Clause 22. The method of clause 21, further comprising: determining proximity between a Central and its associated peripherals to establish connections based on priority by prioritizing connections with peripherals closest in distance before connecting to more distant device.

Clause 23. The method of clause 21, wherein the broadcast structure includes information about the time elapsed since the last connection for determining whether the time threshold has been exceeded and to initiate a connection if necessary.

Clause 24. A system for optimized communication between Centrals and Peripherals in a wireless network, comprising: Peripherals configured with broadcast structures that include information about the last connection time and/or distance threshold; Centrals configured to utilize the announced last connection time and/or distance threshold to determine when to connect based on a time threshold and/or determined distance from the Peripherals; a communication interface for bi-directional communication between Centrals and Peripherals upon connecting, enabling configuration and/or firmware updates; and a connection timer and distance threshold in each Peripheral that is reset after reconnection.

Clause 25. The system of clause 24, wherein the Centrals are further configured to prioritize establishing connections with peripherals based on proximity by connecting first to the closest peripherals before connecting to more distant ones.

Clause 26. The system of clause 24, wherein the broadcast structure includes a time elapsed field that is utilized for determining whether the time threshold has been exceeded and for initiating a connection if necessary.

What is claimed is:

1. A computerized method, performed by a computing system having one or more hardware computer processors and one or more non-transitory computer readable storage device storing software instructions executable by the computing system to perform the computerized method comprising:

by a first central:
   receiving a broadcast from a peripheral;
   parsing the broadcast to determine a time since connection indicating a time period since the peripheral last connected with any of a plurality of centrals;
   determining whether the time since connection exceeds a threshold time period;
   determining, based on a signal strength of the broadcast from the peripheral, a distance from the first central to the peripheral;
   determining whether the distance to the peripheral is less than a threshold distance; and
   in response to determining that the time since connection exceeds the threshold time period and the distance to the peripheral is less than a threshold distance, initiating a connection with the peripheral, wherein the connection with the peripheral enables bi-directional communication; and
by the peripheral:
   determining, based on a connection timer configured to track a time since last connection of the peripheral to any centrals of a plurality of centrals, the time since connection;
   transmitting the broadcast including the time since connection, wherein the broadcast is configured to be detected by one or more centrals of the plurality of centrals;
   receiving a connection request from the first central of the plurality of centrals, wherein receiving the connection request indicates that the first central determined that the time since connection exceeds a threshold time;
   communicating with the first central to receive one or more configuration updates; and
   resetting the connection timer.

2. The computerized method of claim 1, wherein the peripheral is configured to reset a connection timer in response to successful connection with the first central.

3. The computerized method of claim 1, wherein the broadcast comprises transmit power of the peripheral, and wherein the computerized method further comprises determining, based on the transmit power of the peripheral, a distance from the first central to the peripheral.

4. The computerized method of claim 1, wherein the peripheral is a first peripheral, and wherein the computerized method further comprises:
   determining a distance from the first central to each of at least two additional peripherals;
   determining that a second peripheral of the at least two additional peripherals is closer in distance to the first central than a third peripheral of the at least two additional peripherals; and
   initiating a connection with the second peripheral.

5. The computerized method of claim 4, wherein a time since connection corresponding to the second peripheral is associated with a shorter time period than a time since connection corresponding to the third peripheral.

6. The computerized method of claim 1, further comprising, in response to a successful connection with the peripheral, performing an update to the peripheral.

7. The computerized method of claim 6, wherein the update to the peripheral comprises at least one of a firmware update or a configuration update.

8. The computerized method of claim 1, wherein the broadcast further comprises at least one of firmware image information or configuration version information.

9. The computerized method of claim 8, further comprising:
   determining, based on at least one of the firmware image information or the configuration version information, that the peripheral requires an update; and
   based at least on determining that the peripheral requires an update, initiating connection with the peripheral.

10. The computerized method of claim 1, wherein the broadcast further comprises a distance threshold.

11. The computerized method of claim 10, wherein the distance threshold increases based on time since connection.

12. The computerized method of claim 11, wherein the distance threshold begins to increase once the time since connection exceeds the threshold time.

13. The computerized method of claim 10, wherein receiving the connection request further indicates that the first central determined that the distance threshold has been satisfied.

14. A computing system comprising:
   a peripheral having a first hardware computer processor and a first non-transitory computer-readable medium storing first software instructions that, when executed by the first hardware computer processor cause the peripheral to:
      determine, based on a connection timer configured to track a time since last connection of the peripheral to a central, a time since connection, wherein the peripheral is configured to reset its connection timer upon connection to a central of a plurality of centrals, and
      transmit a broadcast including the time since connection, wherein
   the broadcast is configured to be detected by one or more centrals of the plurality of centrals; and
   a central having a second hardware computer processor and a second non-transitory computer-readable medium storing second software instructions that, when executed by the second hardware computer processor, cause the central to:
      receive the broadcast from the peripheral,
      parse the broadcast to determine a time since connection;
      determine whether the time since connection exceeds a threshold time period,
      determine, based on a signal strength of the broadcast from the peripheral, a distance from the central to the peripheral,
      determine whether the distance to the peripheral is less than a threshold distance, and
      in response to a determination that the time since connection exceeds the threshold time period and the distance to the peripheral is less than a threshold distance, initiate a connection with the peripheral,
   wherein the connection with the peripheral enables bi-directional communication.

15. The computing system of claim 14, wherein the second software instructions further cause the central to, in response to a successful connection with the peripheral, perform an update to the peripheral.

16. The computing system of claim 15, wherein the update to the peripheral comprises at least one of a firmware update or a configuration update.

17. The computing system of claim 14, wherein the broadcast includes at least one of firmware image information or configuration version information.

18. The computing system of claim 17, wherein the second software instructions further cause the central to:

determine, based on at least one of the firmware image information or the configuration version information, whether the peripheral requires an update; and based at least in part on a determination that the peripheral requires an update, initiate a connection with the peripheral.

19. The computing system of claim 14, wherein the first software instructions further cause the peripheral to, in response to a successful connection with the central, communicate with the central to receive one or more updates.

20. A non-transitory computer-readable medium storing software instructions that are executable by one or more electronic devices, each having one or more processors, to cause the one or more electronic devices to perform a method comprising:

by a peripheral:
determine, based on a connection timer configured to track a time since last connection of the peripheral to a central, a time since connection, wherein the peripheral is configured to reset its connection timer upon connection to a central of a plurality of centrals, and transmit a broadcast including the time since connection, wherein the broadcast is configured to be detected by one or more centrals of the plurality of centrals; and by a central:
receive the broadcast from the peripheral,
parse the broadcast to determine a time since connection;
determine whether the time since connection exceeds a threshold time period,
determine, based on a signal strength of the broadcast from the peripheral, a distance from the central to the peripheral,
determine whether the distance to the peripheral is less than a threshold distance, and
in response to a determination that the time since connection exceeds the threshold time period and the distance to the peripheral is less than a threshold distance, initiate a connection with the peripheral, wherein the connection with the peripheral enables bi-directional communication.

\* \* \* \* \*